US008290170B2

(12) United States Patent
Nakatani et al.

(10) Patent No.: US 8,290,170 B2
(45) Date of Patent: Oct. 16, 2012

(54) METHOD AND APPARATUS FOR SPEECH DEREVERBERATION BASED ON PROBABILISTIC MODELS OF SOURCE AND ROOM ACOUSTICS

(75) Inventors: Tomohiro Nakatani, Kyoto (JP); Biing-Hwang Juang, Mableton, GA (US)

(73) Assignees: Nippon Telegraph and Telephone Corporation, Tokyo (JP); Georgia Tech Research Corporation, Atlanta, GA (US)

( * ) Notice: Subject to any disclaimer, the term of this patent is extended or adjusted under 35 U.S.C. 154(b) by 838 days.

(21) Appl. No.: 12/282,762

(22) PCT Filed: May 1, 2006

(86) PCT No.: PCT/US2006/016741

§ 371 (c)(1),
(2), (4) Date: Oct. 14, 2008

(87) PCT Pub. No.: WO2007/130026

PCT Pub. Date: Nov. 15, 2007

(65) Prior Publication Data

US 2009/0110207 A1 Apr. 30, 2009

(51) Int. Cl.
*H04B 3/20* (2006.01)

(52) U.S. Cl. .......................... 381/66; 704/243; 704/245

(58) Field of Classification Search .................... 381/66; 704/243, 245

See application file for complete search history.

(56) References Cited

U.S. PATENT DOCUMENTS

| | | | | | |
|---|---|---|---|---|---|
| 4,612,414 | A | * | 9/1986 | Juang | 380/38 |
| 4,783,804 | A | * | 11/1988 | Juang et al. | 704/245 |
| 5,579,436 | A | * | 11/1996 | Chou et al. | 704/244 |
| 5,590,242 | A | * | 12/1996 | Juang et al. | 704/245 |
| 5,606,644 | A | * | 2/1997 | Chou et al. | 704/243 |
| 5,675,704 | A | * | 10/1997 | Juang et al. | 704/246 |
| 5,694,474 | A | | 12/1997 | Ngo et al. | |
| 5,710,864 | A | * | 1/1998 | Juang et al. | 704/238 |
| 5,737,489 | A | * | 4/1998 | Chou et al. | 704/256 |
| 5,774,562 | A | | 6/1998 | Furuya et al. | |
| 5,781,887 | A | * | 7/1998 | Juang | 704/275 |
| 5,797,123 | A | * | 8/1998 | Chou et al. | 704/256.5 |
| 5,805,772 | A | * | 9/1998 | Chou et al. | 704/255 |
| 5,812,972 | A | * | 9/1998 | Juang et al. | 704/234 |
| 5,999,899 | A | * | 12/1999 | Robinson | 704/222 |
| 6,002,776 | A | | 12/1999 | Bhadkamkar et al. | |

(Continued)

FOREIGN PATENT DOCUMENTS

EP 455863 A2 * 11/1991

(Continued)

OTHER PUBLICATIONS

Nakatani, Tomohiro, et al., "Speech Dereverberation based on Probabilistic Models of Source and Room Acoustics," Proceedings of 2006 IEEE International Conference on Acoustics, Speech and Signal Processing, Toulouse, France, May 14-19, 2006, vol. 2, pp. 821-824.

(Continued)

*Primary Examiner* — Laura Menz

(74) *Attorney, Agent, or Firm* — Harness, Dickey & Pierce, P.L.C.

(57) ABSTRACT

Speech dereverberation is achieved by accepting an observed signal for initialization (1000) and performing likelihood maximization (2000) which includes Fourier Transforms (4000).

26 Claims, 22 Drawing Sheets

$l$ ( = 1 to $L$) : Time index of a long - time Fourier spectrum (LTFS)

$m$ (= 0 to $M-1$) : Time sub - index of a short - time Fourier spectrum (STFS)

$k$ (= 1 to $K^{(r)}$) : Frequency index of an STFS $k'$ (= 1 to $K$) : Frequency index of an LTFS

U.S. PATENT DOCUMENTS

| | | | | |
|---|---|---|---|---|
| 6,076,053 | A * | 6/2000 | Juang et al. | 704/236 |
| 6,304,515 | B1 * | 10/2001 | Spiesberger | 367/124 |
| 6,715,125 | B1 * | 3/2004 | Juang | 714/814 |
| 6,944,590 | B2 | 9/2005 | Deng et al. | |
| 7,047,047 | B2 * | 5/2006 | Acero et al. | 455/563 |
| 7,089,183 | B2 * | 8/2006 | Gong | 704/244 |
| 7,219,032 | B2 * | 5/2007 | Spiesberger | 702/150 |
| 7,363,191 | B2 * | 4/2008 | Spiesberger | 702/142 |
| 7,590,530 | B2 * | 9/2009 | Zhao et al. | 704/226 |
| 7,664,640 | B2 * | 2/2010 | Webber | 704/243 |
| 8,010,314 | B2 * | 8/2011 | Spiesberger | 702/150 |
| 8,064,969 | B2 * | 11/2011 | Diethorn et al. | 455/575.1 |
| 2002/0035473 | A1 * | 3/2002 | Gong | 704/256 |
| 2003/0171932 | A1 * | 9/2003 | Juang et al. | 704/276 |
| 2003/0225719 | A1 * | 12/2003 | Juang et al. | 706/48 |
| 2004/0213415 | A1 * | 10/2004 | Rama et al. | 381/63 |
| 2005/0010410 | A1 | 1/2005 | Takiguchi et al. | |
| 2005/0037782 | A1 * | 2/2005 | Diethorn et al. | 455/462 |
| 2005/0071168 | A1 * | 3/2005 | Juang et al. | 704/273 |
| 2006/0178887 | A1 * | 8/2006 | Webber | 704/256 |
| 2008/0147402 | A1 * | 6/2008 | Jeon et al. | 704/251 |
| 2009/0110207 | A1 * | 4/2009 | Nakatani et al. | 381/66 |
| 2009/0248403 | A1 * | 10/2009 | Kinoshita et al. | 704/219 |
| 2010/0204988 | A1 * | 8/2010 | Xu et al. | 704/233 |
| 2011/0002473 | A1 * | 1/2011 | Nakatani et al. | 381/66 |
| 2011/0015925 | A1 * | 1/2011 | Xu et al. | 704/233 |
| 2011/0044462 | A1 * | 2/2011 | Yoshioka et al. | 381/66 |
| 2011/0257976 | A1 * | 10/2011 | Huo | 704/256.1 |

FOREIGN PATENT DOCUMENTS

| | | | |
|---|---|---|---|
| EP | 559349 | A1 * | 9/1993 |
| EP | 674306 | A2 * | 9/1995 |
| EP | 720147 | A1 * | 7/1996 |
| EP | 720149 | A1 * | 7/1996 |
| EP | 834862 | A2 * | 4/1998 |
| EP | 892387 | A1 * | 1/1999 |
| EP | 892388 | A1 * | 1/1999 |
| EP | 1 376 540 | A2 | 1/2004 |
| JP | 08006588 | A * | 1/1996 |
| JP | 09-321860 | A | 12/1997 |
| JP | 10-510127 | A | 9/1998 |
| JP | 11-508105 | A | 7/1999 |
| JP | 2004-264816 | A | 9/2004 |
| JP | 2004-274234 | | 9/2004 |
| JP | 2004-347761 | A | 12/2004 |
| WO | WO 2007130026 | A1 * | 11/2007 |

OTHER PUBLICATIONS

Nakatani, Tomohiro, et al., "Single-Microphone Blind Dereverberation," in "Speech Enhancement," edited by J. Benesty, et al., New York: Springer, 2005, Ch. 11, pp. 247-270.

Takiguchi et al., Acoustic Model Adaptation Using First Order Prediction for Reverberant Speech, Int'l conference on Acoustics, Speech, and Signal Processing, 2004, IEEE ICASSP '04, vol. 1, May 17-21, 2004, pp. I-869-I-872.

Kingsbury, B. and Morgan, N. "Recognizing reverberant speech with rasta-plp," Proc. 1997 IEEE Int. Conf. Acoustics, Speech and Signal Processing (ICASSP-97), vol. 2, pp. 1259-1262, 1997.

Gillespie, B. W. and Atlas L. E., "Strategies for improving audible quality and speech recognition accuracy of reverberant speech," Proc. 2003 IEEE Int. Conf. Acoustics, Speech and Signal Processing (ICASSP-2003), vol. 1, pp. 676-679, 2003.

Buchner, H., Aichner, R. and Kellerman, W. "Trinicon: a versatile framework for multichannel blind signal processing," Proc. 2004 IEEE Int. Conf. Acoustics, Speech and Signal Processing (ICASSP-2004), vol. III, pp. 889-892, May 2004.

Hikichi, T. and Miyoshi, M., "Blind algorithm for calculating common poles based on linear prediction," Proc. of the 2004 IEEE Int. Conf. Acoustics, Speech and Signal Processing (ICASSP-2004), vol. IV, pp. 89-92, May 2004.

Hopgood, J. R. and Rayner, P.J.W., "Blind single channel deconvolution using nonstationary signal processing," IEEE Trans. Speech and Audio Processing, vol. 11, No. 5, pp. 476-488, Sep. 2003.

Nakatani, T. and Miyoshi, M., "Blind dereverberation of single channel speech signal based on harmonic structure," Proc. ICASSP-2003, vol. 1, pp. 92-95, Apr. 2003.

Kinoshita, K. Nakatani, T. and Miyoshi, M., "Efficient blind dereverberation framework for automatic speech recognition," Proc. Interspeech-2005, Sep. 2005.

Nakatani. T, Juang, B.H., Kinoshita, K., Miyoshi, M., "Harmonicity based dereverberation with maximum a posteriori estimation," 2005 IEEE Workshop on Applications of Signal Processing to Audio and Acoustics (WASPAA-2005), pp. 94-97, Oct. 2005.

Kinoshita. K, Nakatani, T. and Miyoshi, M., "Spectral subtraction steered by multi-step forward linear prediction for single channel speech dereverberation," Spring Conf. of the Acoustical Society of Japan, Mar. 2006.

Kinoshita, K., Nakatani, T., and Miyoshi, M., "Fast estimation of a precise dereverberation filter based on speech harmonicity," Proc. ICASSP, vol. I, pp. 1073-1076, Mar. 2005.

Nakatani, T., Kinoshita, K., Miyoshi, M. and Zolfaghari, P.S., "Harmonicity based monaural speech dereverberation with time warping and $F_o$ adaptive window," Proc. ICSLP-2004, vol. II, pp. 873-876, Oct. 2004.

Nakatani. T., Miyoshi, M., and Kinoshita, K., "Blind dereverberation of monaural speech signals based on harmonic structure," The transaction of IEICE, vol. J88-D-11, No. 3, pp. 509-520, Mar. 2005.

Fevotte, C., and Cardoso, J.F., "Maximum likelihood approach for blind audio source separation using time-frequency Gaussian source models," 2005 IEEE Workshop on Applications of Signal Processing to Audio and Acoustics (WASPAA-2005), pp. 78-81, Oct. 2005.

Douglas, S.C., and Sun, X., "Convolutive blind separation of speech mixtures using the natural gradient," Speech Communication, vol. 39, pp. 65-78, 2003.

Yegnanarayana, B. and Murthy, P.S., "Enhancement of reverberant speech using LP residual signal," IEEE Trans. Speech and Audio Processing, vol. 8, No. 3, pp. 267-281, 2000.

Unoki, M., Furukawa, M., Sakata, K., and Akagi, M., "A method based on the MTF concept for dereverberating the power envelope from the reverberant signal," Prof. 2003 IEE Int. Conf. Acoustics, Speech and Signal Processing (ICASSP-2003), vol. 1, pp. 840-843, 2003.

Hirokazu Kameoka, Takuya Nishimoto, Shigeki Sagayama, "Separation of Harmonic Structures Based on Tied Gaussian Mixture Model and Information Criterion for Concurrent Sounds," In Proc. IEEE, International Conference on Acoustics, Speech and Signal Processing (ICASSP 2004), vol. 4, pp. 297-300, 2004.

Wu, Mingyang, et al., "A Two-stage Algorithm for One-microphone Reverberant Speech Enhancement," Technical Report TR62, The Ohio State University, Nov. 2003, pp. 1-20, retrieved from the Internet: URL: ftp://cse.osu.edu/pub/tech-report/2003/TR62.pdf (retrieved on May 9, 2012).

Grenier, Yves, et al., "Microphone array response to speaker movements," IEEE International Conference on Acoustics, Speech, and Signal Processing, Munich Germany, Apr. 21-24, 1997, pp. 247-250.

* cited by examiner $l$ ($=1$ to $L$) : Time index of a long-time Fourier spectrum (LTFS)

$m$ ($=0$ to $M-1$) : Time sub-index of a short-time Fourier spectrum (STFS)

$k$ ($=1$ to $K^{(r)}$) : Frequency index of an STFS $k'$ ($=1$ to $K$) : Frequency index of an LTFS $f_{l,m}$ : a fundamental frequency of an STFS indexed by $l$ and $m$ $v_{l,m}$ : a voicing measure of an STFS indexed by $l$ and $m$

METHOD AND APPARATUS FOR SPEECH DEREVERBERATION BASED ON PROBABILISTIC MODELS OF SOURCE AND ROOM ACOUSTICS

BACKGROUND ART

1. Field of the Invention

The present invention generally relates to a method and an apparatus for speech dereverberation. More specifically, the present invention relates to a method and an apparatus for speech dereverberation based on probabilistic models of source and room acoustics.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Speech signals captured by a distant microphone in an ordinary room inevitably contain reverberation, which has detrimental effects on the perceived quality and intelligibility of the speech signals and degrades the performance of automatic speech recognition (ASR) systems. The recognition performance cannot be improved when the reverberation time is longer than 0.5 sec even when using acoustic models that have been trained under a matched reverberant condition. This is disclosed by B. Kingsbury and N. Morgan, "Recognizing reverberant speech with rasta-plp" Proc. 1997 IEEE International Conference Acoustic Speech and Signal Processing (ICASSP-97), vol. 2, pp. 1259-1262, 1997. Dereverberation of the speech signal is essential, whether it is for high quality recording and playback or for automatic speech recognition (ASR).

Although blind dereverberation of a speech signal is still a challenging problem, several techniques have recently been proposed. Techniques have been proposed that de-correlate the observed signal while preserving the correlation within a short time segment of the signal. This is disclosed by B. W. Gillespie and L. E. Atlas, "Strategies for improving audible quality and speech recognition accuracy of reverberant speech," Proc. 2003 IEEE International Conference Acoustics, Speech and/Signal Processing (ICASSP-2003), vol. 1, pp. 676-679, 2003. This is also disclosed by H. Buchner, R. Aichner, and W. Kellermann, "Trinicon: a versatile framework for multichannel blind signal processing" Proc. of the 2004 IEEE International Conference. Acoustics, Speech and Signal Processing (ICASSP-2004), vol. III, pp. 889-892, May 2004.

Methods have been proposed for estimating and equalizing the poles in the acoustic response of the room. This is disclosed by T. Hikichi and M. Miyoshi, "Blind algorithm for calculating common poles based on linear prediction," Proc. of the 2004 IEEE International Conference on Acoustics, Speech, and Signal processing (ICASSP 2004), vol. IV. pp. 89-92, May 2004. This is also disclosed by J. R. Hopgood and P. J. W. Rayner, "Blind single channel deconvolution using nonstationary signal processing," IEEE Transactions Speech and Audio processing, vol. 11, no. 5, pp. 467-488, September 2003.

Also, two approaches have been proposed based on essential features of speech signals, namely harmonicity based dereverberation, hereinafter referred to as HERB, and Sparseness Based Dereverberation, hereinafter referred to as SBD. HERB is disclosed by T. Nakatani, and M. Miyoshi, "Blind dereverberation of single channel speech signal based on harmonic structure," Proc. ICASSP-2003. vol. 1, pp. 92-95, April, 2003. Japanese Unexamined Patent Application, First Publication No. 2004-274234 discloses one example of the conventional technique for HERB. SBD is disclosed by K. Kinoshita, T. Nakatani and M. Miyoshi, "Efficient blind dereverberation framework for automatic speech recognition," Proc. Interspeech-2005, September 2005.

These methods make extensive use of the respective speech features in their initial estimate of the source signal. The initial source signal estimate and the observed reverberant signal are then used together for estimating the inverse filter for dereverberation, which allows further refinement of the source signal estimate. To obtain the initial source signal estimate, HERB utilizes an adaptive harmonic filter, and SBD utilizes a spectral subtraction based on minimum statistics. It has been shown experimentally that these methods greatly improve the ASR performance of the observed reverberant signals if the signals are sufficiently long.

In view of the above, it will be apparent to those skilled in the art from this disclosure that there exists a need for an improved apparatus and/or method for speech dereverberation. This invention addresses this need in the art as well as other needs, which will become apparent to those skilled in the art from this disclosure.

DISCLOSURE OF INVENTION

Accordingly, it is a primary object of the present invention to provide a speech dereverberation apparatus.

It is another object of the present invention to provide a speech dereverberation method.

It is a further object of the present invention to provide a program to be executed by a computer to perform a speech dereverberation method.

It is a still further object of the present invention to provide a storage medium that stores a program to be executed by a computer to perform a speech dereverberation method.

In accordance with a first aspect of the present invention, a speech dereverberation apparatus that comprises a likelihood maximization unit that determines a source signal estimate that maximizes a likelihood function. The determination is made with reference to an observed signal, an initial source signal estimate, a first variance representing a source signal uncertainty, and a second variance representing an acoustic ambient uncertainty.

The likelihood function may preferably be defined based on a probability density function that is evaluated in accordance with an unknown parameter, a first random variable of missing data, and a second random variable of observed data. The unknown parameter is defined with reference to the source signal estimate. The first random variable of missing data represents an inverse filter of a room transfer function. The second random variable of observed data is defined with reference to the observed signal and the initial source signal estimate.

The above likelihood maximization unit may preferably determine the source signal estimate using an iterative optimization algorithm. The iterative optimization algorithm may preferably be an expectation-maximization algorithm.

The likelihood maximization unit may further comprise, but is not limited to, an inverse filter estimation unit, a filtering unit, a source signal estimation and convergence check unit, and an update unit. The inverse filter estimation unit calculates an inverse filter estimate with reference to the observed signal, the second variance, and one of the initial source signal estimate and an updated source signal estimate. The filtering unit applies the inverse filter estimate to the observed signal, and generates a filtered signal. The source signal estimation and convergence check unit calculates the source signal estimate with reference to the initial source signal estimate, the first variance, the second variance, and the filtered signal. The source signal estimation and convergence check unit further determines whether or not a convergence of the source signal estimate is obtained. The source signal estimation and convergence check unit further outputs the source signal estimate as a dereverberated signal if the convergence of the source signal estimate is obtained. The update unit updates the source signal estimate into the updated source signal estimate. The update unit further provides the updated source signal estimate to the inverse filter estimation unit if the convergence of the source signal estimate is not obtained. The update unit further provides the initial source signal estimate to the inverse filter estimation unit in an initial update step.

The likelihood maximization unit may further comprise, but is not limited to, a first long time Fourier transform unit, an LTFS-to-STFS transform unit, an STFS-to-LTFS transform unit, a second long time Fourier transform unit, and a short time Fourier transform unit. The first long time Fourier transform unit performs a first long time Fourier transformation of a waveform observed signal into a transformed observed signal. The first long time Fourier transform unit further provides the transformed observed signal as the observed signal to the inverse filter estimation unit and the filtering unit. The LTFS-to-STFS transform unit performs an LTFS-to-STFS transformation of the filtered signal into a transformed filtered signal. The LTFS-to-STFS transform unit further provides the transformed filtered signal as the filtered signal to the source signal estimation and convergence check unit. The STFS-to-LTFS transform unit performs an STFS-to-LTFS transformation of the source signal estimate into a transformed source signal estimate. The STFS-to-LTFS transform unit further provides the transformed source signal estimate as the source signal estimate to the update unit if the convergence of the source signal estimate is not obtained. The second long time Fourier transform unit performs a second long time Fourier transformation of a waveform initial source signal estimate into a first transformed initial source signal estimate. The second long time Fourier transform unit further provides the first transformed initial source signal estimate as the initial source signal estimate to the update unit. The short time Fourier transform unit performs a short time Fourier transformation of the waveform initial source signal estimate into a second transformed initial source signal estimate. The short time Fourier transform unit further provides the second transformed initial source signal estimate as the initial source signal estimate to the source signal estimation and convergence check unit.

The speech dereverberation apparatus may further comprise, but is not limited to an inverse short time Fourier transform unit that performs an inverse short time Fourier transformation of the source signal estimate into a waveform source signal estimate.

The speech dereverberation apparatus may further comprise, but is not limited to, an initialization unit that produces the initial source signal estimate, the first variance, and the second variance, based on the observed signal. In this case, the initialization unit may further comprise, but is not limited to, a fundamental frequency estimation unit, and a source signal uncertainty determination unit. The fundamental frequency estimation unit estimates a fundamental frequency and a voicing measure for each short time frame from a transformed signal that is given by a short time Fourier transformation of the observed signal. The source signal uncertainty determination unit determines the first variance, based on the fundamental frequency and the voicing measure.

The speech dereverberation apparatus may further comprise, but is not limited to, an initialization unit, and a convergence check unit. The initialization unit produces the initial source signal estimate, the first variance, and the second variance, based on the observed signal. The convergence check unit receives the source signal estimate from the likelihood maximization unit. The convergence check unit determines whether or not a convergence of the source signal estimate is obtained. The convergence check unit further outputs the source signal estimate as a dereverberated signal if the convergence of the source signal estimate is obtained. The convergence check unit furthermore provides the source signal estimate to the initialization unit to enable the initialization unit to produce the initial source signal estimate, the first variance, and the second variance based on the source signal estimate if the convergence of the source signal estimate is not obtained.

In the last-described case, the initialization unit may further comprise, but is not limited to, a second short time Fourier transform unit, a first selecting unit, a fundamental frequency estimation unit, and an adaptive harmonic filtering unit. The second short time Fourier transform unit performs a second short time Fourier transformation of the observed signal into a first transformed observed signal. The first selecting unit performs a first selecting operation to generate a first selected output and a second selecting operation to generate a second selected output. The first and second selecting operations are independent from each other. The first selecting operation is to select the first transformed observed signal as the first selected output when the first selecting unit receives an input of the first transformed observed signal but does not receive any input of the source signal estimate. The first selecting operation is also to select one of the first transformed observed signal and the source signal estimate as the first selected output when the first selecting unit receives inputs of the first transformed observed signal and the source signal estimate. The second selecting operation is to select the first transformed observed signal as the second selected output when the first selecting unit receives the input of the first transformed observed signal but does not receive any input of the source signal estimate. The second selecting operation is also to select one of the first transformed observed signal and the source signal estimate as the second selected output when the first selecting unit receives inputs of the first transformed observed signal and the source signal estimate. The fundamental frequency estimation unit receives the second selected output. The fundamental frequency estimation unit also estimates a fundamental frequency and a voicing measure for each short time frame from the second selected output. The adaptive harmonic filtering unit receives the first selected output, the fundamental frequency and the voicing measure. The adaptive harmonic filtering unit enhances a harmonic structure of the first selected output based on the fundamental frequency and the voicing measure to generate the initial source signal estimate.

The initialization unit may further comprise, but is not limited to, a third short time Fourier transform unit, a second selecting unit, a fundamental frequency estimation unit, and a source signal uncertainty determination unit. The third short time Fourier transform unit performs a third short time Fourier transformation of the observed signal into a second transformed observed signal. The second selecting unit performs a third selecting operation to generate a third selected output. The third selecting operation is to select the second transformed observed signal as the third selected output when the second selecting unit receives an input of the second transformed observed signal but does not receive any input of the source signal estimate. The third selecting operation is also to select one of the second transformed observed signal and the source signal estimate as the third selected output when the second selecting unit receives inputs of the second transformed observed signal and the source signal estimate. The fundamental frequency estimation unit receives the third selected output. The fundamental frequency estimation unit estimates a fundamental frequency and a voicing measure for each short time frame from the third selected output. The source signal uncertainty determination unit determines the first variance based on the fundamental frequency and the voicing measure.

The speech dereverberation apparatus may further comprise, but is not limited to, an inverse short time Fourier transform unit that performs an inverse short time Fourier transformation of the source signal estimate into a waveform source signal estimate if the convergence of the source signal estimate is obtained.

In accordance with a second aspect of the present invention, a speech dereverberation apparatus that comprises a likelihood maximization unit that determines an inverse filter estimate that maximizes a likelihood function. The determination is made with reference to an observed signal, an initial source signal estimate, a first variance representing a source signal uncertainty, and a second variance representing an acoustic ambient uncertainty.

The likelihood function may preferably be defined based on a probability density function that is evaluated in accordance with a first unknown parameter, a second unknown parameter, and a first random variable of observed data. The first unknown parameter is defined with reference to a source signal estimate. The second unknown parameter is defined with reference to an inverse filter of a room transfer function. The first random variable of observed data is defined with reference to the observed signal and the initial source signal estimate. The inverse filter estimate is an estimate of the inverse filter of the room transfer function.

The likelihood maximization unit may preferably determine the inverse filter estimate using an iterative optimization algorithm.

The speech dereverberation apparatus may further comprise, but is not limited to, an inverse filter application unit that applies the inverse filter estimate to the observed signal, and generates a source signal estimate.

The inverse filter application unit may further comprise, but is not limited to a first inverse long time Fourier transform unit, and a convolution unit. The first inverse long time Fourier transform unit performs a first inverse long time Fourier transformation of the inverse filter estimate into a transformed inverse filter estimate. The convolution unit receives the transformed inverse filter estimate and the observed signal. The convolution unit convolves the observed signal with the transformed inverse filter estimate to generate the source signal estimate.

The inverse filter application unit may further comprise, but is not limited to, a first long time Fourier transform unit, a first filtering unit, and a second inverse long time Fourier transform unit. The first long time Fourier transform unit performs a first long time Fourier transformation of the observed signal into a transformed observed signal. The first filtering unit applies the inverse filter estimate to the transformed observed signal. The first filtering unit generates a filtered source signal estimate. The second inverse long time Fourier transform unit performs a second inverse long time Fourier transformation of the filtered source signal estimate into the source signal estimate.

The likelihood maximization unit may further comprise, but is not limited to, an inverse filter estimation unit, a convergence check unit, a filtering unit, a source signal estimation unit, and an update unit. The inverse filter estimation unit calculates an inverse filter estimate with reference to the observed signal, the second variance, and one of the initial source signal estimate and an updated source signal estimate. The convergence check unit determines whether or not a convergence of the inverse filter estimate is obtained. The convergence check unit further outputs the inverse filter estimate as a filter that is to dereverberate the observed signal if the convergence of the source signal estimate is obtained. The filtering unit receives the inverse filter estimate from the convergence check unit if the convergence of the source signal estimate is not obtained. The filtering unit further applies the inverse fitter estimate to the observed signal. The filtering unit further generates a filtered signal. The source signal estimation unit calculates the source signal estimate with reference to the initial source signal estimate, the first variance, the second variance, and the filtered signal. The update unit updates the source signal estimate into the updated source signal estimate. The update unit further provides the initial source signal estimate to the inverse filter estimation unit in an initial update step. The update unit further provides the updated source signal estimate to the inverse filter estimation unit in update steps other than the initial update step.

The likelihood maximization unit may further comprise, but is not limited to, a second long time Fourier transform unit, an LTFS-to-STFS transform unit, an STFS-to-LTFS transform unit, a third long time Fourier transform unit, and a short time Fourier transform unit. The second long time Fourier transform unit performs a second long time Fourier transformation of a waveform observed signal into a transformed observed signal. The second long time Fourier transform unit further provides the transformed observed signal as the observed signal to the inverse filter estimation unit and the filtering unit. The LTFS-to-STFS transform unit performs an LTFS-to-STFS transformation of the filtered signal into a transformed filtered signal. The LTFS-to-STFS transform unit further provides the transformed filtered signal as the filtered signal to the source signal estimation unit. The STFS-to-LTFS transform unit performs an STFS-to-LTFS transformation of the source signal estimate into a transformed source signal estimate. The STFS-to-LTFS transform unit further provides the transformed source signal estimate as the source signal estimate to the update unit. The third long time Fourier transform unit performs a third long time Fourier transformation of a waveform initial source signal estimate into a first transformed initial source signal estimate. The third long time Fourier transform unit further provides the first transformed initial source signal estimate as the initial source signal estimate to the update unit. The short time Fourier transform unit performs a short time Fourier transformation of the waveform initial source signal estimate into a second transformed initial source signal estimate. The short time Fourier transform unit further provides the second transformed initial source signal estimate as the initial source signal estimate to the source signal estimation unit.

The speech dereverberation apparatus may further comprise, but is not limited to, an initialization unit that produces the initial source signal estimate, the first variance, and the second variance, based on the observed signal.

The initialization unit may further comprise, but is not limited to, a fundamental frequency estimation unit, and a source signal uncertainty determination unit. The fundamental frequency estimation unit estimates a fundamental frequency and a voicing measure for each short time frame from a transformed signal that is given by a short time Fourier transformation of the observed signal. The source signal uncertainty determination unit determines the first variance, based on the fundamental frequency and the voicing measure.

In accordance with a third aspect of the present invention, a speech dereverberation method that comprises determining a source signal estimate that maximizes a likelihood function. The determination is made with reference to an observed signal, an initial source signal estimate, a first variance representing a source signal uncertainty, and a second variance representing an acoustic ambient uncertainty.

The likelihood function may preferably be defined based on a probability density function that is evaluated in accordance with an unknown parameter, a first random variable of missing data, and a second random variable of observed data. The unknown parameter is defined with reference to the source signal estimate. The first random variable of missing data represents an inverse filter of a room transfer function. The second random variable of observed data is defined with reference to the observed signal and the initial source signal estimate.

The source signal estimate may preferably be determined using an iterative optimization algorithm. The iterative optimization algorithm may preferably be an expectation-maximization algorithm.

The process for determining the source signal estimate may further comprise, but is not limited to, the following processes. An inverse filter estimate is calculated with reference to the observed signal, the second variance, and one of the initial source signal estimate and an updated source signal estimate. The inverse filter estimate is applied to the observed signal to generate a filtered signal. The source signal estimate is calculated with reference to the initial source signal estimate, the first variance, the second variance, and the filtered signal. A determination is made on whether or not a convergence of the source signal estimate is obtained. The source signal estimate is outputted as a dereverberated signal if the convergence of the source signal estimate is obtained. The source signal estimate is updated into the updated source signal estimate if the convergence of the source signal estimate is not obtained.

The process for determining the source signal estimate may further comprise, but is not limited to, the following processes. A first long time Fourier transformation is performed to transform a waveform observed signal into a transformed observed signal. An LTFS-to-STFS transformation is performed to transform the filtered signal into a transformed filtered signal. An STFS-to-LTFS transformation is performed to transform the source signal estimate into a transformed source signal estimate if the convergence of the source signal estimate is not obtained. A second long time Fourier transformation is performed to transform a waveform initial source signal estimate into a first transformed initial source signal estimate. A short time Fourier transformation is performed to transform the waveform initial source signal estimate into a second transformed initial source signal estimate.

The speech dereverberation method may further comprise, but is not limited to performing an inverse short time Fourier transformation of the source signal estimate into a waveform source signal estimate.

The speech dereverberation method may further comprise, but is not limited to, producing the initial source signal estimate, the first variance, and the second variance, based on the observed signal.

In the last-described case, producing the initial source signal estimate, the first variance, and the second variance may further comprise, but is not limited to, the following processes. An estimation is made of a fundamental frequency and a voicing measure for each short time frame from a transformed signal that is given by a short time Fourier transformation of the observed signal. A determination is made of the first variance, based on the fundamental frequency and the voicing measure.

The speech dereverberation method may further comprise, but is not limited to, the following processes. The initial source signal estimate, the first variance, and the second variance are produced based on the observed signal. A determination is made on whether or not a convergence of the source signal estimate is obtained. The source signal estimate is outputted as a dereverberated signal if the convergence of the source signal estimate is obtained. The process will return producing the initial source signal estimate, the first variance, and the second variance if the convergence of the source signal estimate is not obtained.

In the last-described case, producing the initial source signal estimate, the first variance, and the second variance may further comprise, but is not limited to, the following processes. A second short time Fourier transformation is performed to transform the observed signal into a first transformed observed signal. A first selecting operation is performed to generate a first selected output. The first selecting operation is to select the first transformed observed signal as the first selected output when receiving an input of the first transformed observed signal without receiving any input of the source signal estimate. The first selecting operation is to select one of the first transformed observed signal and the source signal estimate as the first selected output when receiving inputs of the first transformed observed signal and the source signal estimate. A second selecting operation is performed to generate a second selected output. The second selecting operation is to select the first transformed observed signal as the second selected output when receiving the input of the first transformed observed signal without receiving any input of the source signal estimate. The second selecting operation is to select one of the first transformed observed signal and the source signal estimate as the second selected output when receiving inputs of the first transformed observed signal and the source signal estimate. An estimation is made of a fundamental frequency and a voicing measure for each short time frame from the second selected output. An enhancement is made of a harmonic structure of the first selected output based on the fundamental frequency and the voicing measure to generate the initial source signal estimate.

Producing the initial source signal estimate, the first variance, and the second variance may further comprise, but is not limited to, the following processes. A third short time Fourier transformation is performed to transform the observed signal into a second transformed observed signal. A third selecting operation is performed to generate a third selected output. The third selecting operation is to select the second transformed observed signal as the third selected output when receiving an input of the second transformed observed signal without receiving any input of the source signal estimate. The third selecting operation is to select one of the second transformed observed signal and the source signal estimate as the third selected output when receiving inputs of the second transformed observed signal and the source signal estimate. An estimation is made of a fundamental frequency and a voicing measure for each short time frame from the third selected output. A determination is made of the first variance based on the fundamental frequency and the voicing measure.

The speech dereverberation method may further comprise, but is not limited to, performing an inverse short time Fourier transformation of the source signal estimate into a waveform source signal estimate if the convergence of the source signal estimate is obtained.

In accordance with a fourth aspect of the present invention, a speech dereverberation method that comprises determining an inverse filter estimate that maximizes a likelihood function. The determination is made with reference to an observed signal, an initial source signal estimate, a first variance representing a source signal uncertainty, and a second variance representing an acoustic ambient uncertainty.

The likelihood function may preferably be defined based on a probability density function that is evaluated in accordance with a first unknown parameter, a second unknown parameter, and a first random variable of observed data. The first unknown parameter is defined with reference to a source signal estimate. The second unknown parameter is defined with reference to an inverse filter of a room transfer function. The first random variable of observed data is defined with reference to the observed signal and the initial source signal estimate. The inverse filter estimate is an estimate of the inverse filter of the room transfer function.

The inverse filter estimate may preferably be determined using an iterative optimization algorithm.

The speech dereverberation method may further comprise, but is not limited to, applying the inverse filter estimate to the observed signal to generate a source signal estimate.

In a case, the last-described process for applying the inverse filter estimate to the observed signal may further comprise, but is not limited to, the following processes. A first inverse long time Fourier transformation is performed to transform the inverse filter estimate into a transformed inverse filter estimate. A convolution is made of fee observed signal with the transformed inverse filter estimate to generate the source signal estimate.

In another case, the last-described process for applying the inverse filter estimate to the observed signal may further comprise, but is not limited to, the following processes. A first long time Fourier transformation is performed to transform the observed signal into a transformed observed signal. The inverse filter estimate is applied to the transformed observed signal to generate a filtered source signal estimate. A second inverse long time Fourier transformation is performed to transform the filtered source signal estimate into the source signal estimate.

In still another case, determining the inverse filter estimate may further comprise, but is not limited to, the following processes. An inverse filter estimate is calculated with reference to the observed signal, the second variance, and one of the initial source signal estimate and an updated source signal estimate. A determination is made on whether or not a convergence of the inverse filter estimate is obtained. The inverse filter estimate is outputted as a filter that is to dereverberate the observed signal if the convergence of the source signal estimate is obtained. The inverse filter estimate is applied to the observed signal to generate a filtered signal if the convergence of the source signal estimate is not obtained. The source signal estimate is calculated with reference to the initial source signal estimate, the first variance, the second variance, and the filtered signal. The source signal estimate is updated into the updated source signal estimate.

In the last-described case, the process for determining the inverse filter estimate may further comprise, but is not limited to, the following processes. A second long time Fourier transformation is performed to transform a waveform observed signal into a transformed observed signal. An LTFS-to-STFS transformation is performed to transform the filtered signal into a transformed filtered signal. An STFS-to-LTFS transformation is performed to transform the source signal estimate into a transformed source signal estimate. A third long time Fourier transformation is performed to transform a waveform initial source signal estimate into a first transformed initial source signal estimate. A short time Fourier transformation is performed to transform the waveform initial source signal estimate into a second transformed initial source signal estimate.

The speech dereverberation method may further comprise, but is not limited to, producing the initial source signal estimate, the first variance, and the second variance, based on the observed signal.

In a case, the last-described process for producing the initial source signal estimate, the first variance, and the second variance may further comprise, but is not limited to, the following processes. An estimation is made of a fundamental frequency and a voicing measure for each short time frame from a transformed signal that is given by a short time Fourier transformation of the observed signal. A determination is made of the first variance, based on the fundamental frequency and the voicing measure.

In accordance with a fifth aspect of the present invention, a program to be executed by a computer to perform a speech dereverberation method that comprises determining a source signal estimate that maximizes a likelihood function. The determination is made with reference to an observed signal, an initial source signal estimate, a first variance representing a source signal uncertainty, and a second variance representing an acoustic ambient uncertainty.

In accordance with a sixth aspect of the present invention, a program to be executed by a computer to perform a speech dereverberation method that comprises: determining an inverse filter estimate that maximizes a likelihood function. The determination is made with reference to an observed signal, an initial source signal estimate, a first variance representing a source signal uncertainty, and a second variance representing an acoustic ambient uncertainty.

In accordance with a seventh aspect of the present invention, a storage medium stores a program to be executed by a computer to perform a speech dereverberation method that comprises determining a source signal estimate that maximizes a likelihood function. The determination is made with reference to an observed signal, an initial source signal estimate, a first variance representing a source signal uncertainty, and a second variance representing an acoustic ambient uncertainty.

In accordance with an eighth aspect of the present invention, a storage medium stores a program to be executed by a computer to perform a speech dereverberation method that comprises: determining an inverse filter estimate that maximizes a likelihood function. The determination is made with reference to an observed signal, an initial source signal estimate, a first variance representing a source signal uncertainty, and a second variance representing an acoustic ambient uncertainty.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

BEST MODE FOR CARRYING OUT THE INVENTION

Figure 1:
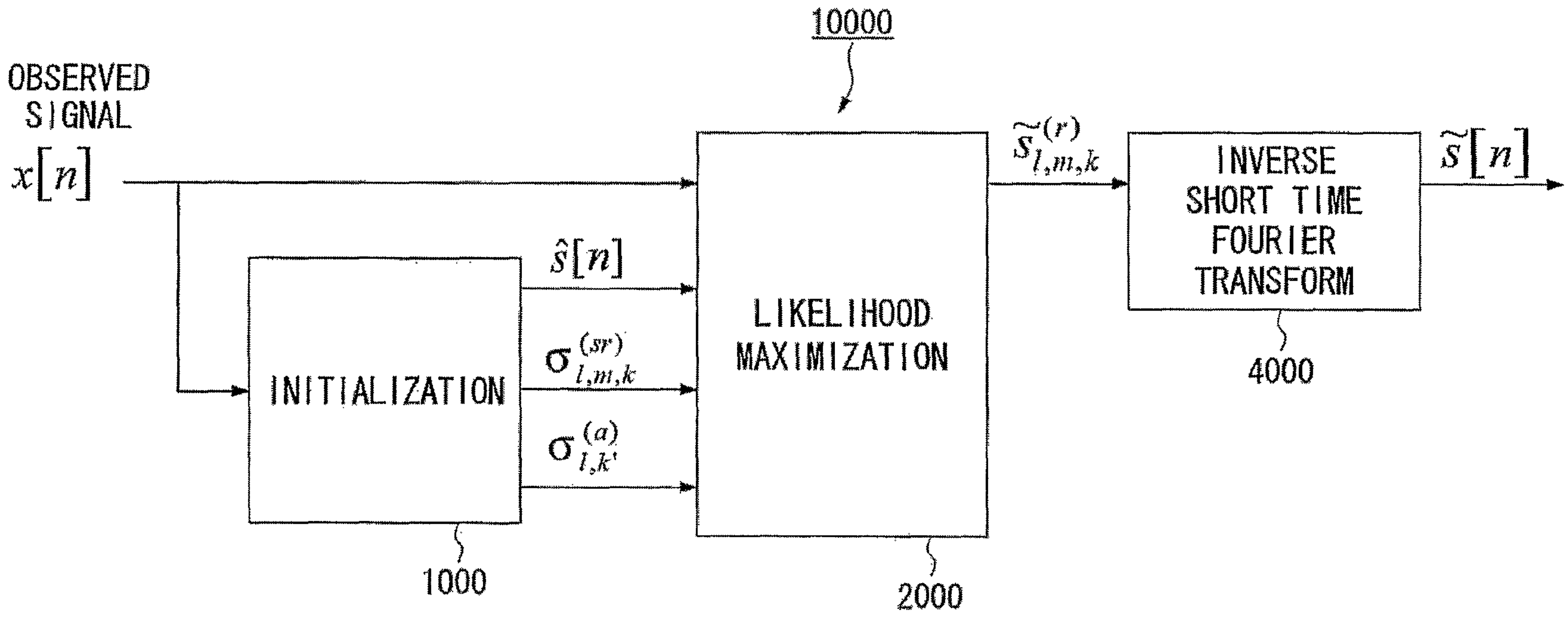
FIG. 1 is a block diagram illustrating an apparatus for speech dereverberation based on probabilistic models of source and room acoustics in a first embodiment of the present invention.

In accordance with one aspect of the present invention, a single channel speech dereverberation method is provided, in which the features of source signals and room acoustics are represented by probability density functions (pdfs) and the source signals are estimated by maximizing a likelihood function defined based on the probability density functions (pdfs). Two types of the probability density functions (pdfs) are introduced for the source signals, based on two essential speech signal features, harmonicity and sparseness, while the probability density function (pdf) for the room acoustics is defined based on an inverse filtering operation. The Expectation-Maximization (EM) algorithm is used to solve this maximum likelihood problem efficiently. The resultant algorithm elaborates the initial source signal estimate given solely based on its source signal features by integrating them with the room acoustics feature through the Expectation-Maximization (EM) iteration. The effectiveness of the present method is shown in terms of the energy decay curves of the dereverberated impulse responses.

Although the above-described HERB and SBD effectively utilize speech signal features in obtaining dereverberation filters, they do not provide analytical frameworks within which their performance can be optimized. In accordance with one aspect of the present invention, the above-described HERB and SBD are reformulated as a maximum likelihood (ML) estimation problem, in which the source signal is determined as one that maximizes the likelihood function given the observed signals. For this purpose, two probability density functions (pdfs) are introduced for the initial source signal estimates and the dereverberation filter, so as to maximize the likelihood function based on the Expectation-Maximization (EM) algorithm. Experimental results show that the performances of HERB and SBD can be further improved in terms of the energy decay curves of the dereverberated impulse responses given the same number of observed signals. The following descriptions will be directed to the Fourier spectra used in one aspect of the present invention.

Short-Time Fourier Spectra and Longtime Fourier Spectra

One aspect of the present invention is to integrate information on speech signal features, which account for the source characteristics, and on room acoustics features, which account for the reverberation effect. The successive application of short-time frames of the order of tens of milliseconds may be useful for analyzing such time-varying speech features, while a relatively long-time frame of the order of thousands of milliseconds may be often required to compute room acoustics features. One aspect of the present invention is to introduce two types of Fourier spectra based on these two analysis frames, a short-time Fourier spectrum, hereinafter referred to as "STFS" and a long-time Fourier spectrum, hereinafter referred to as "LTFS". The respective frequency components in the STFS and in the LTFS are denoted by a symbol with a suffix "$^{(r)}$" as $s_{l,m,k}^{(r)}$ and another symbol without a suffix as $s_{l,k'}$, where l of $s_{l,k'}$ is the index of the long-time frame for the LTFS, k' is the frequency index for the LTFS, l of $s_{l,m,k}^{(r)}$ is the index of the long-time frame mat includes the short-time frame for the STFS, m of $s_{l,m,k}^{(r)}$ is the index of the short-time frame that is included in the long-time frame, and k of $s_{l,m,k}^{(r)}$ is the frequency index for the STFS.

The short-time frame can be taken as a component of the long-time frame. Therefore, a frequency component in an STFS has both suffixes, l and m. The two spectra are defined as follows:

$$s^{(r)}_{l,m,k} = 1/K^{(r)}\sum_{n=0}^{K^{(r)}-1} g^{(r)}[n]s[t_{l,m}+n]e^{-j2\pi kn/K^{(r)}}, \tag{1}$$

$$s_{l,k} = 1/K\sum_{n=0}^{K-1} g[n]s[t_l+n]e^{-j2\pi kn/K},$$

where s[n] is a digitized waveform signal, $g^{(r)}[n]$ and g[n], $K^{(r)}$ and K, and $t_{l,m}$ and $t_l$ are window functions, the number of discrete Fourier transformation (DFT) points, and time indices for the STFS and the LTFS, respectively. A relationship is set between $t_{l,m}$ and $t_l$ as $t_{l,m}=t_l+m\tau$ for m=0 to M−1 where τ is a frame shift between successive short-time frames. Furthermore, the following normalization condition is introduced:

$$K = \kappa K^{(\tau)}, \tag{2}$$

$$g[n] = \kappa\sum_{m=0}^{M-1} g^{(r)}[n-m\tau].$$

where κ is an integer constant. With this, the following equation holds between STFS, $s_{l,m,k}^{(r)}$ and LTFS, $s_{l,k'}$ where k'=κk:

$$S_{l,k'} = \sum_{m=0}^{M-1} s^{(r)}_{l,m,k}\eta^{-m}, \tag{3}$$

where $\eta=e^{j2\pi k\tau/K^{(r)}}$. An inverse operation is defined, denoted by $LS_{m,k}\{*\}$, that transforms a set of LTFS bins $s_{l,k'}$ for k'=1−K at a long-time frame l, denoted by $\{s_{l,k'}\}_l$, to an STFS bin at a short-time frame m and a frequency index k as:

$$s_{l,m,k}^{(r)}=LS_{m,k}\{\{s_{l,k'}\}_l\}. \tag{4}$$

This transformation can be implemented by cascading an inverse long-time Fourier transformation and a short-time Fourier transformation. Obviously, $LS_{m,k}\{*\}$ is a linear operator.

Three types of representations of a signal, namely, a waveform digitized signal, an short time Fourier spectrum (STFS) and a long time Fourier spectrum (LTFS) contains the same information, and can be transformed from one to another using a known transformation without any major information loss.

Probabilistic Models of Source and Room Acoustics

The following terms are defined:

$x_{l,m,k}^{(r)}$: STFS of the observed reverberant signal $s_{l,m,k}^{(r)}$: STFS of the unknown source signal $\hat{s}_{l,m,k}^{(r)}$: STFS of the initial source signal estimate $w_{k'}$: LTFS of the unknown inverse filter ($k'=\kappa k$) (5)

It is assumed that $x_{l,m,k}^{(r)}$, $s_{l,m,k}^{(r)}$, $\hat{s}_{l,m,k}^{(r)}$ and $w_{k'}$ are the realizations of random processes $X_{l,m,k}^{(r)}$, $S_{l,m,k}^{(r)}$, $\hat{S}_{l,m,k}^{(r)}$ and $W_{k'}$, respectively, and that $\hat{s}_{l,m,k}^{(r)}$ is given from the observed signal based on the features of a speech signal such as harmonicity and sparseness.

In one embodiment of the present invention described in the followings, $s_{l,m,k}^{(r)}$ or $s_{l,k'}$ is dealt with as an unknown parameter, $w_{k'}$ is dealt with as a first random variable of missing data, $x_{l,m,k}^{(r)}$ or $x_{l,k'}$ is dealt with as a part of a second random variable, and $\hat{s}_{l,m,k}^{(r)}$ or $\hat{s}_{l,k'}$ is dealt with as another part of the second random variable.

It is assumed that $x_{l,m,k}^{(r)}$ and $\hat{s}_{l,m,k}^{(r)}$ are given for a certain time duration and $z_k^{(r)}=\{\{x_{l,m,k}^{(r)}\}_k, \{\hat{s}_{l,m,k}^{(r)}\}_k\}$ is given where $\{*\}_k$ represents the time series of STFS bins at a frequency index k. With this, it is assumed that speech can be dereverberated by estimating a source signal that maximizes a likelihood function defined at each frequency index k as:

$$\theta_k = \underset{\Theta_k}{\mathrm{argmax}}\log p\{z_k^{(r)} \mid \Theta_k\} \tag{6}$$

$$= \underset{\Theta_k}{\mathrm{argmax}}\log\int p\{w_{k'}, z_k^{(r)} \mid \Theta_k\}dw_{k'},$$

where $\Theta_k=\{S_{l,m,k}^{(r)}\}_k$, $\theta_k=\{s_{l,m,k}^{(r)}\}_k$, and $k'=\kappa k$ is a frequency index for LTFS bins. The integral in the above equation of $\theta_k$ is a simple double integral on the real and imaginary parts of $w_{k'}$. The inverse filter $w_{k'}$, which is not observed, is dealt with as missing data in the above likelihood function and is marginalized through the integration. To analyze this function, it is further assumed that $\{\hat{S}_{l,m,k}^{(r)}\}_k$ and the joint event of $\{X_{l,m,k}^{(r)}\}_k$ and $w_{k'}$ are statistically independent given $\{S_{l,m,k}^{(r)}\}_k$. With this, $p\{w_{k'}, z_k|\Theta_k\}$ in the above equation (6) can be divided into two functions as:

$$p\{w_{k'},z_k|\Theta_k\}=p\{w_{k'},\{x_{l,m,k}^{(r)}\}_k|\Theta_k\}p\{\{\hat{s}_{l,m,k}^{(r)}\}_k|\Theta_k\}. \tag{7}$$

The former is a probability density function (pdf) related to room acoustics, that is, the joint probability density function (pdf) of the observed signal and the inverse filter given the source signal. The latter is another probability density function (pdf) related to the information provided by the initial estimation, that is, the probability density function (pdf) of the initial source signal estimate given the source signal. The second component can be interpreted as being the probabilistic presence of the speech features given the true source signal. They will hereinafter be referred to "acoustics probability density function (acoustics pdf)" and "source probability density function (source pdf)", respectively. Ideally, the inverse transfer function $w_{k'}$ transforms $x_{l,k'}$ into $s_{l,k'}$, that is, $w_{k'}x_{l,k'}=s_{l,k'}$. However, in a real acoustical environment, this equation may contain a certain error $\epsilon_{l,k'}^{(a)}=w_{k'}x_{l,k'}-s_{l,k'}$ for such reasons as insufficient inverse filter length and fluctuation of room transfer function. Therefore, the acoustics pdf can be considered as a probability density function (pdf) for this error as $p\{w_{k'},\{x_{l,m,k}^{(r)}\}_k|\Theta_k\}=p\{\{\epsilon_{l,k'}^{(a)}\}_k|\Theta_k\}$. Similarly, the source probability density function (source pdf) can be considered as another probability density function (pdf) for the error $\epsilon_{l,m,k}^{(sr)}=\hat{s}_{l,m,k}^{(r)}-S_{l,m,k}^{(r)}$ as $p\{\{\hat{s}_{l,m,k}^{(r)}\}_k|\Theta_k\}=p\{\{\epsilon_{l,m,k}^{(sr)}\}_k|\Theta_k\}$, or the difference between the source signal and the feature-based signal. For the sake of simplicity, it is assumed that these errors to be sequentially independent random processes given $\{S_{l,m,k}^{(r)}\}_k$. It is assumed that the real and imaginary parts of the above two error processes are mutually independent with the same variances and can individually be modeled by Gaussian random processes with zero means. With these assumptions, the error probability density functions (error pdfs) are represented as:

$$p\{\{\varepsilon_{l,k'}^{(a)}\}_{k'} \mid \Theta_k\} = \prod_{l} b_{l,k}^{(a)} \exp\left\{-\frac{|\varepsilon_{l,k'}^{(a)}|^2}{2\sigma_{l,k'}^{(a)}}\right\}, \tag{8}$$

$$p\{\{\varepsilon_{l,m,k}^{(sr)}\}_k \mid \Theta_k\} = \prod_{l}\prod_{m} b_{l,m,k}^{(sr)} \exp\left\{-\frac{|\varepsilon_{l,m,k}^{(sr)}|^2}{2\sigma_{l,m,k}^{(sr)}}\right\},$$

where $\sigma_{l,k'}^{(a)}$ and $\sigma_{l,m,k}^{(sr)}$ are, respectively, variances for the two probability density functions (pdfs), hereafter referred to as acoustic ambient uncertainty and source signal uncertainty. It is assumed that these two values are given based on the features of the speech signals and room acoustics.

Explanation of the EM Algorithm

The Expectation-Maximization (EM) algorithm is an optimization methodology for finding a set of parameters that maximize a given likelihood function that includes missing data. This is disclosed by A. P. Dempster, N. M. Laird, and D. B. Rubin, in "maximum likelihood from incorporate data via the EM algorithm," Journal of the Royal Statistical Society, Series B, 39(1): 1-38, 1977. In general, a likelihood function is represented as:

$$\begin{aligned} \mathcal{L}(\Theta) &= p\{X = x \mid \Theta\}, \\ &= \int p\{X = x, Y = y \mid \Theta\} dy, \end{aligned} \tag{9}$$

where $p\{*|\Theta\}$ represents a probability density function (pdf) of random variables under a condition where a set of parameters, $\Theta$, is given, and X and Y are the random variables. X=x means that x is given as the observed data on X. In the above likelihood function, Y is assumed not to be observed, referred to as missing data, and thus the probability density function (pdf) is marginalized with Y. The maximum likelihood problem can be solved by finding a realization of the parameter set, $\Theta=\theta$, that maximizes the likelihood function.

In accordance with the Expectation-Maximization (EM) algorithm, the expectation step (E-step) with an auxiliary function $Q\{\Theta|\theta\}$ and the maximization step (M-step), respectively, are defined as:

$$\begin{aligned} E\text{-step: } Q\{\Theta \mid \theta\} &= E_{|\theta}\{\log p\{X = x, Y \mid \Theta\} \mid \Theta = \theta\}, \\ &= \int p\{X = x, Y = y \mid \Theta = \theta\} \\ &\quad \log p\{X = x, Y = y \mid \Theta\} dy, \\ M\text{-step: } \tilde{\theta} &= \underset{\Theta}{\operatorname{argmax}}\, Q\{\Theta \mid \theta\}, \end{aligned} \tag{10}$$

where $E_{|\theta}\{*|\theta\}$ in an upper one of the above equations (10) labeled "E-step" is an expectation function under a condition where $\Theta=\theta$ is fixed, which is more specifically defined as the second line of the equations in E-step. The likelihood function $L\{\Theta\}$ is shown to increase by updating $\Theta=\theta$ with $\Theta=\tilde{\theta}$ through one iteration of the expectation step (E-step) and the maximization step (M-step), where $Q\{\Theta|\theta\}$ is calculated in the expectation step (E-step) while $\Theta=\tilde{\theta}$ that maximizes $Q\{\Theta|\theta\}$ obtained in the maximization step (M-step). The solution to the maximum likelihood problem is obtained by repeating the iteration.

Solution Based on EM Algorithm

One effective way for solving the above equation (6) of $\theta_k$ is to use the above-described Expectation-Maximization (EM) algorithm. With this approach, the expectation step (E-step) with an auxiliary function $Q(\Theta_k|\theta_k)$ and the maximization step (M-step), respectively, are defined for speech dereverberation as:

$$\begin{aligned} Q(\Theta_k|\theta_k) &= E_{|\theta}\{\log p\{W_{k'}, Z_k^{(r)} = z_k^{(r)}|\Theta_k\}|\Theta_k = \theta_k\}, \\ &= \int p\{W_{k'} = w_{k'}, Z_k^{(r)} = z_k^{(r)}|\Theta_k = \theta_k\} \\ &\quad \log p\{W_{k'} = w_{k'}, Z_k^{(r)} = z_k^{(r)} = z_k^{(r)}|\Theta_k\}, \\ \tilde{\theta}_k &= \underset{\Theta_k}{\operatorname{argmax}}\, Q(\Theta_k|\theta_k), \end{aligned} \tag{11}$$

where, $z_k^{(r)}$ is assumed to be a realization of a random process of:

$$Z_k^{(r)}=\{\{X_{l,m,k}^{(r)}\}_k, \{\hat{S}_{l,m,k}^{(r)}\}_k\}.$$

In accordance with the EM algorithm, the log-likelihood $\log p\{z_k^{(r)}|\theta_k\}$ increases by updating $\theta_k$ with $\tilde{\theta}_k$ obtained through an EM iteration, and it converges to a stationary point solution by repeating the iteration.

Solution

Instead of directly calculating the E-step and M-step, $Q(\Theta_k|\theta_k)-Q(\theta_k|\theta_k)$ is analyzed because it has its maximum value at the same $\Theta_k$ as $Q(\Theta_k|\theta_k)$. After a certain arrangement of $Q(\Theta_k|\theta_k)-Q(\theta_k|\theta_k)$ and only extracting the terms that involve $\Theta_k$, thereby obtaining the following function.

$$Q_{\Theta}\{\Theta_k|\theta_k\} = \sum_{l}\left\{\frac{-|\overline{w}_{k'}x_{l,k'} - S_{l,k'}|^2}{2\sigma_{l,k'}^{(a)}} + \sum_{m}\frac{-|\hat{s}_{l,m,k}^{(r)} - S_{l,m,k}^{(r)}|^2}{2\sigma_{l,m,k}^{(sr)}}\right\}, \tag{12}$$

$$\text{where } \overline{w}_{k'} = \frac{\sum_l s_{l,k'}x_{l,k'}^* / \sigma_{l,k'}^{(a)}}{\sum_l x_{l,k'}x_{l,k'}^* / \sigma_{l,k'}^{(a)}}.$$

where "*" means a complex conjugate. It should be noted that the $\Theta_k$ that maximizes $Q_{\Theta}\{\Theta_k|\theta_k\}$ also maximizes $Q(\Theta_k|\theta_k)$, and the $\Theta_k$ that makes $Q_{\Theta}\{\Theta_k|\theta_k\}>Q_{\Theta}\{\theta_k|\theta_k\}$ and also makes $Q(\Theta_k|\theta_k)>Q(\theta_k|\theta_k)$. $\Theta_k$ that maximizes $Q_{\Theta}\{\Theta_k|\theta_k\}$ can be obtained by differentiating it with $S_{l,m,k}^{(r)}$, setting it at zero, and solving the resultant simultaneous equations. However, the computational cost of obtaining the solution is rather high because it is needed to solve this equation with M unknown variables for each l and k.

Instead, to maximize $Q_{\Theta}\{\Theta_k|\theta_k\}$ of the above equation (12) in a more efficient way, the following assumption is introduced. The power of an LTFS bin can be approximated by the sum of the power of the STFS bins that compose the LTFS bin based on the above equation (3), that is:

$$|s_{l,k'}|^2 \simeq \sum_{m=0}^{M-1} |s_{l,m,k}^{(r)}|^2. \tag{13}$$

With this assumption, $Q_{\Theta}\{\Theta_k|\theta_k\}$ given by the above equation (12) can be rewritten as:

$$Q_{\Theta}\{\Theta_k|\theta_k\} = \sum_{l}\sum_{m}\frac{-|LS_{m,k}\{\{\overline{w}_{k'}x_{l,k'}\}l\} - S_{l,m,k}^{(r)}|^2}{2\sigma_{l,k'}^{(a)}} + \tag{14}$$

-continued $$\sum_{l}\sum_{m}\frac{-|\hat{s}^{(r)}_{l,m,k}-S^{(r)}_{l,m,k}|^2}{2\sigma^{(sr)}_{l,m,k}}.$$

By differentiating the above equation and setting it at zero, a closed form solution can be obtained for $\tilde{\theta}_k$ given by the M-step of the above equation (11) as follows:

$$\bar{s}^{(r)}_{l,m,k}=\frac{\sigma^{(sr)}_{l,m,k}LS_{m,k}\{\{\overline{w}_{k'}x_{l,k'}\}l\}+\sigma^{(a)}_{l,k'}\hat{s}^{(r)}_{l,m,k}}{\sigma^{(a)}_{l,k'}+\sigma^{(sr)}_{l,m,k}}. \tag{15}$$

Discussion

With this approach, the dereverberation is achieved by repeatedly calculating $\tilde{w}_{k'}$ given by the above equation (12) and $\tilde{s}_{l,m,k}^{(r)}$ given by the above equation (15) in turn.

$\tilde{w}_{k'}$ in the above equation (12) corresponds to the dereverberation filter obtained by the conventional HERB and SBD approaches given the initial source signal estimates as $s_{l,k'}$ and the observed signals as $x_{l,k'}$.

The above equation (15) updates the source estimate by a weighted average of the initial source signal estimate $\hat{s}_{l,m,k}^{(r)}$ and the source estimate obtained by multiplying $x_{l,k'}$ by $\tilde{w}_{k'}$. The weight is determined in accordance with the source signal uncertainty and acoustic ambient uncertainty. In other words, one EM iteration elaborates the source estimate by integrating two types of source estimates obtained based on source and room acoustics properties.

From a different point of view, the inverse filter estimate $w_{k'}=\tilde{w}_{k'}$ calculated by the above equation (12) can be taken as one that maximizes the likelihood function that is defined as follows under the condition where $\theta_k$ is fixed, $$\begin{aligned} L\{w_{k'},\theta_k\} &= p\{w_{k'},z_k^{(r)}|\theta_k\} \\ &= p\{w_{k'},\{x^{(r)}_{l,m,k}\}_k|\theta_k\}p\{\{\hat{s}^{(r)}_{l,m,k}\}_k|\theta_k\}, \end{aligned} \tag{16}$$

where the same definitions as the above equation (8) are adopted for the probability density functions (pdfs) in the above likelihood function. In addition, the source signal estimate $\theta_k=\tilde{\theta}_k$ calculated by the above equation (15) also maximizes the above likelihood function under the condition where the inverse filter estimate $\tilde{w}_{k'}$ is fixed. Therefore, the inverse filter estimate $\tilde{w}_{k'}$ and the source signal estimate $\tilde{\theta}_k$ that maximize the above likelihood function can be obtained by repeatedly calculating the above equations (12) and (15), respectively. In other words, the inverse filter estimate $\tilde{w}_{k'}$ that maximizes the above likelihood function can be calculated through this iterative optimization algorithm.

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

FIRST EMBODIMENT

FIG. 1 is a block diagram illustrating an apparatus for speech dereverberation based on probabilistic models of source and room acoustics in accordance with a first embodiment of the present invention. A speech dereverberation apparatus 10000 can be realized by a set of functional units that are cooperated to receive an input of an observed signal x[n] and generate an output of a waveform signal s̃[n]. Each of the functional units may comprise either a hardware and/or software that is constructed and/or programmed to carry out a predetermined function. The terms "adapted" and "configured" are used to describe a hardware and/or a software that is constructed and/or programmed to carry out the desired function or functions. The speech dereverberation apparatus 10000 can be realized by, for example, a computer or a processor. The speech dereverberation apparatus 10000 performs operations for speech dereverberation. A speech dereverberation method can be realized by a program to be executed by a computer.

The speech dereverberation apparatus 10000 may typically include an initialization unit 1000, a likelihood maximization unit 2000 and an inverse short time Fourier transform unit 4000. The initialization unit 1000 may be adapted to receive the observed signal x[n] that can be a digitized waveform signal, where n is the sample index. The digitized waveform signal x[n] may contain a speech signal with an unknown degree of reverberance. The speech signal can be captured by an apparatus such as a microphone or microphones. The initialization unit 1000 may be adapted to extract, from the observed signal, an initial source signal estimate and uncertainties pertaining to a source signal and an acoustic ambient. The initialization unit 1000 may also be adapted to formulate representations of the initial source signal estimate, the source signal uncertainty and the acoustic ambient uncertainty. These representations are enumerated as ŝ[n] that is the digitized waveform initial source, signal estimate, $\sigma_{l,m,k}^{(sr)}$ that is the variance or dispersion representing the source signal uncertainty, and $\sigma_{l,k'}^{(a)}$ that is the variance or dispersion representing the acoustic ambient uncertainty, for all indices l, m, k, and k'. Namely, the initialization unit 1000 may be adapted to receive the input of the digitized waveform signal x[n] as the observed signal and to generate the digitized waveform initial source signal estimate ŝ[n], the variance or dispersion $\sigma_{l,m,k}^{(sr)}$ representing the source signal uncertainty, and the variance or dispersion $\sigma_{l,k'}^{(a)}$ representing the acoustic ambient uncertainty.

The likelihood maximization unit 2000 may be cooperated with the initialization unit 1000. Namely, the likelihood maximization unit 2000 may be adapted to receive inputs of the digitized waveform initial source signal estimate ŝ[n], the source signal uncertainty $\sigma_{l,m,k}^{(sr)}$, and the acoustic ambient uncertainty $\sigma_{l,k'}^{(a)}$ from the initialization unit 1000. The likelihood maximization unit 2000 may also be adapted to receive another input of the digitized waveform observed signal x[n] as the observed signal. ŝ[n] is the digitized waveform initial source signal estimate. $\sigma_{l,m,k}^{(sr)}$ is a first variance representing the source signal uncertainty. $\sigma_{l,k'}^{(a)}$ is the second variance representing the acoustic ambient uncertainty. The likelihood maximization unit 2000 may also be adapted to determine a source signal estimate $\theta_k$ that maximizes a likelihood function, wherein the determination is made with reference to the digitized waveform observed signal x[n], the digitized waveform initial source signal estimate ŝ[n], the first variance $\sigma_{l,m,k}^{(sr)}$ representing the source signal uncertainty, and the second variance $\sigma_{l,k'}^{(a)}$ representing the acoustic ambient uncertainty. In general, the likelihood function may be defined based on a probability density fraction that is evaluated in accordance with an unknown parameter defined with reference to the source signal estimate, a first random variable of missing data representing an inverse filter of a room transfer function, and a second random variable of observed data defined with reference to the observed signal and the initial source signal estimate. The determination of the source signal estimate $\theta_k$ is carried out using an iterative optimization algorithm.

A typical example of the iterative optimization algorithm may include, but is not limited to, the above-described expectation-maximization algorithm. In one example, the likelihood maximization unit 2000 may be adapted to search for source signals, $\theta_k=\{\tilde{s}_{l,m,k}^{(r)}\}_k$ for all k, and estimate a source signal that maximizes a likelihood function defined as:

$$\mathcal{L}\{\theta_k\}=\log p\{z_k^{(r)}|\Theta_k=\theta_k\}$$

where $z_k^{(r)}=\{\{x_{l,m,k}^{(r)}\}_k,\{\hat{s}_{l,m,k}^{(r)}\}_k\}$ is the joint event of a short-time observation $x_{l,m,k}^{(r)}$ and the initial source signal estimate $\hat{s}_{l,m,k}^{(r)}$ at the moment. The details of this function have already been described with reference to the above equation (6). Consequently, the likelihood maximization unit 2000 may be adapted to determine and output the source signal estimate $\tilde{s}_{l,m,k}^{(r)}$ that maximizes the likelihood function.

The inverse short time Fourier transform unit 4000 may be cooperated with the likelihood maximization unit 2000. Namely, the inverse short time Fourier transform unit 4000 may be adapted to receive, from the likelihood maximization unit 2000, inputs of the source signal estimates $\tilde{s}_{l,m,k}^{(r)}$ that maximizes the likelihood function. The inverse short time Fourier transform unit 4000 may also be adapted to transform the source signal estimate $\tilde{s}_{l,m,k}^{(r)}$ into a digitized waveform signal $\tilde{s}[n]$ and output the digitized waveform, signal $\tilde{s}[n]$.

Figure 2:
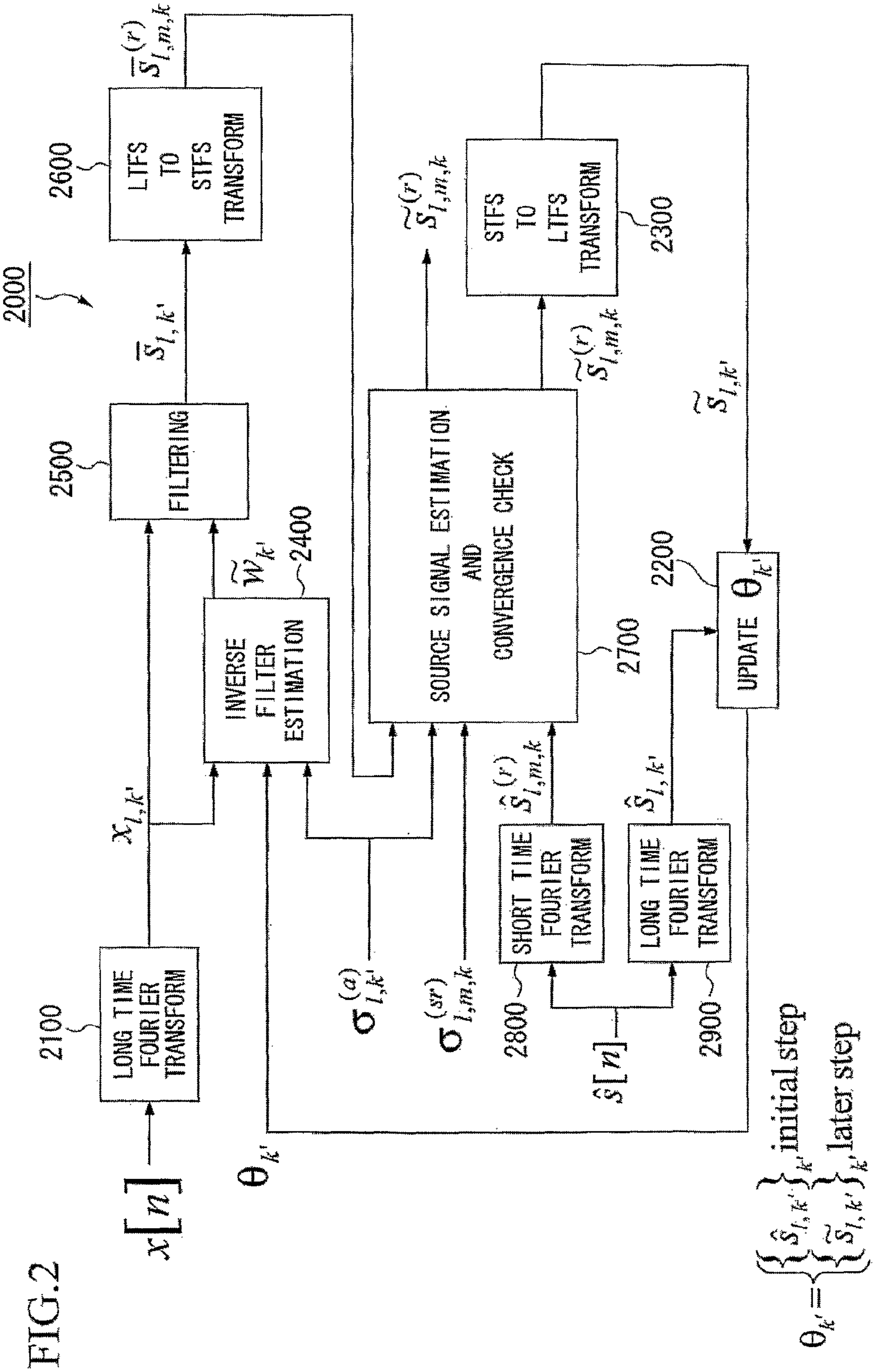
FIG. 2 is a block diagram illustrating a configuration of a likelihood maximization unit included in the speech dereverberation apparatus shown in FIG. 1.

The likelihood maximization unit 2000 can be realized by a set of sub-functional units that are cooperated with each other to determine and output the source signal estimate $\tilde{s}_{l,m,k}^{(r)}$ that maximizes the likelihood function. FIG. 2 is a block diagram illustrating a configuration of the likelihood maximization unit 2000 shown in FIG. 3. In one case, the likelihood maximization unit 2000 may further include a long-time Fourier transform unit 2100, an update unit 2200, an STFS-to-LTFS transform unit 2300, an inverse filter estimation unit 2400, a filtering unit 2500, an LTFS-to-STFS transform unit 2600, a source signal estimation and convergence check unit 2700, a short time Fourier transform unit 2800, and a long time Fourier transform unit 2900. Those units are cooperated to continue to perform iterative operations until the source signal estimate that maximizes the likelihood function has been determined.

The long-time Fourier transform unit 2100 is adapted to receive the digitized waveform observed signal x[n] as the observed signal from the initialization unit 1000. The long-time Fourier transform unit 2100 is also adapted to perform a long-time Fourier transformation of the digitized waveform observed signal x[n] into a transformed observed signal $x_{l,k'}$ as long term Fourier spectra (LTFSs).

The short-time Fourier transform unit 2800 is adapted to receive the digitized waveform initial source signal estimate $\hat{s}[n]$ the initialization unit 1000. The short-time Fourier transform unit 2800 is adapted to perform a short-time Fourier transformation of the digitized waveform initial source signal estimate $\hat{s}[n]$ into an, initial source signal estimate $\hat{s}_{l,m,k}^{(r)}$.

The long-time Fourier transform unit 2900 is adapted to receive the digitized waveform initial source signal estimate $\hat{s}[n]$ from the initialization unit 1000. The long-time Fourier transform unit 2900 is adapted to perform a long-time Fourier transformation of the digitized waveform initial source signal estimate $\hat{s}[n]$ into an initial source signal estimate $\hat{s}_{l,k'}$.

The update unit 2200 is cooperated with the long-time Fourier transform unit 2900 and the STFS-to-LTFS transform unit 2300. The update unit 2200 is adapted to receive an initial source signal estimate $\hat{s}_{l,k'}$ in the initial step of the iteration from the long-time Fourier transform unit 2900 and is further adapted to substitute the source signal estimate $\theta_{k'}$ for $\{\hat{s}_{l,k'}\}_{k'}$. The update unit 2200 is furthermore adapted to send the updated source signal estimate $\theta_{k'}$ to the inverse filter estimation unit 2400. The update unit 2200 is also adapted to receive a source signal, estimate $\hat{s}_{l,k'}$ in the later step of the iteration from the STFS-to-LTFS transform unit 2300, and to substitute the source signal estimate $\theta_{k'}$ for $\{\tilde{s}_{l,k'}\}_{k'}$. The update unit 2200 is also adapted to send the updated source signal estimate $\theta_{k'}$ to the inverse filter estimation unit 2400.

The inverse filter estimation unit 2400 is cooperated with the long-time Fourier transform unit 2100, the update unit 2200 and the initialization unit 1000. The inverse filter estimation unit 2400 is adapted to receive the observed signal $x_{l,k'}$ from the long-time Fourier transform unit 2100. The inverse filter estimation unit 2400 is also adapted to receive the updated source signal estimate $\theta_{k'}$ from the update unit 2200. The inverse filter estimation unit 2400 is also adapted to receive the second variance $\sigma_{l,k'}^{(a)}$ representing the acoustic ambient uncertainty from the initialization unit 1000. The inverse filter estimation unit 2400 is further adapted to calculate an inverse filter estimate $\tilde{w}_{k'}$, based on the observed signal $x_{l,k'}$, the updated source signal estimate $\theta_{k'}$, and the second variance $\sigma_{l,k'}^{(a)}$ representing the acoustic ambient uncertainty in accordance with the above equation (12). The inverse filter estimation unit 2400 is further adapted to output the inverse filter estimate $\tilde{w}_{k'}$.

The filtering unit 2500 is cooperated with the long-time Fourier transform unit 2100 and the inverse filter estimation unit 2400. The filtering unit 2500 is adapted to receive the observed signal $x_{l,k'}$ from the long-time Fourier transform unit 2100. The filtering unit 2500 is also adapted to receive the inverse filter estimate $\tilde{w}_{k'}$ from the inverse filter estimation unit 2400. The filtering unit 2500 is also adapted to apply the observed signal $x_{l,k'}$ to the inverse filter estimate $\tilde{w}_{k'}$ to generate a filtered source signal estimate $\bar{s}_{l,k'}$. A typical example of the filtering process for applying the observed signal $x_{l,k'}$ to the inverse filter estimate $\tilde{w}_{k'}$ may include, but is not limited to, calculating a product $\tilde{w}_{k'}x_{l,k'}$ of the observed signal $x_{l,k'}$ and the inverse filter estimate $\tilde{w}_{k'}$. In this case, the filtered source signal estimate $\bar{s}_{l,k'}$ is given by the product $\tilde{w}_{k'}x_{l,k'}$ of the observed signal $x_{l,k'}$ and the inverse filter estimate $\tilde{w}_{k'}$.

The LTFS-to-STFS transform unit 2600 is cooperated with the filtering unit 2500. The LTFS-to-STFS transform unit 2600 is adapted to receive the filtered source signal estimate $\bar{s}_{l,k'}$ from the filtering unit 2500. The LTFS-to-STFS transform unit 2600 is further adapted to perform an LTFS-to-STFS transformation of the filtered source signal estimate $\bar{s}_{l,k'}$ into a transformed filtered source signal estimate $\bar{s}_{l,m,k}^{(r)}$. When the filtering process is to calculate the product $\tilde{w}_{k'}x_{l,k'}$ the observed signal $x_{l,k'}$ and the inverse filter estimate $\tilde{w}_{k'}$, the LTFS-to-STFS transform unit 2600 is further adapted to perform an LTFS-to-STFS transformation of the product $\tilde{w}_{k'}x_{l,k'}$ into a transformed signal $LS_{m,k}\{\{\tilde{w}_{k'}x_{l,k'}\}_l\}$. In this case, the product $\tilde{w}_{k'}x_{l,k'}$ represents the filtered source signal estimate $\bar{s}_{l,k'}$, and the transformed signal $LS_{m,k}\{\{\tilde{w}_{k'}x_{l,k'}\}_l\}$ represents the transformed filtered source signal estimate $\bar{s}_{l,m,k}^{(r)}$.

The source signal estimation and convergence check unit 2700 is cooperated with the LTFS-to-STFS transform unit 2600, the short time Fourier transform unit 2800, and the initialization unit 1000. The source signal estimation and convergence check unit 2700 is adapted to receive the transformed filtered source signal estimate $\bar{s}_{l,m,k}^{(r)}$ from the LTFS-to-STFS transform unit 2600. The source signal estimation and convergence check unit 2700 is also adapted to receive, from the initialization unit 1000, the first variance $\bar{\sigma}_{l,m,k}^{(sr)}$ representing the source signal uncertainty and the second variance $\sigma_{l,k'}^{(a)}$ representing the acoustic ambient uncertainty. The source signal estimation and convergence check unit 2700 is also adapted to receive the initial source signal estimate $\hat{s}_{l,m,k}^{(r)}$ from the short-time Fourier transform unit 2800. The source signal estimation and convergence check unit 2700 is further adapted to estimate a source signal $\tilde{s}_{l,m,k}^{(r)}$ based on the transformed filtered source signal estimate $\bar{s}_{l,m,k}^{(r)}$, the first variance $\sigma_{l,m,k}^{(sr)}$ representing the source signal uncertainty, the second variance $\sigma_{l,k'}^{(a)}$ representing the acoustic ambient uncertainty and the initial source signal estimate $\hat{s}_{l,m,k}^{(r)}$, wherein the estimation is made in accordance with the above equation (15).

The source signal estimation and convergence check unit 2700 is furthermore adapted to determine the status of convergence of the iterative procedure, for example, by comparing a current value of the source signal estimate $\tilde{s}_{l,m,k}^{(r)}$ that has currently been estimated to a previous value of the source signal estimate $\tilde{s}_{l,m,k}^{(r)}$ that has previously been estimated, and checking whether or not the current value deviates from the previous value by less than a certain predetermined amount. If the source signal estimation and convergence check unit 2700 confirms that the current value of the source signal estimate $\tilde{s}_{l,m,k}^{(r)}$ deviates from the previous value thereof by less than the certain predetermined amount, then the source signal estimation and convergence check unit 2700 recognizes that the convergence of the source signal estimate $\tilde{s}_{l,m,k}^{(r)}$ has been obtained. If the source signal estimation and convergence check unit 2700 confirms that the current value of the source signal estimate $\tilde{s}_{l,m,k}^{(r)}$ deviates from the previous value thereof by not less than the certain predetermined amount, then the source signal estimation and convergence check unit 2700 recognizes that the convergence of the source signal estimate $\tilde{s}_{l,m,k}^{(r)}$ has not yet been obtained.

It is possible as a modification that the iterative procedure is terminated when the number of iterations reaches a certain predetermined value. Namely, the source signal estimation and convergence check unit 2700 has confirmed that the number of iterations reaches a certain predetermined value, then the source signal estimation and convergence check unit 2700 recognizes mat the convergence of the source signal estimate $\tilde{s}_{l,m,k}^{(r)}$ has been obtained. If the source signal estimation and convergence check unit 2700 has confirmed that the convergence of the source signal estimate $\tilde{s}_{l,m,k}^{(r)}$ has been obtained, then the source signal, estimation and convergence check unit 2700 provides the source signal estimate $\tilde{s}_{l,m,k}^{(r)}$ as a first output to the inverse short time Fourier transform unit 4000. If the source signal estimation and convergence check unit 2700 has confirmed that the convergence of the source signal estimate $\tilde{s}_{l,m,k}^{(r)}$ has not yet been obtained, then the source signal estimation and convergence check unit 2700 provides the source signal estimate $\tilde{s}_{l,m,k}^{(r)}$ as a second output to the STFS-to-LTFS transform unit 2300.

The STFS-to-LTFS transform unit 2300 is cooperated with the source signal estimation and convergence check unit 2700. The STFS-to-LTFS transform unit 2300 is adapted to receive the source signal estimate $\tilde{s}_{l,m,k}^{(r)}$ from the source signal estimation and convergence check unit 2700. The STFS-to-LTFS transform unit 2300 is adapted to perform an STFS-to-LTFS transformation of the source signal estimate $\tilde{s}_{l,m,k}^{(r)}$ into a transformed source signal estimates $\tilde{s}_{l,k'}$.

In the later steps of the iteration operation, the update unit 2200 receives the source signal estimates $\tilde{s}_{l,k'}$ from the STFS-to-LTFS transform unit 2300, and to substitute the source signal estimate $\theta_{k'}$ for $\{\tilde{s}_{l,k'}\}_{k'}$ and send the updated source signal estimate $\theta_{k'}$ to the inverse filter estimation unit 2400.

The above-described iteration procedure will be continued until the source signal estimation and convergence check unit 2700 has confirmed that the convergence of the source signal estimate $\tilde{s}_{l,m,k}^{(r)}$ has been obtained. In the initial step of iteration, the updated source signal estimate $\theta_{k'}$ is $\{\hat{s}_{l,k'}\}_{k'}$ that is supplied from the long time Fourier transform unit 2900. In the second or later steps of the iteration, the updated source signal estimate $\theta_{k'}$ is $\{\tilde{s}_{l,k'}\}_{k'}$.

If the source signal estimation, and convergence check unit 2700 has confirmed that the convergence of the source signal estimate $\tilde{s}_{l,m,k}^{(r)}$ has been obtained, then the source signal estimation and convergence check unit 2700 provides the source signal estimates $\tilde{s}_{l,m,k}^{(r)}$ as a first output to the inverse short time Fourier transform unit 4000. The inverse short time Fourier transform unit 4000 may be adapted to transform the source signal estimate $\tilde{s}_{l,m,k}^{(r)}$ into a digitized waveform signal $\tilde{s}[n]$ and output the digitized waveform signal $\tilde{s}[n]$.

Operations of the likelihood maximization unit 2000 will be described with reference to FIG. 2.

In the initial step of iteration, the digitized waveform observed signal x[n] is supplied to the long-time Fourier transform unit 2100 from the initialization unit 1000. The long-time Fourier transformation is performed by the long-time Fourier transform unit 2100 so that the digitized waveform observed signal x[n] is transformed into the transformed observed signal $x_{l,k'}$ as long term Fourier spectra (LTFSs). The digitized waveform initial source signal estimate $\hat{s}[n]$ is supplied from the initialization unit 1000 to the short-time Fourier transform unit 2800 and the long-time Fourier transform unit 2900. The short-time Fourier transformation is performed by the short-time Fourier transform unit 2800 so that the digitized waveform initial source signal estimate $\hat{s}[n]$ is transformed into the initial source signal estimate $\hat{s}_{l,m,k}^{(r)}$. The long-time Fourier transformation is performed by the long-time Fourier transform, unit 2900 so that the digitized waveform initial source signal estimate $\hat{s}[n]$ is transformed into the initial source signal estimate $\hat{s}_{l,k'}$.

The initial source signal estimate $\hat{s}_{l,k'}$ is supplied from the long-time Fourier transform unit 2900 to the update unit 2200. The source signal estimate $\theta_{k'}$ is substituted for the initial source signal estimate $\{\hat{s}_{l,k'}\}_{k'}$ by the update unit 2200. The initial source signal estimate $\theta_{k'}=\{\hat{s}_{l,k'}\}_{k'}$ is then supplied from the update unit 2200 to the inverse filter estimation unit 2400. The observed signal $x_{l,k'}$ is supplied from the long-time Fourier transform unit 2100 to the inverse filter estimation unit 2400. The second variance $\sigma_{l,k'}^{(a)}$ representing the acoustic ambient uncertainty is supplied from the initialization unit 1000 to the inverse filter estimation unit 2400. The inverse filter estimate $\tilde{w}_{k'}$ is calculated by the inverse filter estimation unit 2400 based on the observed signal $x_{l,k'}$, the initial source signal estimate $\theta_{k'}$, and the second variance $\sigma_{l,k'}^{(a)}$ representing the acoustic ambient uncertainty, wherein the calculation is made in accordance with the above equation (12).

The inverse filter estimate $\tilde{w}_{k'}$ is supplied from the inverse filter estimation unit 2400 to the filtering unit 2500. The observed signal $x_{l,k'}$ is further supplied from the long-time Fourier transform unit 2100 to the filtering unit 2500. The inverse filter estimate $\tilde{w}_{k'}$ is applied by the filtering unit 2500 to the observed signal $x_{l,k'}$ to generate the filtered source signal estimate $\bar{s}_{l,k'}$. A typical example of the filtering process for applying the observed signal $x_{l,k'}$ to the inverse filter estimate $\tilde{w}_{k'}$ may be to calculate the product $\tilde{w}_{k'}x_{l,k'}$ of the observed signal $x_{l,k'}$ and the inverse filter estimate $\tilde{w}_{k'}$. In this case, the filtered source signal estimate $\bar{s}_{l,k'}$ is given by the product $\tilde{w}_{k'}x_{l,k'}$ of the observed signal $x_{l,k'}$ and the inverse filter estimate $\tilde{w}_{k'}$.

The filtered source signal estimate $\bar{s}_{l,k'}$ is supplied from the filtering unit 2500 to the LTFS-to-STFS transform unit 2600. The LTFS-to-STFS transformation is performed by the LTFS-to-STFS transform unit 2600 so that the filtered source signal estimate $\bar{s}_{l,k'}$ is transformed into the transformed filtered source signal estimate $\bar{s}_{l,m,k}^{(r)}$. When the filtering process is to calculate the product $\tilde{w}_{k'}x_{l,k'}$ of the observed signal $x_{l,k'}$ and the inverse filter estimate $\tilde{w}_{k'}$, the product $\tilde{w}_{k'}x_{l,k'}$ is transformed into a transformed signal $LS_{m,k}\{\{\tilde{w}_{k'}x_{l,k'}\}_l\}$.

The transformed filtered source signal estimate $\bar{s}_{l,m,k}^{(r)}$ is supplied from the LTFS-to-STFS transform unit 2600 to the source signal estimation and convergence check unit 2700. Both the first variance $\sigma_{l,m,k}^{(sr)}$ representing the source signal uncertainty and the second variance $\sigma_{l,k'}^{(a)}$ representing the acoustic ambient uncertainty are supplied from the initialization unit 1000 to the source signal estimation and convergence check unit 2700. The initial source signal estimate $\hat{s}_{l,m,k}^{(r)}$ is supplied from the short-time Fourier transform unit 2800 to the source signal estimation and convergence check unit 2700. The source signal estimate $\tilde{s}_{l,m,k}^{(r)}$ is calculated by the source signal estimation and convergence check unit 2700 based on the transformed filtered source signal estimate $\bar{s}_{l,m,k}^{(r)}$, the first variance $\sigma_{l,m,k}^{(sr)}$ representing the source signal uncertainty, the second variance $\sigma_{l,k'}^{(a)}$ representing the acoustic ambient uncertainty and the initial source signal estimate $\hat{s}_{l,m,k}^{(r)}$, wherein the estimation is made in accordance with the above equation (15).

In the initial step of iteration, the source signal estimate $\tilde{s}_{l,m,k}^{(r)}$ is supplied from the source signal estimation and convergence check unit 2700 to the STFS-to-LTFS transform unit 2300 so that the source signal estimate $\tilde{s}_{l,m,k}^{(r)}$ is transformed into the transformed source signal estimate $\tilde{s}_{l,k'}$. The transformed source signal estimate $\tilde{s}_{l,k'}$ is supplied from the STFS-to-LTFS transform unit 2300 to the update unit 2200. The source signal estimate $\theta_{k'}$ is substituted for the transformed source signal estimate $\{\tilde{s}_{l,k'}\}_{k'}$ by the update unit 2200. The updated source signal estimate $\theta_{k'}$ is supplied from the update unit 2200 to the inverse filter estimation unit 2400.

In the second or later steps of iteration, the source signal estimate $\theta_{k'}=\{\tilde{s}_{l,k'}\}_{k'}$ is then supplied from the update unit 2200 to the inverse filter estimation unit 2400. The observed signal $x_{l,k'}$ is also supplied from the long-time Fourier transform unit 2100 to the inverse filter estimation unit 2400. The second variance $\sigma_{l,k'}^{(a)}$ representing the acoustic ambient uncertainty is supplied from the initialization unit 1000 to the inverse filter estimation unit 2400. An updated inverse filter estimate $\tilde{w}_{k'}$ is calculated by the inverse filter estimation unit 2400 based on the observed signal $x_{l,k'}$, the updated source signal estimate $\theta_{k'}=\{\tilde{s}_{l,k'}\}_{k'}$, and the second variance $\sigma_{l,k'}^{(a)}$ representing the acoustic ambient uncertainty, wherein the calculation is made in accordance with the above equation (12).

The updated inverse filter estimate $\tilde{w}_{k'}$ is supplied, from the inverse filter estimation unit 2400 to the filtering unit 2500. The observed signal $x_{l,k'}$ is further supplied from the long-time Fourier transform unit 2100 to the filtering unit 2500. The observed signal $x_{l,k'}$ is applied by the filtering unit 2500 to the updated inverse filter estimate $\tilde{w}_{k'}$ to generate the filtered source signal estimate $\bar{s}_{l,k'}$.

The updated filtered source signal estimates $\bar{s}_{l,k'}$ is supplied from the filtering unit 2500 to the LTFS-to-STFS transform unit 2600. The LTFS-to-STFS transformation is performed by the LTFS-to-STFS transform unit 2600 so that the updated filtered source signal estimate $\bar{s}_{l,k'}$ is transformed into the transformed filtered source signal estimate $\bar{s}_{l,m,k}^{(r)}$.

The updated filtered source signal estimate $\bar{s}_{l,m,k}^{(r)}$ is supplied from the LTFS-to-STFS transform unit 2600 to the source signal estimation and convergence check unit 2700. Both the first variance $\sigma_{l,m,k}^{(sr)}$ representing the source signal uncertainty and the second variance $\sigma_{l,k'}^{(a)}$ representing the acoustic ambient uncertainty are also supplied from the initialization unit 1000 to the source signal estimation and convergence check unit 2700. The updated initial source signal estimate $\hat{s}_{l,m,k}^{(r)}$ is supplied from the short-time Fourier transform unit 2800 to the source signal estimation and convergence check unit 2700. The source signal estimate $\tilde{s}_{l,m,k}^{(r)}$ is calculated by the source signal estimation and convergence check unit 2700 based on the transformed filtered source signal estimates $\bar{s}_{l,m,k}^{(r)}$ the first variance $\sigma_{l,m,k}^{(sr)}$ representing the source signal uncertainty, the second variance $\sigma_{l,k'}^{(a)}$ representing the acoustic ambient uncertainty and the initial source signal estimate $\hat{s}_{l,m,k}^{(r)}$, wherein the estimation is made in accordance with the above equation (15). The current value of the source signal estimate $\tilde{s}_{l,m,k}^{(r)}$ that has currently been estimated is compared to the previous value of the source signal estimate $\tilde{s}_{l,m,k}^{(r)}$ that has previously been estimated. It is verified by the source signal estimation and convergence check unit 2700 whether or not the current value deviates from the previous value by less than a certain predetermined amount.

If it is was confirmed by the source signal estimation and convergence check unit 2700 that the current value of the source signal estimate $\tilde{s}_{l,m,k}^{(r)}$ deviates from the previous value thereof by less than the certain predetermined amount, then it is recognized by the source signal estimation and convergence check unit 2700 that the convergence of the source signal estimate $\tilde{s}_{l,m,k}^{(r)}$ has been obtained. The source signal estimate $\tilde{s}_{l,m,k}^{(r)}$ as a first output is supplied from the source signal estimation and convergence check unit 2700 to the inverse short time Fourier transform unit 4000. The source signal estimate $\tilde{s}_{l,m,k}^{(r)}$ is transformed by the inverse short time Fourier transform unit 4000 into the digitized waveform source signal estimate $\tilde{s}[n]$.

If it is was confirmed by the source signal estimation and convergence check unit 2700 that the current value of the source signal estimate $\tilde{s}_{l,m,k}^{(r)}$ does not deviate from the previous value thereof by less than the certain predetermined amount, then it is recognized by the source signal estimation and convergence check unit 2700 that the convergence of the source signal estimate $\tilde{s}_{l,m,k}^{(r)}$ has not yet keen obtained. The source signal estimate $\tilde{s}_{l,m,k}^{(r)}$ is supplied from the source signal estimation and convergence check, unit 2700 to the STFS-to-LTFS transform unit 2300 so that the source signal estimate $\tilde{s}_{l,m,k}^{(r)}$ is transformed into the transformed source signal estimate $\tilde{s}_{l,k'}$. The transformed source signal estimates $\tilde{s}_{l,k'}$ is supplied from the STFS-to-LTFS transform unit 2300 to the update unit 2200. The source signal estimate $\theta_{k'}$ is substituted for the transformed source signal estimate $\{\tilde{s}_{l,k'}\}_{k'}$ by the update unit 2200. The updated source signal estimate $\theta_{k'}$ is supplied from the update unit 2200 to the inverse filter estimation unit 2400.

It is possible as a modification that the iterative procedure is terminated when the number of iterations reaches a certain predetermined value. Namely, it has been confirmed by the source signal estimation and convergence check unit 2700 mat the number of iterations reaches a certain predetermined value, then if is recognized by the source signal estimation and convergence check unit 2700 that the convergence of the source signal estimate $\tilde{s}_{l,m,k}^{(r)}$ has been obtained. If it has been confirmed by the source signal estimation and convergence check unit 2700 that the convergence of the source signal estimate $\tilde{s}_{l,m,k}^{(r)}$ has been obtained, then the source signal estimate $\tilde{s}_{l,m,k}^{(r)}$ as a first output is supplied from the source signal estimation and convergence check unit 2700 to the inverse short time Fourier transform unit 4000. If it has been confirmed by the source signal estimation and convergence check unit 2700 that the convergence of the source signal estimate $\tilde{s}_{l,m,k}^{(r)}$ has not yet been obtained, then the source signal estimate $\tilde{s}_{l,m,k}^{(r)}$ as a second output is supplied from the source signal estimation and convergence check unit 2700 to the STFS-to-LTFS transform unit 2300 so that the source signal estimate $\tilde{s}_{l,m,k}^{(r)}$ is then transformed into the transformed source signal estimate $\tilde{s}_{l,k'}$. The source signal estimate $\theta_{k'}$ is further substituted for the transformed source signal estimate $\tilde{s}_{l,k'}$.

The above-described iteration procedure will be continued until it has been confirmed by the source signal estimation and convergence check unit 2700 that the convergence of the source signal estimate $\tilde{s}_{l,m,k}^{(r)}$ has been obtained. In the initial step of the iteration, the updated source signal estimate $\theta_{k'}$ is $\{\hat{s}_{l,k'}\}_{k'}$ that is supplied from the long time Fourier transform unit 2900. In the second or later steps of the iteration, the updated source signal estimate $\theta_{k'}$ is $\{\tilde{s}_{l,k'}\}_{k'}$.

If it has been confirmed by the source signal estimation and convergence check unit 2700 that the convergence of the source signal estimate $\tilde{s}_{l,m,k}^{(r)}$ has been obtained, then the source signal estimate $\tilde{s}_{l,m,k}^{(r)}$ as a first output is supplied from the source signal estimation and convergence check unit 2700 to the inverse short time Fourier transform unit 4000. The source signal estimate $\tilde{s}_{l,m,k}^{(r)}$ is transformed by the inverse short time Fourier transform unit 4000 into a digitized waveform source signal estimate $\tilde{s}[n]$ and output the digitized waveform source signal estimates $\tilde{s}[n]$.

Figure 3A:
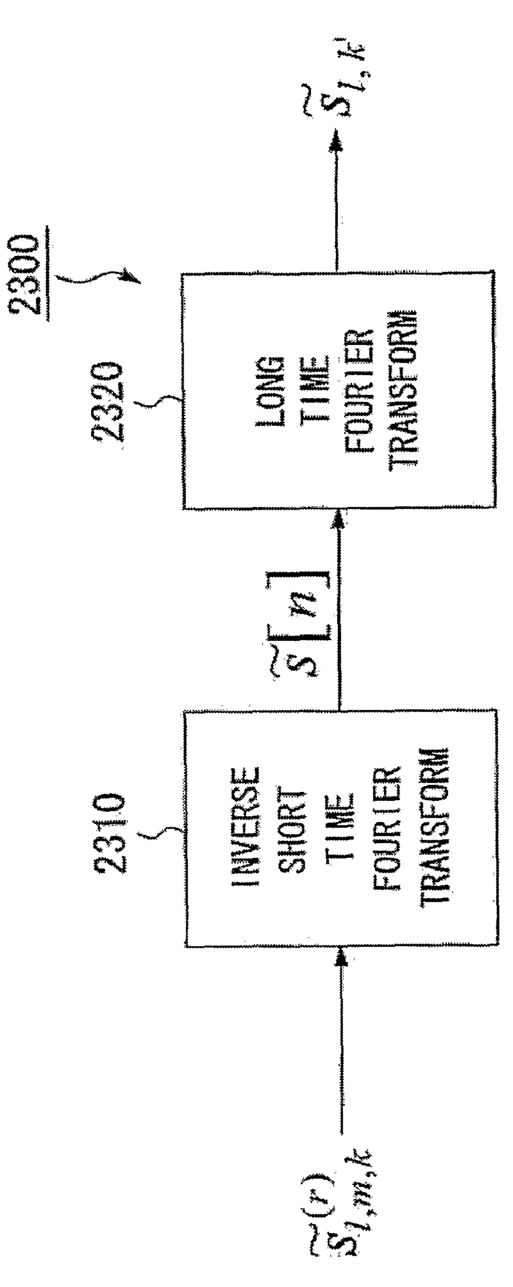
FIG. 3A is a block diagram illustrating a configuration of an STFS-to-LTFS transform unit included in the likelihood maximization unit shown in FIG. 2.

FIG. 3A is a block diagram illustrating a configuration of the STFS-to-LTFS transform unit 2300 shown in FIG. 2. The STFS-to-LTFS transform unit 2300 may include an inverse short time Fourier transform unit 2310 and a long time Fourier transform unit 2320. The inverse short time Fourier transform unit 2310 is cooperated with the source signal estimation and convergence check unit 2700. The inverse short time Fourier transform unit 2310 is adapted to receive the source signal estimate $\tilde{s}_{l,m,k}^{(r)}$ from the source signal estimation and convergence check unit 2700. The inverse short time Fourier transform unit 2310 is further adapted to transform the source signal estimate $\tilde{s}_{l,m,k}^{(r)}$ into a digitized waveform source signal estimate $\tilde{s}[n]$ as an output.

The longtime Fourier transform unit 2320 is cooperated with the inverse short time Fourier transform unit 2310. The long time Fourier transform unit 2320 is adapted to receive the digitized waveform source signal estimate $\tilde{s}[n]$ from the inverse short time Fourier transform unit 2310. The long time Fourier transform unit 2320 is further adapted to transform the digitized waveform source signal estimate $\tilde{s}[n]$ into a transformed source signal estimate $\tilde{s}_{l,k'}$ as an output.

Figure 3B:
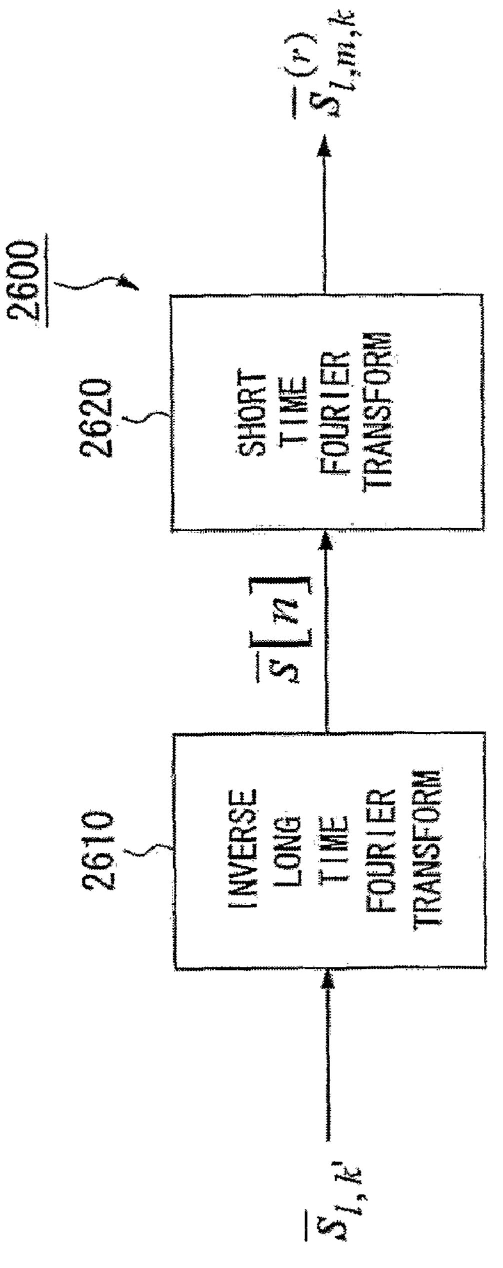
FIG. 3B is a block diagram illustrating a configuration of an LTFS-to-STFS transform unit included in the likelihood maximization unit shown in FIG. 2.

FIG. 3B is a block diagram illustrating a configuration of the LTFS-to-STFS transform unit 2600 shown in FIG. 2. The LTFS-to-STFS transform unit 2600 may include an inverse long time Fourier transform unit 2610 and a short time Fourier transform unit 2620. The inverse long time Fourier transform unit 2610 is cooperated with the filtering unit 2500. The inverse long time Fourier transform unit 2610 is adapted to receive the filtered source signal estimate $\bar{s}_{l,k'}$ from the filtering unit 2500. The inverse long time Fourier transform unit 2610 is further adapted to transform the filtered source signal estimate $\bar{s}_{l,k'}$ into a digitized waveform filtered source signal estimate $\bar{s}[n]$ as an output.

The short time Fourier transform unit 2620 is cooperated with the inverse long time Fourier transform unit 2610. The short time Fourier transform unit 2620 is adapted to receive the digitized waveform filtered source signal estimate $\bar{s}[n]$ from the inverse long time Fourier transform unit 2610. The short time Fourier transform unit 2620 is further adapted to transform the digitized waveform filtered source signal estimate $\bar{s}[n]$ into a transformed filtered source signal estimate $\bar{s}_{l,m,k}^{(r)}$ as an output.

Figure 4A:
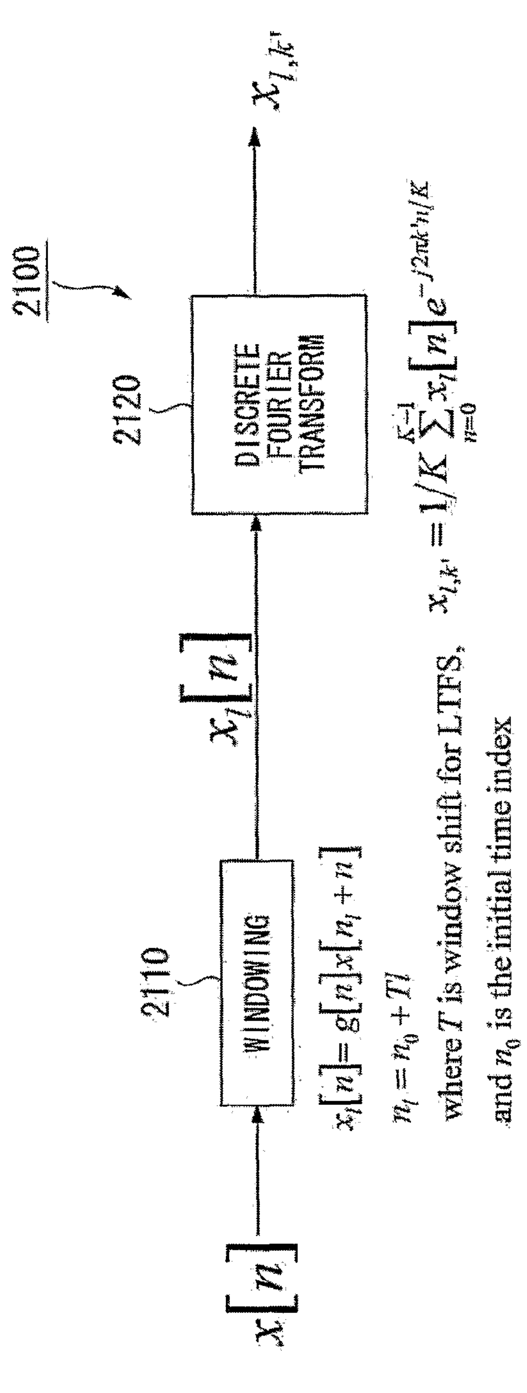
FIG. 4A is a block diagram illustrating a configuration of a long-time Fourier transform unit included in the likelihood maximization unit shown in FIG. 2.

FIG. 4A is a block diagram illustrating a configuration of the long-time Fourier transform unit 2100 shown in FIG. 2. The long-time Fourier transform unit 2100 may include a windowing unit 2110 and a discrete Fourier transform unit 2120. The windowing unit 2110 is adapted to receive the digitized waveform observed signal x[n]. The windowing unit 2110 is further adapted to repeatedly apply an analysis window function g[n] to the digitized waveform observed signal x[n] that is given as:

$$x_l[n]=g[n]x[n_l+n],$$

where $n_l$ is a sample index at which a long time frame l starts. The windowing unit 2110 is adapted to generate the segmented waveform observed signals $x_l[n]$ for all l.

The discrete Fourier transform unit 2120 is cooperated with the windowing unit 2110. The discrete Fourier transform unit 2120 is adapted to receive the segmented waveform observed signals $x_l[n]$ from the windowing unit 2110. The discrete Fourier transform unit 2120 is further adapted to perform K-paint discrete Fourier transformation of each of the segmented waveform signals $x_l[n]$ into a transformed observed signal $x_{l,k'}$ that is given as follows.

$$x_{l,k'} = 1/K\sum_{n=0}^{K-1} x_l[n]e^{-j2\pi k'/K}$$

Figure 4B:
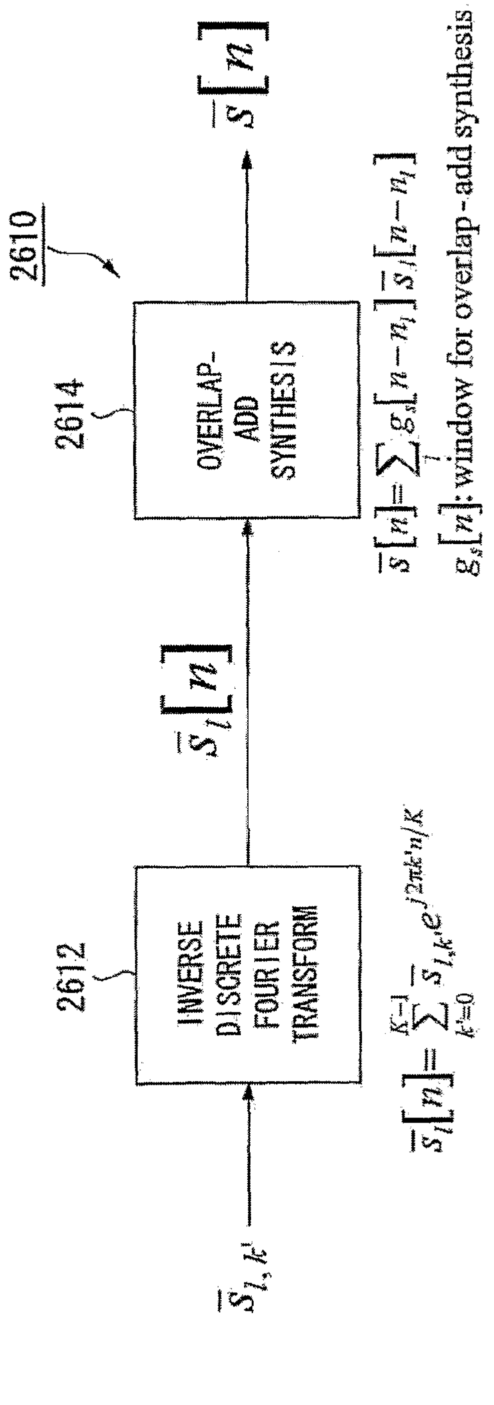
FIG. 4B is a block diagram illustrating a configuration of an inverse, long-time Fourier transform unit included in the LTFS-to-STFS transform unit shown in FIG. 3B.

FIG. 4B is a block diagram illustrating a configuration of the inverse long-time Fourier transform unit 2610 shown in FIG. 3B. The inverse long-time Fourier transform unit 2610 may include an inverse discrete Fourier transform unit 2612 and an overlap-add synthesis unit 2614. The inverse discrete Fourier transform unit 2612 is cooperated with the filtering unit 2500. The inverse discrete Fourier transform unit 2612 is adapted to receive the filtered source signal estimate $\bar{s}_{l,k'}$. The inverse discrete Fourier transform unit 2612 is further adapted to apply a corresponding inverse discrete Fourier transformation of each frame of the filtered source signal estimate $\bar{s}_{l,k'}$ into segmented waveform filtered source signal estimates $\bar{s}_l[n]$ as outputs that are given as follows:

$$\bar{s}_l[n] = \sum_{k'=0}^{K-1} \bar{s}_{l,k'}e^{j2\pi k' n/K}$$

The overlap-add synthesis unit 2614 is cooperated with the inverse discrete Fourier transform unit 2612. The overlap-add synthesis unit 2614 is adapted to receive the segmented waveform filtered source signal estimates $\bar{s}_l[n]$ from the inverse discrete Fourier transform unit 2612. The overlap-add synthesis unit 2614 is further adapted to connect or synthesize the segmented waveform filtered source signal estimates $\bar{s}_l[n]$ for all l based on the overlap-add synthesis technique with the overlap-add synthesis window $g_s[n]$ in order to obtain the digitized waveform filtered source signal estimate $\bar{s}[n]$ that is given as follows.

$$\bar{s}[n] = \sum_{l} g_s[n-n_l]\bar{s}_l[n-n_l]$$

Figure 5A:
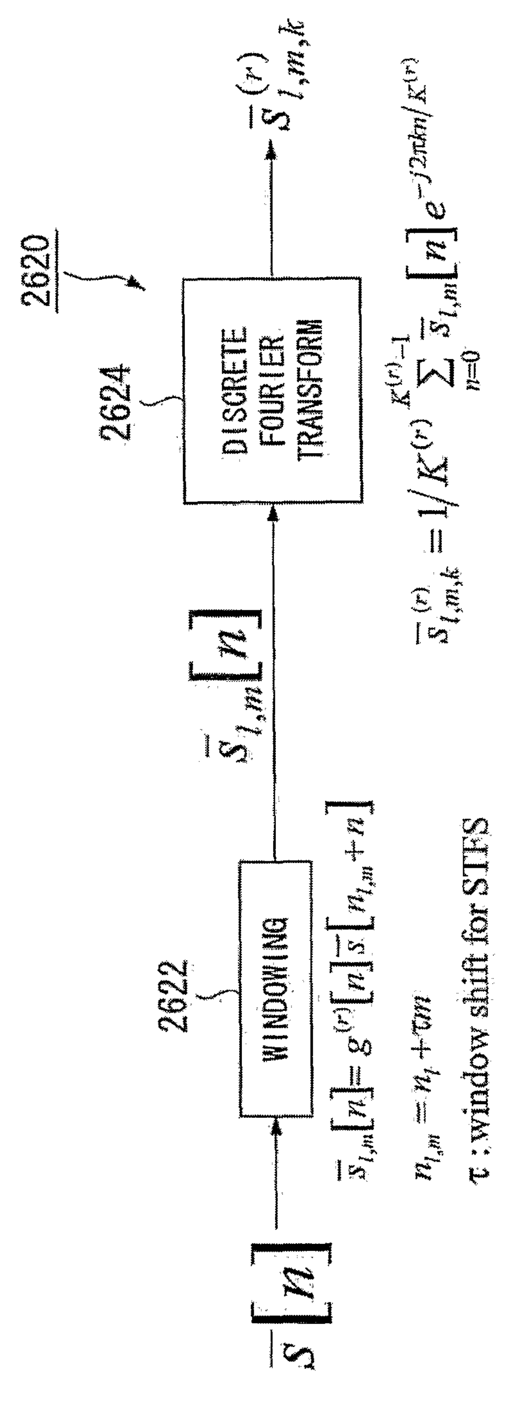
FIG. 5A is a block diagram illustrating a configuration of a short-time Fourier transform unit included in the LTFS-to-STFS transform unit shown in FIG. 3B.

FIG. 5A is a block diagram illustrating a configuration of the short-time Fourier transform unit 2620 show in FIG. 3B. The short-time. Fourier transform unit 2620 may include a windowing unit 2622 and a discrete Fourier transform unit 2624. The windowing unit 2622 is cooperated with the inverse long time Fourier transform unit 2610. The windowing unit 2622 is adapted to receive the digitized waveform filtered source signal estimate $\bar{s}[n]$ from the inverse long time Fourier transform unit 2610. The windowing unit 2622 is further adapted to repeatedly apply an analysis window function $g^{(r)}[n]$ to the digitized waveform filtered source signal estimate $\bar{s}[n]$ with a window shift of $\tau$ so as to generate segmented filtered source signal estimates $\bar{s}_{l,m}[n]$ that are given as follows.

$$\bar{s}_{l,m}[n] = g^{(r)}[n]\bar{s}[n_{l,m}+n]$$

where $n_{l,m}$ is a sample index at which a time frame starts. The windowing unit 2622 generates the segmented waveform filtered source signal estimates $\bar{s}_{l,m}[n]$ for all l and m.

The discrete Fourier transform unit 2624 is cooperated with the windowing unit 2622. The discrete Fourier transform unit 2624 is adapted to receive the segmented waveform filtered source signal estimates $\bar{s}_{l,m}[n]$ from the windowing unit 2622. The discrete Fourier transform unit 2624 is further adapted to perform $K^{(r)}$-point discrete Fourier transformation of each of the segmented waveform filtered source signal estimates $\bar{s}_{l,m}[n]$ into a transformed filtered source signal estimate $\bar{s}_{l,m,k}^{(r)}$ that is given as follows.

$$\bar{s}_{l,m,k}^{(r)} = 1/K^{(r)} \sum_{n=0}^{K^{(r)}-1} \bar{s}_l[n] e^{-j2\pi kn/K^{(r)}}$$

Figure 5B:
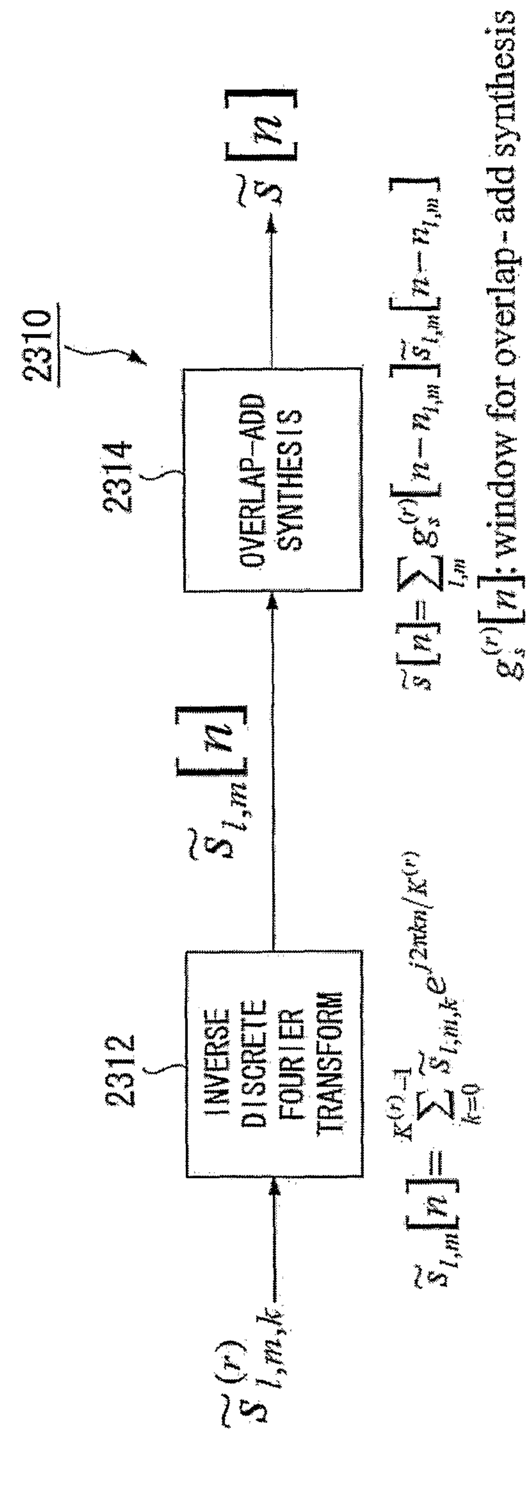
FIG. 5B is a block diagram illustrating a configuration of an inverse short-time Fourier transform unit included in the STFS-to-LTFS transform unit shown in FIG. 3A.

FIG. 5B is a block diagram illustrating a configuration of the inverse short-time Fourier transform unit 2310 shown in FIG. 3A. The inverse short-time Fourier transform unit 2310 may include an inverse discrete Fourier transform unit 2312 and an overlap-add synthesis unit 2314. The inverse discrete Fourier transform unit 2312 is cooperated with the source signal estimation and convergence check unit 2700. The inverse discrete Fourier transform unit 2312 is adapted to receive the source signal estimate $\tilde{s}_{l,m,k}^{(r)}$ from the source signal estimation and convergence check unit 2700. The inverse discrete Fourier transform unit 2312 is further adapted to apply a corresponding inverse discrete Fourier transform to each frame of the source signal estimate $\tilde{s}_{l,m,k}^{(r)}$ and generate segmented waveform source signal estimates $\tilde{s}_{l,m}[n]$ that are given as follows.

$$\tilde{s}_{l,m}[n] = \sum_{k=0}^{K^{(r)}-1} \tilde{s}_{l,m,k} e^{-j2\pi kn/K^{(r)}}$$

The overlap-add synthesis unit 2314 is cooperated with the inverse discrete Fourier transform unit 2312. The overlap-add synthesis unit 2314 is adapted to receive the segmented waveform source signal estimates $\tilde{s}_{l,m}[n]$ from the inverse discrete Fourier transform unit 2312. The overlap-add synthesis unit 2314 is further adapted to connect or synthesize the segmented waveform source signal estimates $\tilde{s}_{l,m}[n]$ for all l and m based on the overlap-add synthesis technique with the synthesis window $g_s^{(r)}[n]$ in order to obtain a digitized waveform source signal estimate $\tilde{s}[n]$ that is given as follows.

$$\tilde{s}[n] = \sum_{l,m} g_s^{(r)}[n-n_{l,m}]\tilde{s}_{l,m}[n-n_{l,m}]$$

The initialization unit 1000 is adapted to perform three operations, namely, an initial source signal estimation, a source signal uncertainty determination and an acoustic ambient uncertainty determination. As described above, the initialization unit 1000 is adapted to receive the digitized waveform observed signal x[n] and generate the first variance $\sigma_{l,m,k}^{(sr)}$ representing the source signal uncertainty, the second variance $\sigma_{l,k'}^{(a)}$ representing the acoustic ambient uncertainty and the digitized waveform initial source signal estimate $\hat{s}[n]$. In details, the initialization unit 1000 is adapted to perform the initial source signal estimation that generates the digitized waveform initial source signal estimate $\hat{s}[n]$ from the digitized waveform observed signal x[n]. The initialization unit 1000 is further adapted to perform the source signal uncertainty determination that generates the first variance $\sigma_{l,m,k}^{(sr)}$ representing the source signal uncertainty from the digitized waveform observed signal x[n]. The initialization unit 1000 is furthermore adapted to perform the acoustics ambient uncertainty determination that generates the second variance $\sigma_{l,k'}^{(a)}$ representing the acoustic ambient uncertainty from the digitized waveform observed signal x[n].

Figure 6:
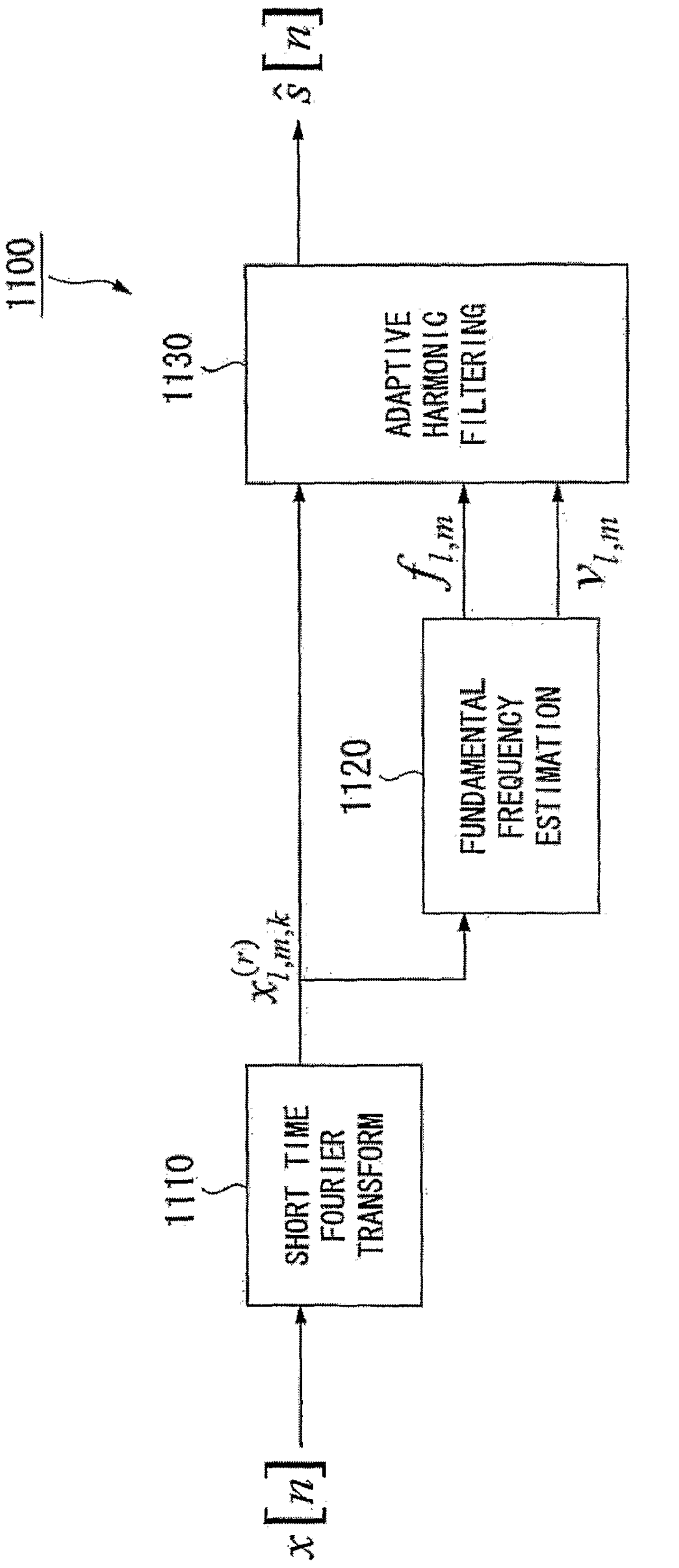
FIG. 6 is a block diagram illustrating a configuration of an initial source signal estimation unit included in the initialization unit shown in FIG. 1.
Figure 7:
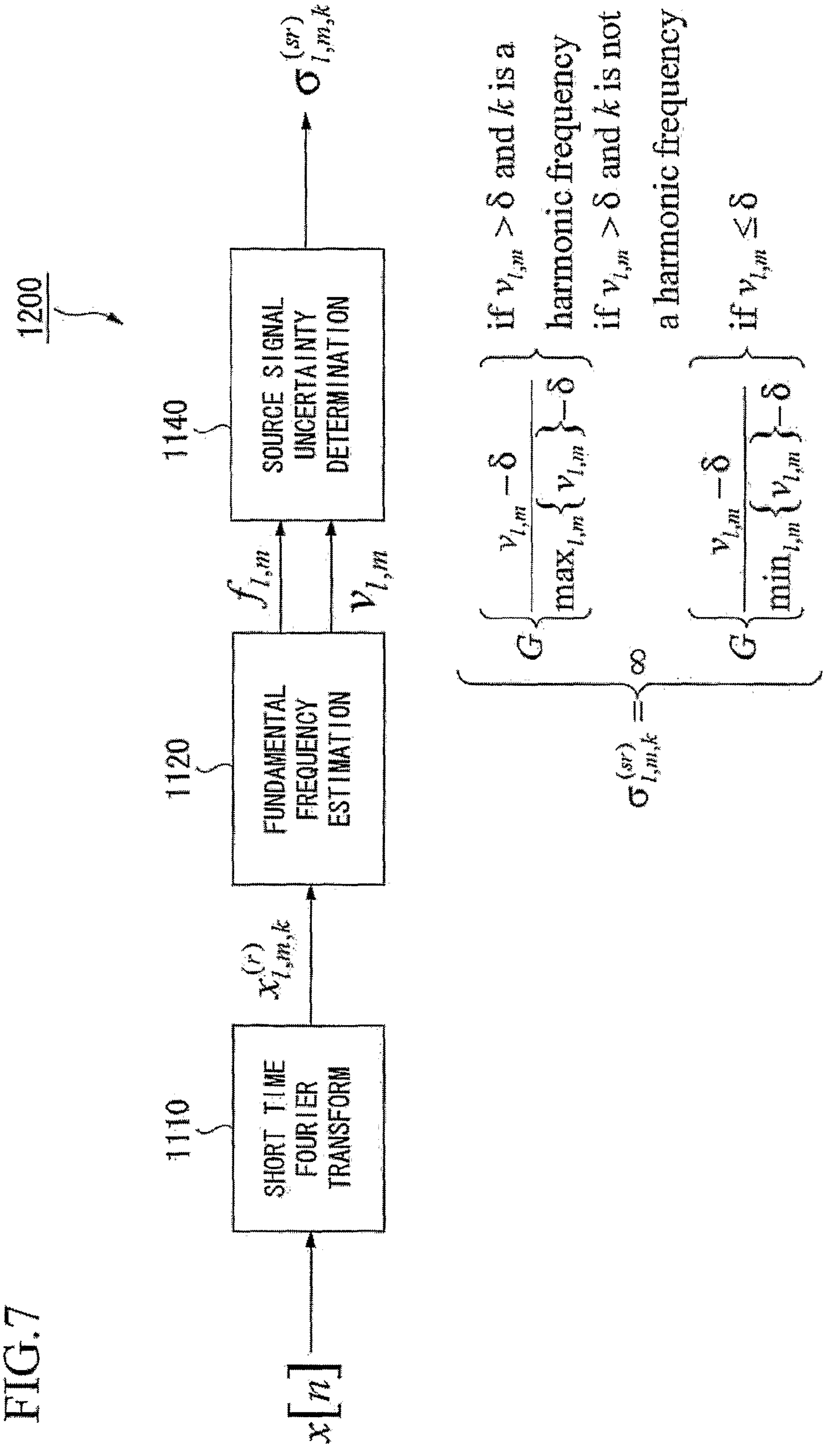
FIG. 7 is a block diagram illustrating a configuration of a source signal uncertainty determination unit included in the initialization unit shown in FIG. 1.
Figure 8:
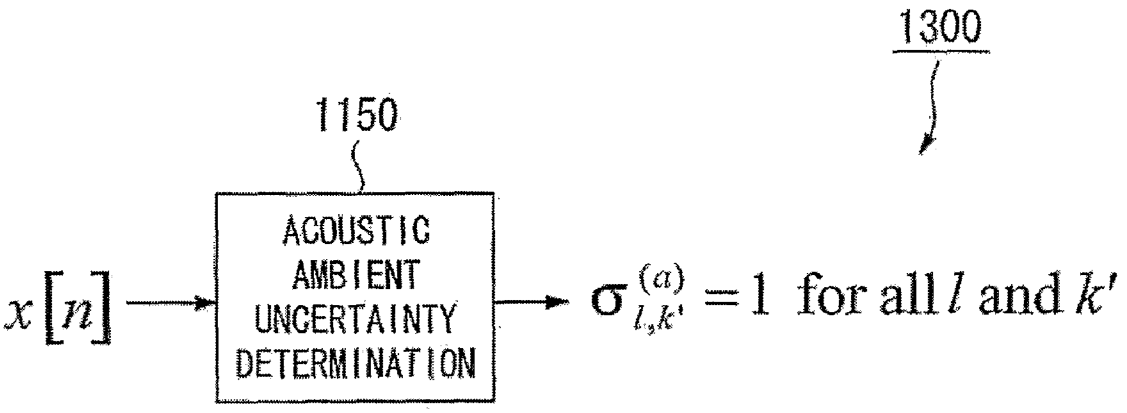
FIG. 8 is a block diagram illustrating a configuration of an acoustic ambient uncertainty determination unit included in the initialization unit shown in FIG. 1.

The initialization unit 1000 may include three function sub-units, namely, an initial source signal estimation unit 1100 that performs the initial source signal estimation, a source signal uncertainty determination unit 1200 that performs the source signal uncertainty determination, and an acoustic ambient uncertainty determination unit 1300 that performs the acoustic ambient uncertainty determination. FIG. 6 is a block diagram illustrating a configuration of the initial source signal estimation unit 1100 included in the initialization unit 1000 shown in FIG. 1. FIG. 7 is a block diagram illustrating a configuration of the source signal uncertainty determination unit 1200 included in the initialization unit 1000 shown in FIG. 1. FIG. 8 is a block diagram illustrating a configuration of the acoustic ambient uncertainty determination unit 1300 included in the initialization unit 1000 shown in FIG. 1.

With reference to FIG. 6, the initial source signal estimation unit 1100 may further include a short time Fourier transform unit 1110, a fundamental frequency estimation unit 1120 and an adaptive harmonic filtering unit 1130. The short time Fourier transform unit 1110 is adapted to receive the digitized waveform observed signal x[n]. The short time Fourier transform unit 1110 is adapted to perform a short time Fourier transformation of the digitized waveform observed signal x[n] into a transformed observed signal $x_{l,m,k}^{(r)}$ as output.

The fundamental frequency estimation unit 1120 is cooperated with the short time Fourier transform unit 1110. The fundamental frequency estimation unit 1120 is adapted to receive the transformed observed signal $x_{l,m,k}^{(r)}$ from the short time Fourier transform unit 1110. The fundamental frequency estimation unit 1120 is further adapted to estimate a fundamental frequency $f_{l,m}$ and the voicing measure $v_{l,m}$ for each short time frame from the transformed observed signal $x_{l,m,k}^{(r)}$.

The adaptive harmonic filtering unit 1130 is cooperated with the short time Fourier transform unit 1110 and the fundamental frequency estimation unit 1120. The adaptive harmonic filtering unit 1130 is adapted to receive the transformed observed signal $x_{l,m,k}^{(r)}$ from the short time Fourier transform unit 1110. The adaptive harmonic filtering unit 1130 is also adapted to receive the fundamental frequency $f_{l,m}$ and the voicing measure $v_{l,m}$ from the fundamental frequency estimation unit 1120. The adaptive harmonic filtering unit 1130 is also adapted to enhance a harmonic structure of $x_{l,m,k}^{(r)}$ based on the fundamental frequency $f_{l,m}$ and the voicing measure $v_{l,m}$ so that the enhancement of the harmonic structure generates a resultant digitized waveform initial source signal estimate $\hat{s}[n]$ as output. The process flow of his example is disclosed in details by Tomohiro Nakatani, Masato Miyoshi and Keisuke Kinoshita, "Single Microphone Blind Dereverberation" in Speech Enhancement (Benesty, J. Makino, S., and Chen, J. Eds), Chapter 11, pp. 247-270, Spring 2005.

With reference to FIG. 7, the source signal uncertainty determination unit 1200 may further include the short time Fourier transform unit 1110, the fundamental frequency estimation unit 1120 and a source signal uncertainty determination subunit 1140. The short time Fourier transform unit 1110 is adapted to receive the digitized waveform observed signal x[n]. The short time Fourier transform unit 1110 is adapted to perform a short time Fourier transformation of the digitized waveform observed signal x[n] into the transformed observed signal $x_{l,m,k}^{(r)}$ as output.

The fundamental frequency estimation unit 1120 is cooperated with the short time Fourier transform unit 1110. The fundamental frequency estimation unit 1120 is adapted to receive the transformed observed signal $x_{l,m,k}^{(r)}$ from the short time Fourier transform unit 1110. The fundamental frequency estimation unit 1120 is further adapted to estimate the fundamental, frequency $f_{l,m}$ and the voicing measure $v_{l,m}$ for each short time frame from the transformed observed signal $x_{l,m,k}^{(r)}$.

The source signal uncertainty determination subunit 1140 is cooperated with the fundamental frequency estimation unit 1120. The source signal uncertainty determination subunit 1140 is adapted to receive the fundamental frequency $f_{l,m}$ and the voicing measure $v_{l,m}$ from the fundamental frequency estimation unit 1120. The source signal uncertainty determination subunit 1140 is further adapted to determine the first variance $\sigma_{l,m,k}^{(sr)}$ representing the source signal uncertainty, based on the fundamental frequency $f_{l,m}$ and the voicing measure $v_{l,m}$. The first variance $\sigma_{l,m,k}^{(sr)}$ representing the source signal uncertainty is given as follows.

$$\sigma_{l,m,k}^{(sr)} = \begin{cases} G\left\{\dfrac{v_{l,m}-\delta}{\max_{l,m}\{v_{l,m}\}-\delta}\right\} & \text{if } v_{l,m} > \delta \text{ and } k \text{ is a harmonic frequency} \\ \infty & \text{if } v_{l,m} > \delta \text{ and } k \text{ is not a harmonic frequency} \\ G\left\{\dfrac{v_{l,m}-\delta}{\min_{l,m}\{v_{l,m}\}-\delta}\right\} & \text{if } v_{l,m} \le \delta \end{cases} \quad (17)$$

where G{u} is a normalization function that is defined to be, for example, $G\{u\}=e^{-a(u-b)}$ with certain positive constants "a" and "b", and a harmonic frequency means a frequency index for one of a fundamental frequency and its multiplies.

With reference to FIG. 8, the acoustic ambient uncertainty determination unit 1300 may include an acoustic ambient uncertainty determination subunit 1150. The acoustic ambient uncertainty determination subunit 1150 is adapted to receive the digitized waveform observed signal x[n]. The acoustic ambient uncertainty determination subunit 1150 is further adapted to produce the second variance $\sigma_{l,k'}^{(a)}$ representing the acoustic ambient uncertainty. In one typical case, the second variance $\sigma_{l,k'}^{(a)}$ can be a constant for all l and k', that is, $\sigma_{l,k'}=1$ as shown in FIG. 8.

The reverberant signal can be dereverberated more effectively by a modified speech dereverberation apparatus 20000 that includes a feedback loop that performs the feedback process. In accordance with the flow of feedback process, the quality of the source signal estimates $\tilde{s}_{l,m,k}^{(r)}$ can be improved by iterating the same processing flow with the feedback loop. While only the digitized waveform observed signal x[n] is used as the input of the flow in the initial step, the source signal estimate $\tilde{s}_{l,m,k}^{(r)}$ that has been obtained in the previous step is also used as the input in the following steps. It is more preferable to use the source signal estimate $\tilde{s}_{l,m,k}^{(r)}$ than using the observed signal x[n] for making the estimation of the parameters $\hat{s}_{l,m,k}^{(r)}$ and $\sigma_{l,m,k}^{(sr)}$ of the source probability density function (source pdf).

SECOND EMBODIMENT

Figure 9:
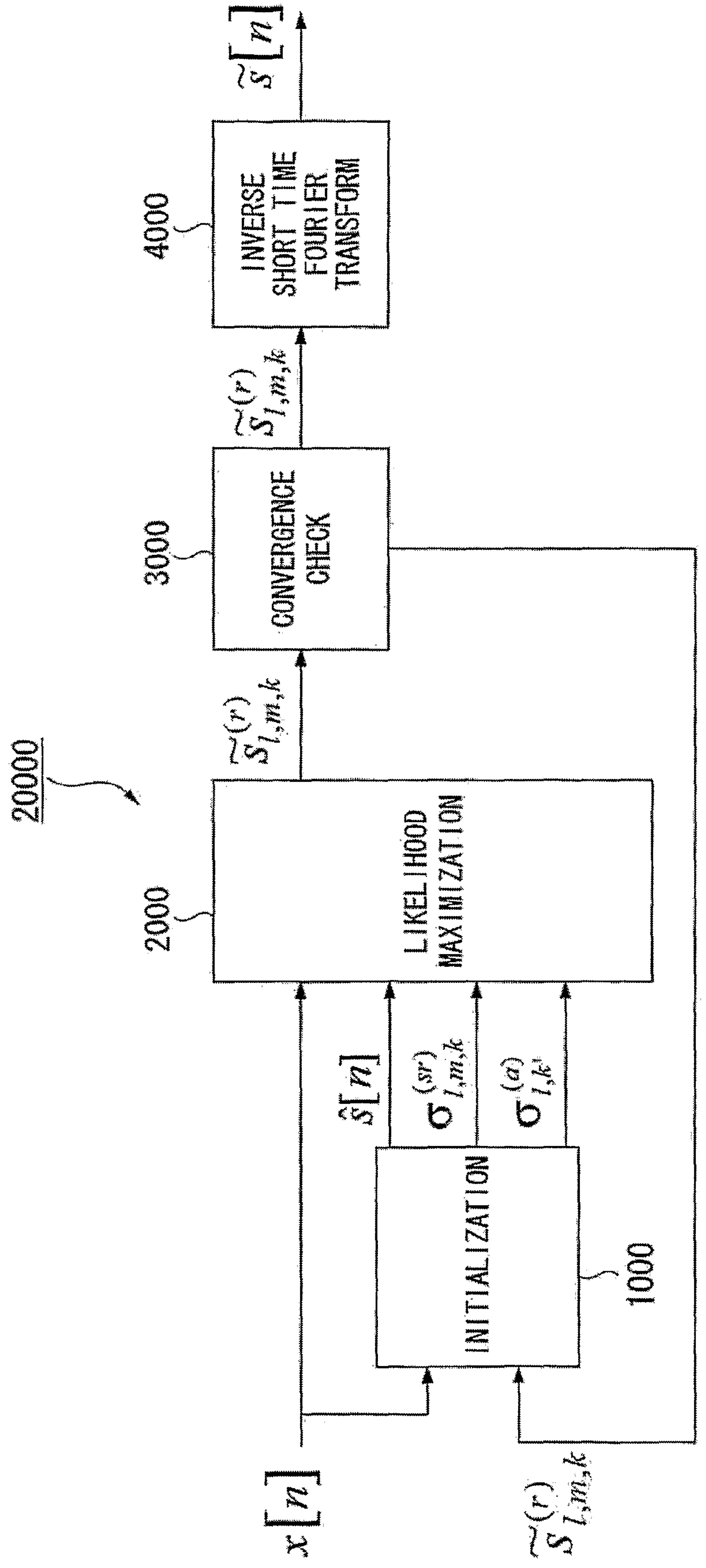
FIG. 9 is a block diagram illustrating a configuration of another speech dereverberation apparatus in accordance with a second embodiment of the present invention.

FIG. 9 is a block diagram illustrating a configuration of another speech dereverberation apparatus that further includes a feedback loop in accordance with a second embodiment of the present invention. A modified speech dereverberation apparatus 20000 may include the initialization unit 1000, the likelihood maximization unit 2000, a convergence check unit 3000, and the inverse short time Fourier transform unit 4000. The configurations and operations of the initialization unit 1000, the likelihood maximization unit 2000 and the inverse short time Fourier transform unit 4000 are as described above. In this embodiment, the convergence check unit 3000 is additionally introduced between the likelihood maximization unit 2000 and the inverse short time Fourier transform unit 4000 so that the convergence check unit 3000 checks a convergence of the source signal estimate that has been outputted from the likelihood maximization unit 2000. If the convergence check unit 3000 recognizes that the convergence of the source signal estimate $\tilde{s}_{l,m,k}^{(r)}$ has been obtained, then the convergence check unit 3000 sends the source signal estimate $\tilde{s}_{l,m,k}^{(r)}$ to the inverse short time Fourier transform unit 4000. If the convergence check unit 3000 recognizes that the convergence of the source signal estimate $\tilde{s}_{l,m,k}^{(r)}$ has not yet been obtained, then the convergence check unit 3000 sends the source signal estimate $\tilde{s}_{l,m,k}^{(r)}$ to the initialization unit 1000. The following descriptions will focus on the difference of the second embodiment from the first embodiment.

The convergence check unit 3000 is cooperated with the initialization unit 1000 and the likelihood maximization unit 2000. Hie convergence check unit 3000 is adapted to receive the source signal estimate $\tilde{s}_{l,m,k}^{(r)}$ from the likelihood maximization unit 2000. The convergence check unit 3000 is further adapted to determine the status of convergence of the iterative procedure, for example, by verifying whether or not a currently updated value of the source signal estimate $\tilde{s}_{l,m,k}^{(r)}$ deviates from the previous value of the source signal estimate $\tilde{s}_{l,m,k}^{(r)}$ by less than a certain predetermined amount. If the convergence check unit 3000 confirms mat the currently updated value of the source signal estimate $\tilde{s}_{l,m,k}^{(r)}$ deviates from the previous value of the source signal estimate $\tilde{s}_{l,m,k}^{(r)}$ by less than the certain predetermined amount, then the convergence check unit 3000 recognizes that the convergence of the source signal estimate $\tilde{s}_{l,m,k}^{(r)}$ has been obtained. If the convergence check unit 3000 confirms that the currently updated value of the source signal estimate $\tilde{s}_{l,m,k}^{(r)}$ does not deviate from the previous value of the source signal estimate $\tilde{s}_{l,m,k}^{(r)}$ by less than the certain predetermined amount, then the convergence check unit 3000 recognizes that the convergence of the source signal estimate $\tilde{s}_{l,m,k}^{(r)}$ has not yet been obtained.

It is possible as a modification for the feedback procedure to be terminated when the number or feedbacks or iteration reaches a certain predetermined value. When the convergence check unit 3000 has confirmed that the convergence of the source signal estimates $\tilde{s}_{l,m,k}^{(r)}$ has been obtained, then the convergence check unit 3000 sends the source signal estimate $\tilde{s}_{l,m,k}^{(r)}$ to the inverse short time Fourier transform unit 4000. If the convergence check unit 3000 has confirmed that the convergence of the source signal estimate $\tilde{s}_{l,m,k}^{(r)}$ has not yet been obtained, then the convergence check unit 3000 provides the source signal estimate $\tilde{s}_{l,m,k}^{(r)}$ as an output to the initialization unit 1000 to perform a further step of the above-described iteration.

The convergence check unit 3000 provides the feedback loop to the initialization unit 1000. Namely, the initialization unit 1000 is cooperated with the convergence check unit 3000. Thus, the initialization unit 1000 needs to be adapted to the feedback loop. In accordance with the first embodiment, the initialization unit 1000 includes the initial source signal estimation unit 1100, the source signal uncertainty determination unit 1200, and the acoustic ambient uncertainty determination unit 1300. In accordance with the second embodiment, the modified initialization unit 1000 includes a modified initial source signal estimation unit 1400, a modified source signal uncertainty determination unit 1500, and the acoustic ambient uncertainty determination unit 1300. The following descriptions will focus on the modified initial source signal estimation unit 1400, and the modified source signal uncertainty determination unit 1500.

Figure 10:
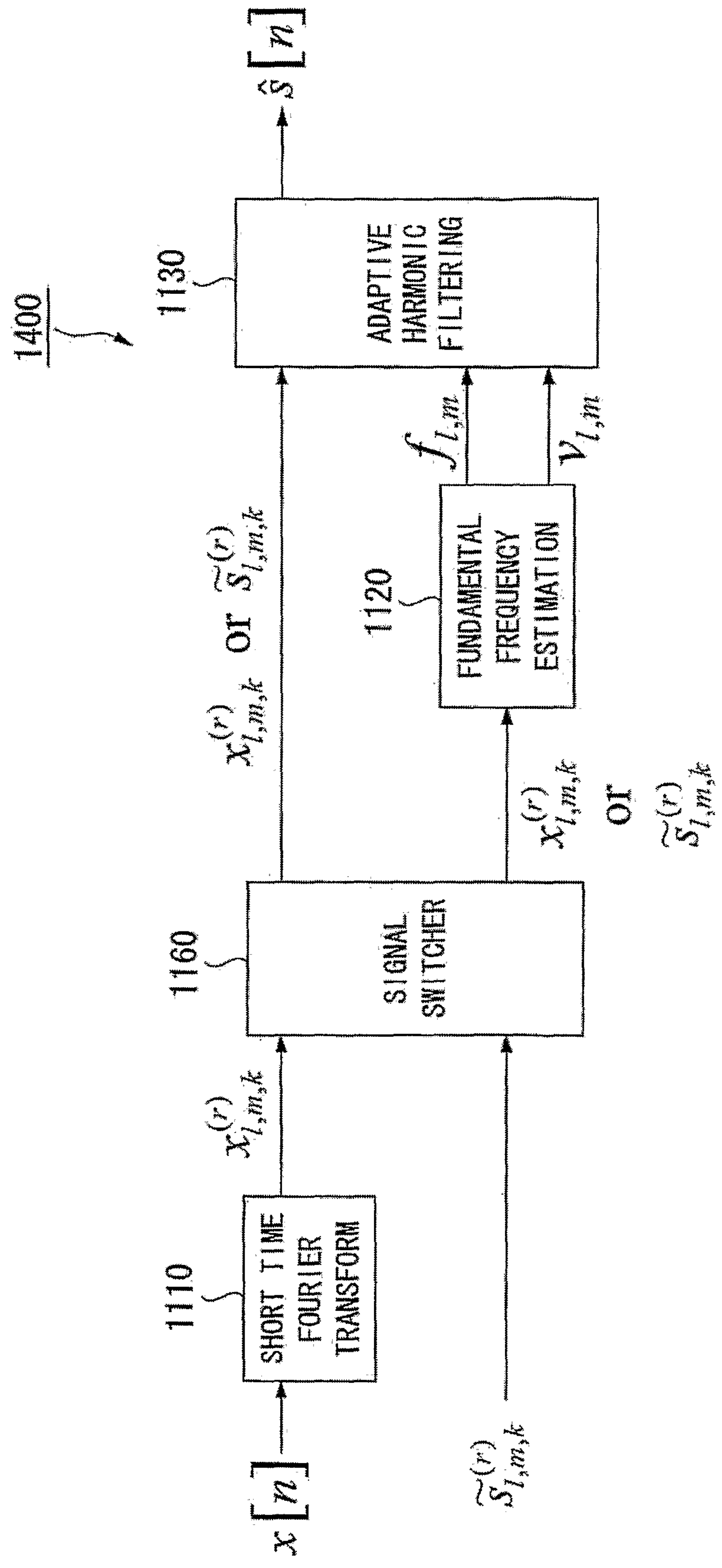
FIG. 10 is a block diagram illustrating a configuration of a modified initial source signal estimation unit included in the initialization unit shown in FIG. 9.

FIG. 10 is a block diagram illustrating a configuration of a modified initial source signal estimation unit 1400 included in the initialization unit 1000 shown in FIG. 9. The modified initial source signal estimation unit 1400 may further include the short time Fourier transform unit 1110, the fundamental frequency estimation unit 1120, the adaptive harmonic filtering unit 1130, and a signal switcher unit 1160. The addition of the signal switcher unit 1160 can improve the accuracy of the digitized waveform initial source signal estimate ŝ[n].

The short time Fourier transform unit 1110 is adapted to receive the digitized waveform observed signal x[n]. The short time Fourier transform unit 1110 is adapted to perform a short time Fourier transformation of the digitized waveform observed signal x[n] into a transformed observed signal $x_{l,m,k}^{(r)}$ as output. The signal switcher unit 1160 is cooperated with the short time Fourier transform unit 1110 and the convergence check unit 3000. The signal switcher unit 1160 is adapted to receive the transformed observed signal $x_{l,m,k}^{(r)}$ from the short time Fourier transform unit 1110. The signal switcher unit 1160 is adapted to receive the source signal estimate $\tilde{s}_{l,m,k}^{(r)}$ from the convergence check unit 3000. The signal switcher unit 1160 is adapted to perform a first selecting operation to generate a first output. The signal switcher unit 1160 is also adapted to perform a second selecting operation to generate a second output. The first and second selecting operations are independent from each other. The first selecting operation is to select one of the transformed observed signal $x_{l,m,k}^{(r)}$, and the source signal estimate $\tilde{s}_{l,m,k}^{(r)}$. In one case, the first selecting operation may be to select the transformed observed signal $x_{l,m,k}^{(r)}$ in all steps of iteration except in the limited step or steps. For example, the first selecting operation may be to select the transformed observed signal $x_{l,m,k}^{(r)}$ in all steps of iteration except in the last one or two steps thereof and to select the source signal estimate $\tilde{s}_{l,m,k}^{(r)}$ in the last one or two steps only. In one case, the second selecting operation may be to select the source signal estimate $\tilde{s}_{l,m,k}^{(r)}$ in all steps of iteration except in the initial step. In the initial step of iteration, the signal switcher unit 1160 receives the transformed observed signal $x_{l,m,k}^{(r)}$ only and selects the transformed observed signal $x_{l,m,k}^{(r)}$. It is more preferable to use the source signal estimate $\tilde{s}_{l,m,k}^{(r)}$ than using the transformed observed signal $x_{l,m,k}^{(r)}$ in view of the estimation of both the fundamental frequency $f_{l,m}$ and the voicing measure $v_{l,m}$.

The signal switcher unit 1160 performs the first selecting operation and generates the first output. The signal switcher unit 1160 performs the second selecting operation and generates the second output.

The fundamental frequency estimation unit 1120 is cooperated with the signal switcher unit 1160. The fundamental frequency estimation unit 1120 is adapted to receive the second output from the signal switcher unit 1160. Namely, the fundamental frequency estimation unit 1120 is adapted to receive the transformed observed signal $x_{l,m,k}^{(r)}$ from the signal switcher unit 1160 in the initial or first step of iteration and to receive the source signal estimate $\tilde{s}_{l,m,k}^{(r)}$ from the signal switcher unit 1160 in the second or later steps of iteration. The fundamental frequency estimation unit 1120 is further adapted to estimate a fundamental frequency $f_{l,m}$ and its voicing measure $v_{l,m}$ for each short time frame based on the transformed observed signal $x_{l,m,k}^{(r)}$ of the source signal estimate $\tilde{s}_{l,m,k}^{(r)}$.

The adaptive harmonic filtering unit 1130 is cooperated with the signal switcher unit 1160 and the fundamental frequency estimation unit 1120. The adaptive harmonic filtering unit 1130 is adapted to receive the first output from the signal switcher unit 1160 and also to receive the fundamental frequency $f_{l,m}$ and the voicing measure $v_{l,m}$ from the fundamental frequency estimation unit 1120. Namely, the adaptive harmonic filtering unit 1130 is adapted to receive, from the signal switcher unit 1160, the transformed observed signal $x_{l,m,k}^{(r)}$ in all steps of iteration except in the last one of two steps thereof. The adaptive harmonic filtering unit 1130 is also adapted to receive the source signal estimate $\tilde{s}_{l,m,k}^{(r)}$ from the signal switcher unit 1160 in the last one or two steps of iteration. The adaptive harmonic filtering unit 1130 is also adapted to receive the fundamental frequency $f_{l,m}$ and the voicing measure $v_{l,m}$ from the fundamental frequency estimation unit 1120 in all steps of iteration. Tire adaptive harmonic filtering unit 1130 is also adapted to enhance a harmonic structure of the observed signal $x_{l,m,k}^{(r)}$ or the source signal estimate $\tilde{s}_{l,m,k}^{(r)}$ based on the fundamental frequency $f_{l,m}$ and the voicing measure $v_{l,m}$. The enhancement operation generates a digitized waveform initial source signal estimate ŝ[n] that is improved in accuracy of estimation.

As described above, it is more preferable for the fundamental frequency estimation unit 1120 to use the source signal estimate $\tilde{s}_{l,m,k}^{(r)}$ than using the observed signal $x_{l,m,k}^{(r)}$ in view of the estimation of both the fundamental frequency $f_{l,m}$ and the voicing measure $v_{l,m}$. Thus, providing the source signal estimate $\tilde{s}_{l,m,k}^{(r)}$, instead of the observed signal $x_{l,m,k}^{(r)}$, to the fundamental frequency estimation unit 1120 in the second or later steps of iteration can improve the estimation of the digitized waveform initial source signal estimate ŝ[n].

In some cases, it may be more suitable to apply the adaptive harmonic filter to the source signal estimate $\tilde{s}_{l,m,k}^{(r)}$ than to the observed signal $x_{l,m,k}^{(r)}$ in order to obtain better estimation of the digitized waveform initial source signal estimate ŝ[n].

One iteration of the dereverberation step may add a certain special distortion to the source signal estimate $\tilde{s}_{l,m,k}^{(r)}$ and the distortion is directly inherited to the digitized waveform initial source signal estimate ŝ[n] when applying the adaptive harmonic filter to the source signal estimate $\tilde{s}_{l,m,k}^{(r)}$. In addition, this distortion may be accumulated into the source signal estimate $\tilde{s}_{l,m,k}^{(r)}$ through the iterative dereverberation steps. To avoid this accumulation of the distortion, it is effective for the signal switcher unit 1160 to be adapted to give the observed signal $x_{l,m,k}^{(r)}$ to the adaptive harmonic filtering unit 1130 except in the last one step or the last a few steps before the end of iteration where the estimation of the source signal estimate $\tilde{s}_{l,m,k}^{(r)}$ is made accurate.

Figure 11:
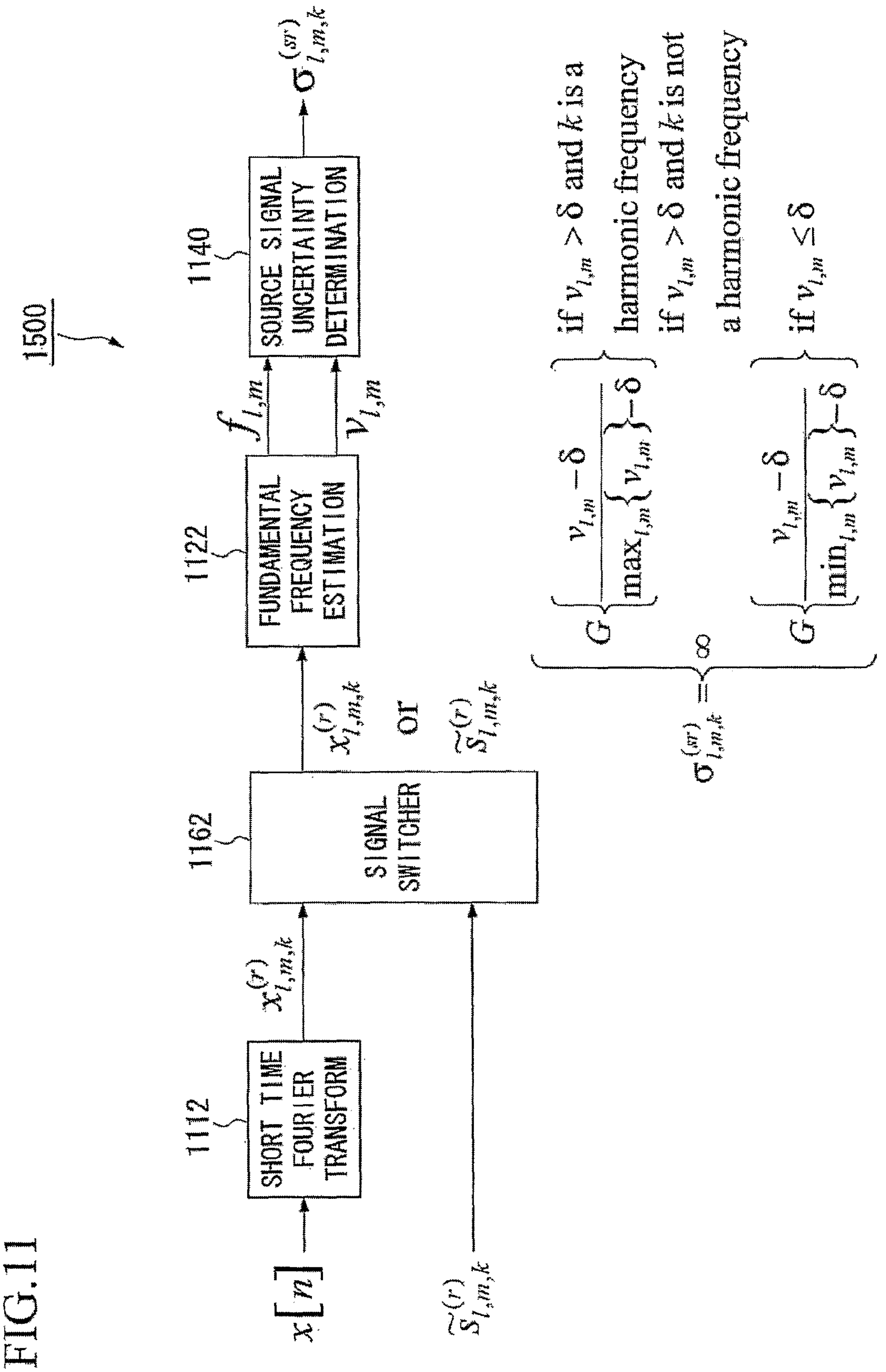
FIG. 11 is a block diagram illustrating a configuration of a modified source signal uncertainty determination unit included in the initialization unit shown in FIG. 9.

FIG. 11 is a block diagram illustrating a configuration of a modified source signal uncertainty determination unit 1500 included in the initialization unit 1000 shown in FIG. 9. The modified source signal uncertainty determination unit 1500 may further include the short time Fourier transform unit 1112, the fundamental frequency estimation unit 1122, the source signal uncertainty determination subunit 1140, and a signal switcher unit 1162. The addition of the signal switcher unit 1162 can improve the estimation of the source signal uncertainty $\sigma_{l,m,k}^{(sr)}$. In accordance with the second embodiment, the configuration of the likelihood maximization unit 2000 is the same as that described in the first embodiment.

The short time Fourier transform unit 1112 is adapted to receive the digitized waveform observed signal x[n]. The short time Fourier transform unit 1112 is adapted to perform a short time Fourier transformation of the digitized waveform observed signal x[n] into a transformed observed signal $x_{l,m,k}^{(r)}$ as output. The signal switcher unit 1162 is cooperated with the short time Fourier transform unit 1110 and the convergence check unit 3000. The signal switcher unit 1162 is adapted to receive the transformed observed signal $x_{l,m,k}^{(r)}$ from the short time Fourier transform unit 1112. The signal switcher unit 1162 is adapted to receive the source signal estimate $\tilde{s}_{l,m,k}^{(r)}$ from the convergence check unit 3000. The signal switcher unit 1162 is adapted to perform a first selecting operation to generate a first output. The first selecting operation is to select one of the transformed observed signal $x_{l,m,k}^{(r)}$ and the source signal estimate $\tilde{s}_{l,m,k}^{(r)}$. In one case, the first selecting operation may be to select the source signal estimate $\tilde{s}_{l,m,k}^{(r)}$ in all steps of iteration except in the initial step thereof. In the initial step of iteration, the signal switcher unit 1162 receives the transformed observed signal $x_{l,m,k}^{(r)}$ only and selects the transformed observed signal $x_{l,m,k}^{(r)}$. It is more preferable to use the source signal estimate $\tilde{s}_{l,m,k}^{(r)}$ than using the transformed observed signal $x_{l,m,k}^{(r)}$ in view of the estimation of both the fundamental frequency $f_{l,m}$ and the voicing measure $v_{l,m}$.

The fundamental frequency estimation unit 1122 is cooperated with the signal switcher unit 1162. The fundamental frequency estimation unit 1122 is adapted to receive the first output from the signal switcher unit 1162. Namely, the fundamental frequency estimation unit 1122 is adapted to receive the transformed observed signal $x_{l,m,k}^{(r)}$ in the initial step of iteration and to receive the source signal estimate $\tilde{s}_{l,m,k}^{(r)}$ in all steps of iteration except in the initial step thereof. The fundamental frequency estimation unit 1122 is further adapted to estimate a fundamental frequency $f_{l,m}$ and its voicing pleasure $v_{l,m}$ for each short time frame. The estimation is made with reference to the transformed observed signal $x_{l,m,k}^{(r)}$ or the source signal estimate $\tilde{s}_{l,m,k}^{(r)}$.

The source signal uncertainty determination subunit 1140 is cooperated with the fundamental frequency estimation unit 1122. The source signal uncertainty determination subunit 1140 is adapted to receive the fundamental frequency $f_{l,m}$ and the voicing measure $v_{l,m}$ from the fundamental frequency estimation unit 1122. The source signal uncertainty determination subunit 1140 is further adapted to determine the source signal uncertainty $\sigma_{l,m,k}^{(sr)}$. As described above, it is more preferable to use the source signal estimate $\tilde{s}_{l,m,k}^{(r)}$ than using the observed signal $x_{l,m,k}^{(r)}$ in view of the estimation of both the fundamental frequency $f_{l,m}$ and the voicing measure $v_{l,m}$.

THIRD EMBODIMENT

Figure 12:
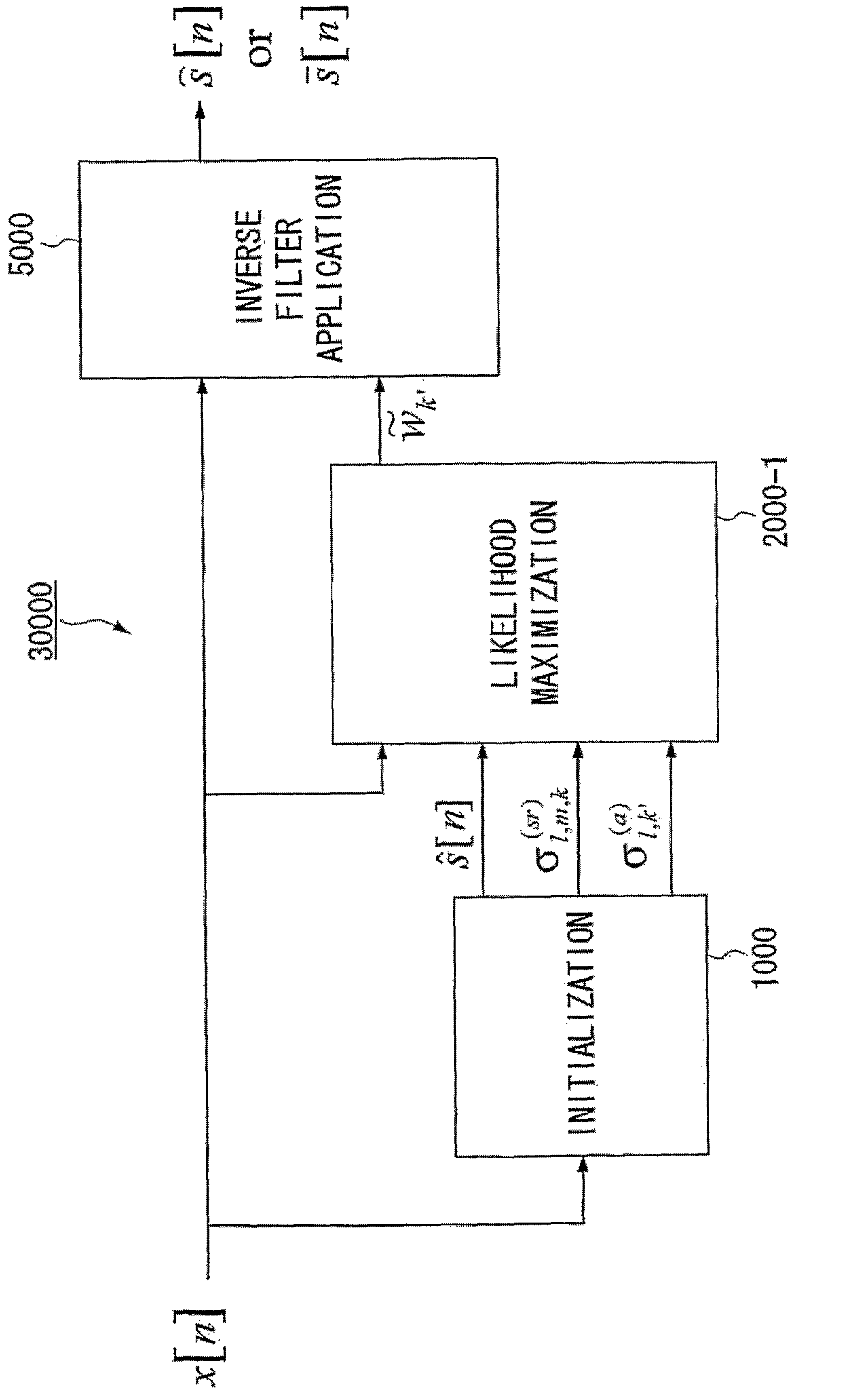
FIG. 12 is a block diagram illustrating a configuration of still another speech dereverberation apparatus in accordance with a third embodiment of the present invention.

FIG. 12 is a block diagram illustrating an apparatus for speech dereverberation based on probabilistic models of source and room acoustics in accordance with a third embodiment of the present invention. A speech dereverberation apparatus 30000 can be realized by a set of functional units that are cooperated to receive an input of an observed signal x[n] and generate an output of a digitized waveform source signal estimate s̃[n] or a filtered source signal estimate s̄[n]. The speech dereverberation apparatus 30000 can be realized by, for example, a computer or a processor. The speech dereverberation apparatus 30000 performs operations for speech dereverberation. A speech dereverberation method can be realized by a program to be executed by a computer.

The speech dereverberation-apparatus 30000 may typically include the above-described initialization unit 1000, the above-described likelihood maximization unit 2000-1 and an inverse filter application unit 5000. The initialization unit 1000 may be adapted to receive the digitized waveform observed, signal x[n]. The digitized waveform observed signal x[n] may contain a speech signal with an unknown degree of reverberance. The speech signal can be captured by an apparatus such as a microphone or microphones. The initialization unit 1000 may be adapted to extract, from the observed signal, an initial source signal estimate and uncertainties pertaining to a source signal and an acoustic ambient. The initialization unit 1000 may also be adapted to formulate representations of the initial source signal estimate, the source signal uncertainty and the acoustic ambient uncertainty. These representations are enumerated as ŝ[n] that is the digitized waveform initial source signal estimate, $\sigma_{l,m,k}^{(sr)}$ that is the variance or dispersion representing the source signal uncertainty, and of $\sigma_{l,k'}^{(a)}$ that is the variance or dispersion representing the acoustic ambient uncertainty, for all indices l, m, k, and k'. Namely, the initialization unit 1000 may be adapted to receive the input of the digitized waveform signal x[n] as the observed signal and to generate the digitized waveform initial source signal estimate ŝ[n], the variance or dispersion $\sigma_{l,m,k}^{(sr)}$ representing the source signal uncertainty, and the variance or dispersion $\sigma_{l,k'}^{(a)}$ representing the acoustic ambient uncertainty.

The likelihood maximization unit 2000-1 may be cooperated with the initialization unit 1000. Namely, the likelihood maximization unit 2000-1 may be adapted to receive inputs of the digitized waveform initial source signal estimate ŝ[n], the source signal uncertainty $\sigma_{l,m,k}^{(sr)}$, and the acoustic ambient uncertainty $\sigma_{l,k'}^{(a)}$ from the initialization unit 1000. The likelihood maximization unit 2000-1 may also be adapted to receive another input of the digitized waveform observed signal x[n] as the observed signal. ŝ[n] is the digitized waveform initial source signal estimate. $\sigma_{l,m,k}^{(sr)}$ is a first variance representing the source signal uncertainty. $\sigma_{l,k'}^{(a)}$ is the second variance representing the acoustic ambient uncertainty. The likelihood maximization unit 2000-1 may also be adapted to determine an inverse filter estimate $\tilde{w}_{k'}$ that maximizes a likelihood function, wherein the determination is made with reference to the digitized waveform observed signal x[n], the digitized waveform initial source signal estimate $\hat{s}[n]$, the first variance $\sigma_{l,m,k}^{(sr)}$ representing the source signal uncertainty, and the second variance $\sigma_{l,k'}^{(a)}$ representing the acoustic ambient uncertainty. In general, the likelihood function may be defined based on a probability density function that is evaluated in accordance with a first unknown parameter, a second unknown parameter, and a first random variable of observed data. The first unknown parameter is defined with reference to a source signal estimate. The second unknown parameter is defined with reference to an inverse filter of a room transfer function. The first random variable of observed data is defined with reference to the observed signal and the initial source signal estimate. The inverse filter estimate is an estimate of the inverse filter of the room transfer function. The determination of the inverse filter estimate $\tilde{w}_{k'}$ is carried out using an iterative optimization algorithm.

The iterative optimization algorithm may be organized without using the above-described expectation-maximization algorithm. For example, the inverse filter estimate $\tilde{w}_{k'}$ and the source signal estimate $\tilde{\theta}_k$ can be obtained as ones that maximize the likelihood function defined as follows:

$$L\{w_{k'},\theta_k\} = p\{w_{k'}, z_k^{(r)}|\theta_k\} = p\{w_{k'}, \{x_{l,m,k}^{(r)}\}_k|\theta_k\}p\{\{\hat{s}_{l,m,k}^{(r)}\}_k|\theta_k\}. \quad (16)$$

This likelihood function can be maximized by the next iterative algorithm.

The first step is to set the initial value as $\theta_k=\hat{\theta}_k$.

The second step is to calculate the inverse filter estimate $w_{k'}=\tilde{w}_{k'}$ that maximizes the likelihood function under the condition where $\theta_k$ is fixed.

The third step is to calculate the source signal estimate $\theta_k=\tilde{\theta}_k$ that maximizes the likelihood function under the condition where $w_{k'}$ is fixed.

The fourth step is to repeat the above-described second and third steps until a convergence of the iteration is confirmed.

When the same definitions, as the above equation (8) are adopted for the probability density functions (pdfs) in the above likelihood function, it is easily shown that the inverse filter estimate $\tilde{w}_{k'}$ in the above second step and the source signal estimate $\tilde{\theta}_k$ in the above third step can be obtained by the above-described equations (12) and (15), respectively. The above convergence confirmation in the fourth step may be done by checking if the difference between the currently obtained value for the inverse filter estimate $\tilde{w}_{k'}$ and the previously obtained value for the same is less than a predetermined threshold value. Finally, the observed signal may be dereverberated by applying the inverse filter estimate $\tilde{w}_{k'}$ obtained in the above second step to the observed signal.

The inverse filter application unit 5000 may be cooperated with the likelihood maximization unit 2000-1. Namely, the inverse filter application unit 5000 may be adapted to receive, from the likelihood maximization unit 2000-1, inputs of the inverse filter estimate $\tilde{w}_{k'}$ that maximizes the likelihood function (16). The inverse filter application unit 5000 may also be adapted to receive the digitized waveform observed signal x[n]. The inverse filter application unit 5000 may also be adapted to apply the inverse filter estimate $\tilde{w}_{k'}$ to the digitized waveform observed signal x[n] so as to generate a recovered digitized waveform source signal estimate $\tilde{s}[n]$ or a filtered digitized waveform source signal estimates $\bar{s}[n]$.

In a case, the inverse filter application unit 5000 may be adapted to apply a long time Fourier transformation to the digitized waveform observed signal x[n] to generate a transformed observed signal $x_{l,k'}$. The inverse filter application unit 5000 may further be adapted to multiply the transformed observed signal $x_{l,k'}$ in each frame by the inverse filter estimate $\tilde{w}_{k'}$ to generate a filtered source signal estimate $\bar{s}_{l,k'}=\tilde{w}_{k'}x_{l,k'}$. The inverse filter application unit 5000 may further be adapted to apply an inverse long time Fourier transformation to the filtered source signal estimate $\bar{s}_{l,k'}=\tilde{w}_{k'}x_{l,k'}$ to generate a filtered digitized waveform source signal estimate $\bar{s}[n]$.

In another case, the inverse filter application unit 5000 may be adapted to apply an inverse long time Fourier transformation to the inverse filter estimate $\tilde{w}_{k'}$ to generate a digitized waveform inverse filter estimate $\tilde{w}[n]$. The inverse filter application unit 5000 may be adapted to convolve the digitized waveform observed signal x[n] with the digitized waveform inverse filter estimate $\tilde{w}[n]$ to generate a recovered digitized waveform source signal estimate $\bar{s}[n]=\Sigma_m x[n-m]\tilde{w}[m]$.

Figure 13:
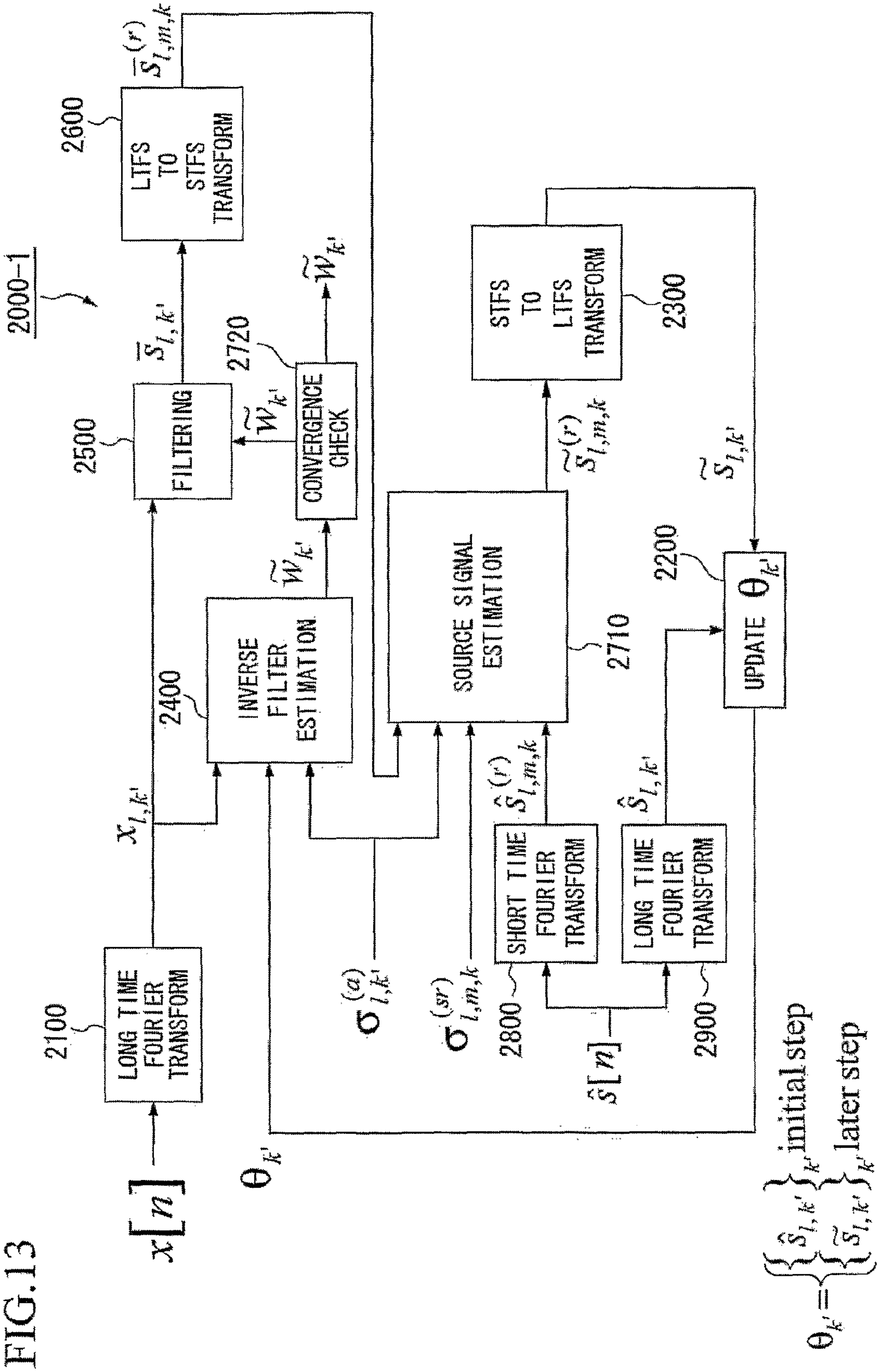
FIG. 13 is a block diagram illustrating a configuration of a likelihood maximization unit included in the speech dereverberation apparatus shown in FIG. 12.

The likelihood maximization, unit 2000-1 can be realized by a set of sub-functional units that are cooperated with each other to determine and output the inverse filter estimate $\tilde{w}_{k'}$ that maximizes the likelihood function. FIG. 13 is a block diagram illustrating a configuration of the likelihood maximization unit 2000-1 shown in FIG. 12. In one case, the likelihood maximization unit 2000-1 may further include the above-described long-time Fourier transform unit 2100, the above-described update unit 2200, the above-described STFS-to-LTFS transform unit 2300, the above-described inverse filter estimation unit 2400, the above-described filtering unit 2500, an LTFS-to-STFS transform unit 2600, a source signal estimation unit 2710, a convergence check unit 2720, the above-described short time Fourier transform unit 2800, and the above-described long time Fourier transform unit 2900. Those units are cooperated to continue to perform iterative operations until the inverse filter estimate that maximizes the likelihood function has been determined.

The long-time Fourier transform unit 2100 is adapted to receive the digitized waveform observed signal x[n] as the observed signal from the initialization unit 1000. The long-time Fourier transform unit 2100 is also adapted to perform a long-time Fourier transformation of the digitized waveform observed signal x[n] into a transformed observed signal $x_{l,k'}$ long term Fourier spectra (LTFSs).

The short-time Fourier transform unit 2800 is adapted to receive the digitized waveform initial source signal estimate $\hat{s}[n]$ from the initialization unit 1000. The short-time Fourier transform unit 2800 is adapted to perform a short-time Fourier transformation of the digitized waveform initial source signal estimate $\hat{s}[n]$ into an initial source signal estimate $\hat{s}_{l,m,k}^{(r)}$.

The long-time Fourier transform unit 2900 is adapted to receive the digitized waveform initial source signal estimate $\hat{s}[n]$ from the initialization unit 1000. The long-time Fourier transform unit 2900 is adapted to perform a long-time Fourier transformation of the digitized waveform initial source signal estimate $\hat{s}[n]$ into an initial source signal estimate $\hat{s}_{l,k'}$.

The update unit 2200 is cooperated with the long-time Fourier transform unit 2900 and the STFS-to-LTFS transform unit 2300. The update unit 2200 is adapted to receive an initial source signal estimate $\hat{s}_{l,k'}$ in the initial step of the iteration from the long-time Fourier transform unit 2900 and is further adapted to substitute the source signal estimate $\theta_{k'}$ for $\{\hat{s}_{l,k'}\}_{k'}$. The update unit 2200 is furthermore adapted to send the updated source signal estimate $\theta_{k'}$ to the inverse filter estimation unit 2400. The update unit 2200 is also adapted to receive a source signal estimate $\tilde{s}_{l,k'}$ in the later step of the iteration from the STFS-to-LTFS transform unit 2300, and to substitute the source signal estimate $\theta_{k'}$ for $\{\tilde{s}_{l,k'}\}_{k'}$. The update unit 2200 is also adapted to send the updated source signal estimate $\theta_{k'}$ to the inverse filter estimation unit 2400.

The inverse filter estimation unit 2400 is cooperated with the long-time Fourier transform unit 2100, the update unit 2200 and the initialization unit 1000. The inverse filter estimation unit 2400 is adapted to receive the observed signal $x_{l,k'}$ from the long-time Fourier transform unit 2100. The inverse filter estimation unit 2400 is also adapted to receive the updated source signal estimate $\theta_{k'}$ from the update unit 2200. The inverse filter estimation unit 2400 is also adapted to receive the second variance $\sigma_{l,k'}^{(a)}$ representing the acoustic ambient uncertainty from the initialization unit 1000. The inverse filter estimation unit 2400 is further adapted to calculate an inverse filter estimate $\tilde{w}_{k'}$, based on the observed signal $x_{l,k'}$, the updated source signal estimate $\theta_{k'}$, and the second variance $\sigma_{l,k'}^{(a)}$ representing the acoustic ambient uncertainty in accordance with the above equation (12). The inverse filter estimation unit 2400 is further adapted to output the inverse filter estimate $\tilde{w}_{k'}$.

The convergence check unit 2720 is cooperated with the inverse filter estimation unit 2400. The convergence check unit 2720 is adapted to receive the inverse filter estimate $\tilde{w}_{k'}$ from the inverse filter estimation unit 2400. The convergence check unit 2720 is adapted to determine the status of convergence of the iterative procedure, for example, by comparing a current value of the inverse filter estimate $\tilde{w}_{k'}$ that has currently been estimated to a previous value of the inverse filter estimate $\tilde{w}_{k'}$ that has previously been estimated, and checking whether or not the current value deviates from the previous value by less than a certain predetermined amount. If the convergence check unit 2720 confirms that the current value of the inverse filter estimate $\tilde{w}_{k'}$ deviates from the previous value thereof by less than the certain predetermined amount, then the convergence check unit 2720 recognizes that the convergence of the inverse filter estimate $\tilde{w}_{k'}$ has been obtained. If the convergence check unit 2720 confirms that the current value of the inverse filter estimate $\tilde{w}_{k'}$ deviates from the previous value thereof by not less than the certain predetermined amount, then the convergence check unit 2720 recognizes that the convergence of the inverse filter estimate $\tilde{w}_{k'}$ has not yet been obtained.

It is possible as a modification that the iterative procedure is terminated when the number of iterations reaches a certain predetermined value. Namely, the convergence check unit 2720 has confirmed that the number of iterations reaches a certain predetermined value, then the convergence check unit 2720 recognizes that the convergence of the inverse filter estimate $\tilde{w}_{k'}$ has been obtained. If the convergence check unit 2720 has confirmed that the convergence of the inverse filter estimate $\tilde{w}_{k'}$ has been obtained, then the convergence check unit 2720 provides the inverse filter estimate $\tilde{w}_{k'}$ as a first output to the inverse filter application unit 5000. If the convergence check unit 2720 has confirmed that the convergence of the inverse filter estimate $\tilde{w}_{k'}$ has not yet been obtained, then the convergence check unit 2720 provides the inverse filter estimate $\tilde{w}_{k'}$ as a second output to the filtering unit 2500.

The filtering unit 2500 is cooperated with the long-time Fourier transform unit 2100 and the convergence check unit 2720. The filtering unit 2500 is adapted to receive the observed signal $x_{l,k'}$ from the long-time Fourier transform unit 2100. The filtering unit 2500 is also adapted to receive the inverse filter estimate $\tilde{w}_{k'}$ from the convergence check unit 2720. The filtering unit 2500 is also adapted to apply the observed signal $x_{l,k'}$ to the inverse filter estimate $\tilde{w}_{k'}$ to generate a filtered source, signal estimate $\bar{s}_{l,k'}$. A typical example of the filtering process for applying the observed signal $x_{l,k'}$ to the inverse filter estimate $\tilde{w}_{k'}$ may include, but is not limited to, calculating a product $\tilde{w}_{k'}x_{l,k'}$ of the observed signal $x_{l,k'}$ and the inverse filter estimate $\tilde{w}_{k'}$. In this case, the filtered source signal estimate $\bar{s}_{l,k'}$ is given by the $\tilde{w}_{k'}x_{l,k'}$ product of the observed signal $x_{l,k'}$ and the inverse filter estimate $\tilde{w}_{k'}$.

The LTFS-to-STFS transform unit 2600 is cooperated with the filtering unit 2500. The LTFS-to-STFS transform unit 2600 is adapted to receive the filtered source signal estimate $\bar{s}_{l,k'}$ from the filtering unit 2500. The LTFS-to-STFS transform unit 2600 is further adapted to perform an LTFS-to-STFS transformation of the filtered source signal estimate $\bar{s}_{l,k'}$ into a transformed filtered source signal estimate $\bar{s}_{l,m,k}^{(r)}$. When the filtering process is to calculate the product $\tilde{w}_{k'}x_{l,k'}$ of the observed signal $x_{l,k'}$ and the inverse filter estimate $\tilde{w}_{k'}$, the LTFS-to-STFS transform unit 2600 is further adapted to perform an LTFS-to-STFS transformation of the product $\tilde{w}_{k'}x_{l,k'}$ into a transformed signal $LS_{m,k}\{\{\tilde{w}_{k'}x_{l,k'}\}_l\}$. In this case, the product $\tilde{w}_{k'}x_{l,k'}$ represents the filtered source signal estimate $\bar{s}_{l,k'}$, and the transformed signal $LS_{m,k}\{\{\tilde{w}_{k'}x_{l,k'}\}_l\}$ represents the transformed filtered source signal estimates $\bar{s}_{l,m,k}^{(r)}$.

The source signal estimation unit 2710 is cooperated with the LTFS-to-STFS transform unit 2600, the short time Fourier transform unit 2800, and the initialization unit 1000. The source signal estimation unit 2710 is adapted to receive the transformed filtered source signal estimate $\bar{s}_{l,m,k}^{(r)}$ from the LTFS-to-STFS transform unit 2600. The source signal estimation unit 2710 is also adapted to receive, from the initialization unit 1000, the first variance $\sigma_{l,m,k}^{(sr)}$ representing the source signal uncertainty and the second variance $\sigma_{l,k'}^{(a)}$ representing the acoustic ambient uncertainty. The source signal estimation unit 2710 is also adapted to receive the initial source signal estimate $\hat{s}_{l,m,k}^{(r)}$ from the short-time Fourier transform unit 2800. The source signal estimation unit 2710 is further adapted to estimate a source signal $\tilde{s}_{l,m,k}^{(r)}$ based on the transformed filtered source signal estimate $\bar{s}_{l,m,k}^{(r)}$, the first variance $\sigma_{l,m,k}^{(sr)}$ representing the source signal uncertainty, the second variance $\sigma_{l,k'}^{(a)}$ representing the acoustic ambient uncertainty and the initial source signal estimate $\hat{s}_{l,m,k}^{(r)}$, wherein the estimation is made in accordance with the above equation (15).

The STFS-to-LTFS transform unit 2300 is cooperated with the source signal estimation unit 2710. The STFS-to-LTFS transform unit 2300 is adapted to receive the source signal estimate $\tilde{s}_{l,m,k}^{(r)}$ from the source signal estimation unit 2710. The STFS-to-LTFS transform unit 2300 is adapted to perform an STFS-to-LTFS transformation of the source signal estimate $\tilde{s}_{l,m,k}^{(r)}$ into a transformed source signal estimate $\tilde{s}_{l,k'}$.

In the later steps of the iteration operation, the update unit 2200 receives the source signal estimate $\tilde{s}_{l,k'}$ from the STFS-to-LTFS transform unit 2300, and to substitute the source signal estimate $\theta_{k'}$ for $\{\tilde{s}_{l,k'}\}_{k'}$ and send the updated source signal estimate $\theta_{k'}$ to the inverse filter estimation unit 2400. In the initial step of iteration, the updated source signal estimate $\theta_{k'}$ is $\{\hat{s}_{l,k'}\}_{k'}$ that is supplied from the long time Fourier transform unit 2900. In the second or later steps of the iteration, the updated source signal estimate $\theta_{k'}$ is $\{\tilde{s}_{l,k'}\}_{k'}$.

Operations of the likelihood maximization unit 2000-1 will be described with reference to FIG. 13.

In the initial step of iteration, the digitized waveform observed signal x[n] is supplied to the long-time Fourier transform unit 2100. The long-time Fourier transformation is performed by the long-time Fourier transform unit 2100 so that the digitized waveform observed signal x[n] is transformed, into the transformed observed signal $x_{l,k'}$ as long term Fourier spectra (LTFSs). The digitized waveform initial source signal estimate ŝ[n] is supplied from the initialization unit 1000 to the short-time Fourier transform unit 2800 and the long-time Fourier transform unit 2900. The short-time Fourier transformation is performed by the short-time Fourier transform unit 2800 so that the digitized waveform initial source signal estimate $\hat{s}[n]$ is transformed into the initial source signal estimate $\hat{s}_{l,m,k}^{(r)}$. The long-time Fourier transformation is performed by the long-time Fourier transform unit 2900 so that the digitized waveform initial source signal estimate $\hat{s}[n]$ is transformed into the initial source signal estimate $\hat{s}_{l,k'}$.

The initial source signal estimate $\hat{s}_{l,k'}$ is supplied from the long-time Fourier transform unit 2900 to the update unit 2200. The source signal estimate $\theta_{k'}$ is substituted for the initial source signal estimate $\{\hat{s}_{l,k'}\}_{k'}$ by the update unit 2200. The initial source signal estimate $\theta_{k'}=\{\hat{s}_{l,k'}\}_{k'}$ is then supplied from the update unit 2200 to the inverse filter estimation unit 2400. The observed signal $x_{l,k'}$ is supplied from the long-time Fourier transform unit 2100 to the inverse filter estimation unit 2400. The second variance $\sigma_{l,k'}^{(a)}$ representing the acoustic ambient uncertainty is supplied from the initialization unit 1000 to the inverse filter estimation unit 2400. The inverse filter estimate $\tilde{w}_{k'}$ is calculated by the inverse filter estimation unit 2400 based on the observed signal $x_{l,k'}$, the initial source signal estimate $\theta_{k'}$, and the second variance $\sigma_{l,k'}^{(a)}$ representing the acoustic ambient uncertainty, wherein the calculation is made in accordance with the above equation (12).

The inverse filter estimate $\tilde{w}_{k'}$ is supplied from the inverse filter estimation unit 2400 to the convergence check unit 2720. The determination on the status of convergence of the iterative procedure is made by the convergence check unit 2720. For example, the determination is made by comparing a current value of the inverse filter estimate $\tilde{w}_{k'}$ that has currently been estimated to a previous value of the inverse filter estimate $\tilde{w}_{k'}$ that has previously been estimated. It is checked by the convergence check unit 2720 whether or not the current value deviates from the previous value by less than a certain predetermined amount. If it is confirmed by the convergence check unit 2720 that the current value of the inverse filter estimate $\tilde{w}_{k'}$ deviates from the previous value thereof by less than the certain predetermined amount, then it is recognized by the convergence check unit 2720 that the convergence of the inverse filter estimate $\tilde{w}_{k'}$ has been obtained. If it is confirmed by the convergence check unit 2720 that the current value of the inverse filter estimate $\tilde{w}_{k'}$ deviates from the previous value thereof by not less than the certain predetermined amount, then it is recognized by the convergence check unit 2720 that the convergence of the inverse filter estimate $\tilde{w}_{k'}$ has not yet been obtained.

If the convergence of the inverse filter estimate $\tilde{w}_{k'}$ has been obtained, then the inverse filter estimate $\tilde{w}_{k'}$ is supplied from the convergence check unit 2720 to the inverse filter application unit 5000. If the convergence of the inverse filter estimate $\tilde{w}_{k'}$ has not yet been obtained, then the inverse filter estimate $\tilde{w}_{k'}$ is supplied from the convergence check unit 2720 to the filtering unit 2500. The observed signal $x_{l,k'}$ is further supplied from the long-time Fourier transform unit 2100 to the filtering unit 2500. The inverse filter estimate $\tilde{w}_{k'}$ is applied by the filtering unit 2500 to the observed signal $x_{l,k'}$ to generate the filtered source signal estimate $\bar{s}_{l,k'}$. A typical example of the filtering process for applying the observed signal $x_{l,k'}$ to the inverse filter estimate $\tilde{w}_{k'}$ may be to calculate the product $\tilde{w}_{k'}x_{l,k'}$ of the observed signal $x_{l,k'}$ and the inverse filter estimate $\tilde{w}_{k'}$. In this case, the filtered source signal estimate $\bar{s}_{l,k'}$ is given by the product $\tilde{w}_{k'}x_{l,k'}$ of the observed signal $x_{l,k'}$ and the inverse filter estimate $\tilde{w}_{k'}$.

The filtered source signal estimate $\bar{s}_{l,k'}$ is supplied from the filtering unit 2500 to the LTFS-to-STFS transform unit 2600. The LTFS-to-STFS transformation is performed by the LTFS-to-STFS transform unit 2600 so that the filtered source signal estimate $\bar{s}_{l,k'}$ is transformed into the transformed filtered source signal estimate $\bar{s}_{l,m,k}^{(r)}$. When the filtering process is to calculate the product $\tilde{w}_{k'}x_{l,k'}$ of the observed signal $x_{l,k'}$ and the inverse filter estimate $\tilde{w}_{k'}$, the product $\tilde{w}_{k'}x_{l,k'}$ is transformed into a transformed signal $LS_{m,k}\{\{\tilde{w}_{k'}x_{l,k'}\}_{l}\}$.

The transformed filtered source signal estimate $\bar{s}_{l,m,k}^{(r)}$ supplied from the LTFS-to-STFS transform unit 2600 to the source signal estimation unit 2710. Both the first variance $\sigma_{l,m,k}^{(sr)}$ representing the source signal uncertainty and the second variance $\sigma_{l,k'}^{(a)}$ representing the acoustic ambient uncertainty are supplied from the initialization unit 1000 to the source signal estimation unit 2710. The initial source signal estimate $\hat{s}_{l,m,k}^{(r)}$ is supplied from the short-time Fourier transform unit 2800 to the source signal estimation unit 2710. The source signal estimate $\tilde{s}_{l,m,k}^{(r)}$ is calculated by the source signal estimation, unit 2710 based on the transformed filtered, source signal estimate $\bar{s}_{l,m,k}^{(r)}$, the first variance $\sigma_{l,m,k}^{(sr)}$ representing the source signal uncertainty, the second variance $\sigma_{l,k'}^{(a)}$ representing the acoustic ambient uncertainty and the initial source signal estimate $\hat{s}_{l,m,k}^{(r)}$, wherein the estimation is made in accordance with the above equation (15).

The source signal estimate $\tilde{s}_{l,m,k}^{(r)}$ is supplied from the source signal estimation unit 2710 to the STFS-to-LTFS transform unit 2300 so that the source signal estimate $\tilde{s}_{l,m,k}^{(r)}$ is transformed into the transformed source signal estimate $\tilde{s}_{l,k'}$. The transformed source signal estimate $\tilde{s}_{l,k'}$ is supplied from the STFS-to-LTFS transform unit 2300 to the update unit 2200. The source signal estimate $\theta_{k'}$ is substituted for the transformed source signal estimate $\{\tilde{s}_{l,k'}\}_{k'}$ by the update unit 2200. The updated source signal estimate $\theta_{k'}$ is supplied from the update unit 2200 to the inverse filter estimation unit 2400.

In the second or later steps of iteration, the source signal estimate $\theta_{k'}=\{\tilde{s}_{l,k'}\}_{k'}$ is then supplied from the update unit 2200 to the inverse filter estimation unit 2400. The observed signal $x_{l,k'}$ is also supplied from, the long-time Fourier transform unit 2100 to the inverse filter estimation unit 2400. The second variance $\sigma_{l,k'}^{(a)}$ representing the acoustic ambient uncertainty is supplied from the initialization unit 1000 to the inverse filter estimation unit 2400. An updated inverse filter estimate $\tilde{w}_{k'}$ is calculated by the inverse filter estimation unit 2400 based on the observed signal $x_{l,k'}$, the updated source signal estimate $\theta_{k'}=\{\tilde{s}_{l,k'}\}_{k'}$, and the second variance $\sigma_{l,k'}^{(a)}$ representing the acoustic ambient uncertainty, wherein the calculation is made in accordance with the above equation (12).

The updated inverse filter estimate $\tilde{w}_{k'}$ is supplied from the inverse filter estimation unit 2400 to the convergence check unit 2720. The determination on the status of convergence of the iterative procedure is made by the convergence check unit 2720.

The above-described iteration procedure will be continued until it has been confirmed by the convergence check unit 2720 that the convergence of the inverse filter estimate $\tilde{w}_{k'}$ has been obtained.

Figure 14:
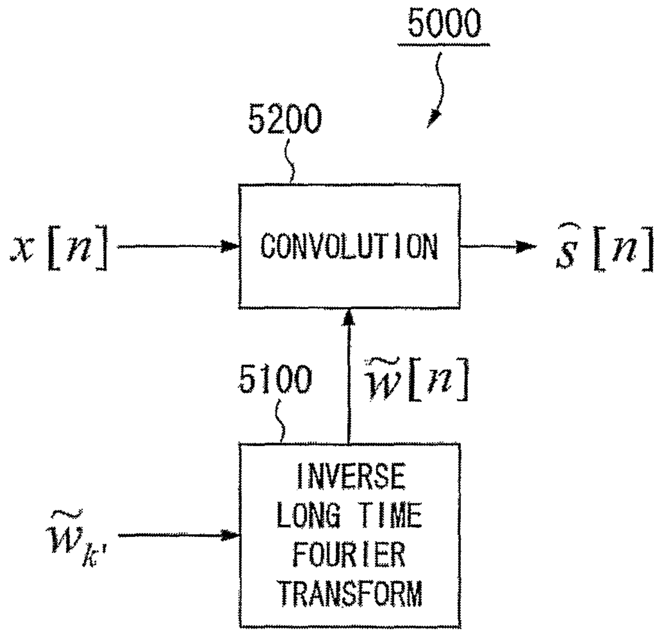
FIG. 14 is a block diagram illustrating a configuration of an inverse filter application unit included in the speech dereverberation apparatus shown in FIG. 12.

FIG. 14 is a block diagram illustrating a configuration of the inverse filter application unit 5000 shown in FIG. 12. A typical example of the inverse filter application unit 5000 may include, but is not limited to, an inverse long time Fourier transform unit 5100 and a convolution unit 5200. The inverse long time Fourier transform unit 5100 is cooperated with the likelihood maximization unit 2000-1. The inverse long time Fourier transform unit 5100 is adapted to receive the inverse filter estimate $\tilde{w}_{k'}$ from the likelihood maximization unit 2000-1. The inverse long time Fourier transform unit 5100 is further adapted to perform an inverse long time Fourier transformation of the inverse filter estimate $\tilde{w}_{k'}$ into a digitized waveform inverse filter estimate $\tilde{w}[n]$.

The convolution unit 5200 is cooperated with the inverse long time Fourier transform unit 5100. The convolution unit 5200 is adapted to receive the digitized waveform inverse filter estimate $\tilde{w}[n]$ from the inverse long time Fourier transform unit 5100. The convolution unit 5200 is also adapted to receive the digitized waveform observed signal x[n]. The convolution unit 5200 is also adapted to perform convolution process to convolve the digitized waveform observed signal x[n] with the digitized waveform inverse filter estimate $\tilde{w}[n]$ to generate a recovered digitized waveform source signal estimates $\tilde{s}[n]=\Sigma_m x[n-m]\tilde{w}[m]$ as the dereverberated signal.

Figure 15:
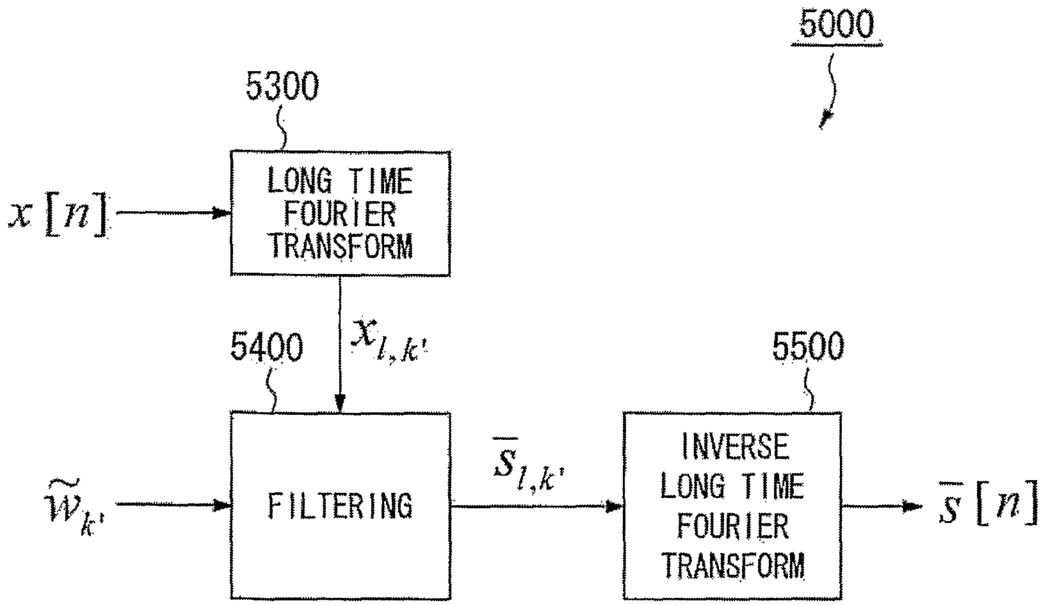
FIG. 15 is a block diagram illustrating a configuration of another inverse filter application unit included in the speech dereverberation apparatus shown in FIG. 12.
Figure 16A:
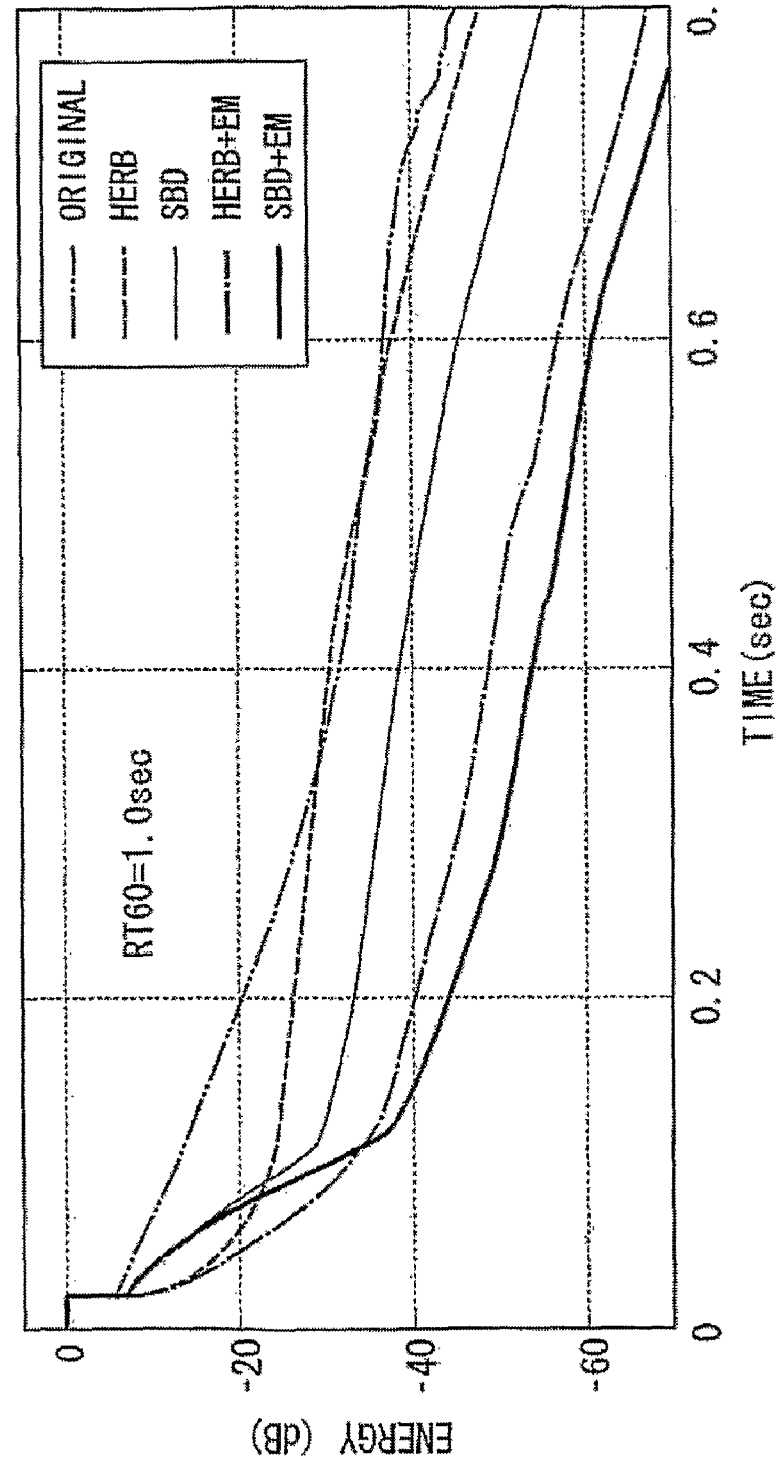
FIG. 16A illustrates the energy decay curve at RT60=1.0 sec., when uttered by a woman.
Figure 16B:
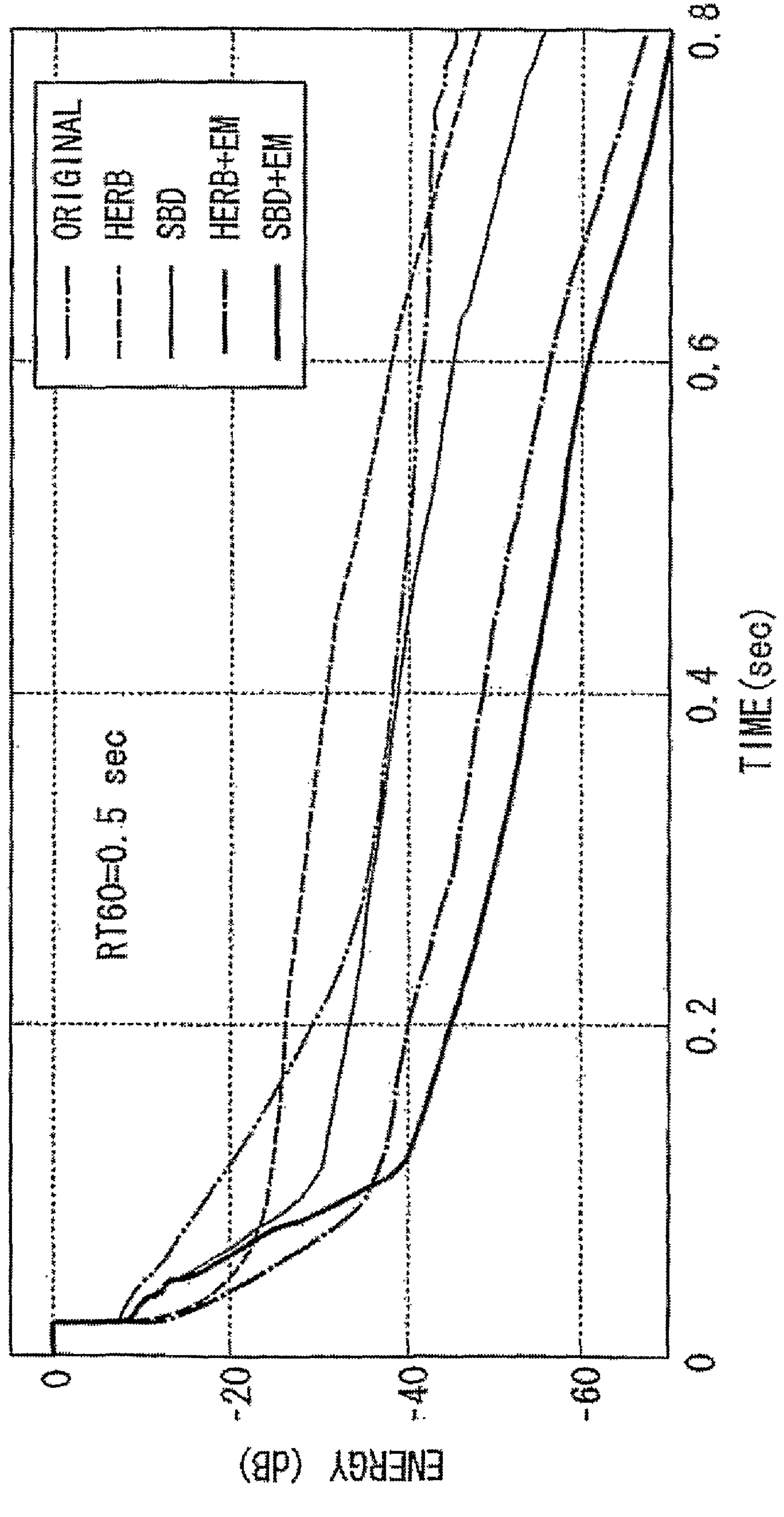
FIG. 16B illustrates the energy decay curve at RT60=0.5 sec., when uttered by a woman.
Figure 16C:
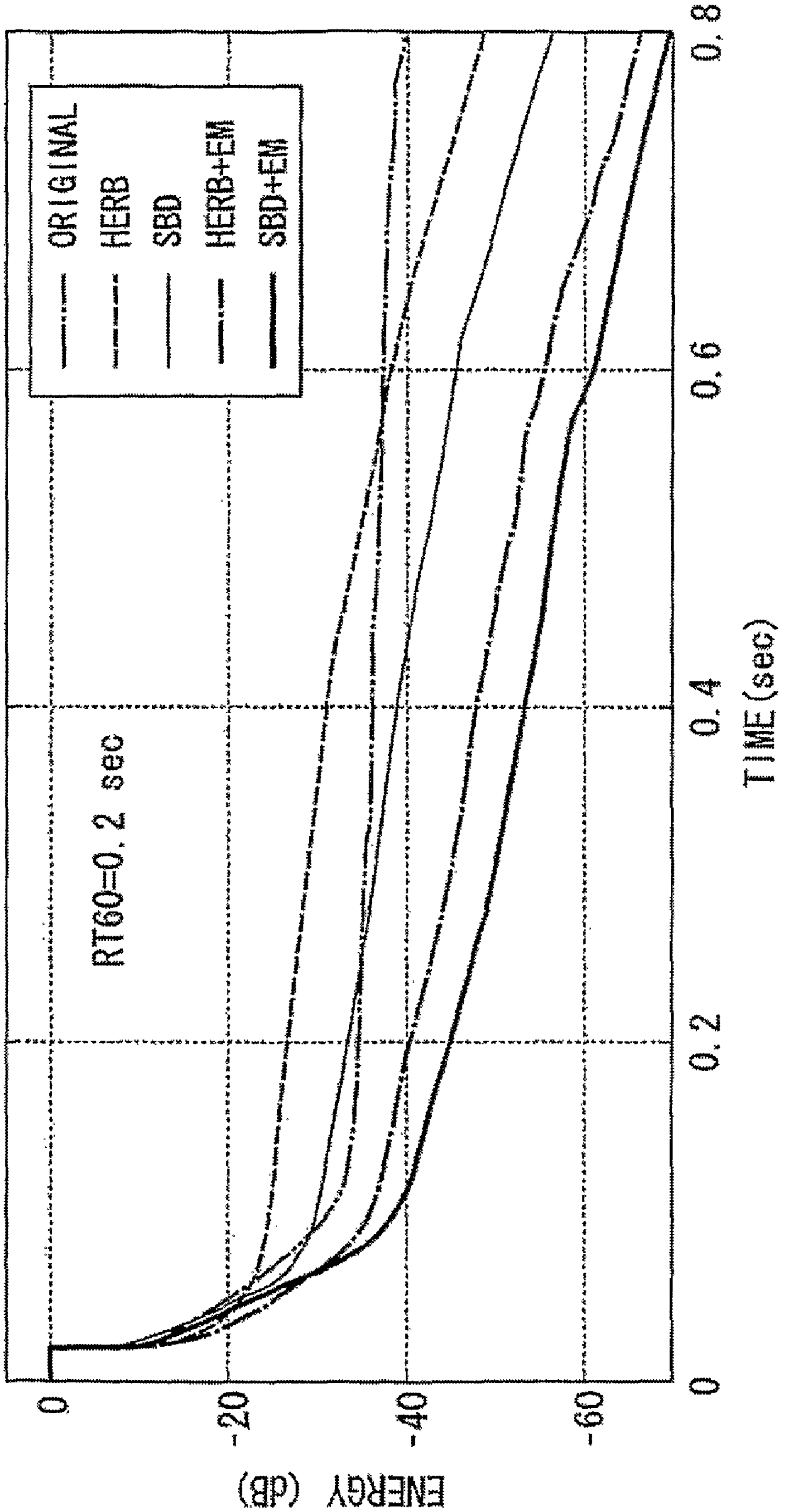
FIG. 16C illustrates the energy decay curve at RT60=0.2 sec., when uttered by a woman.
Figure 16D:
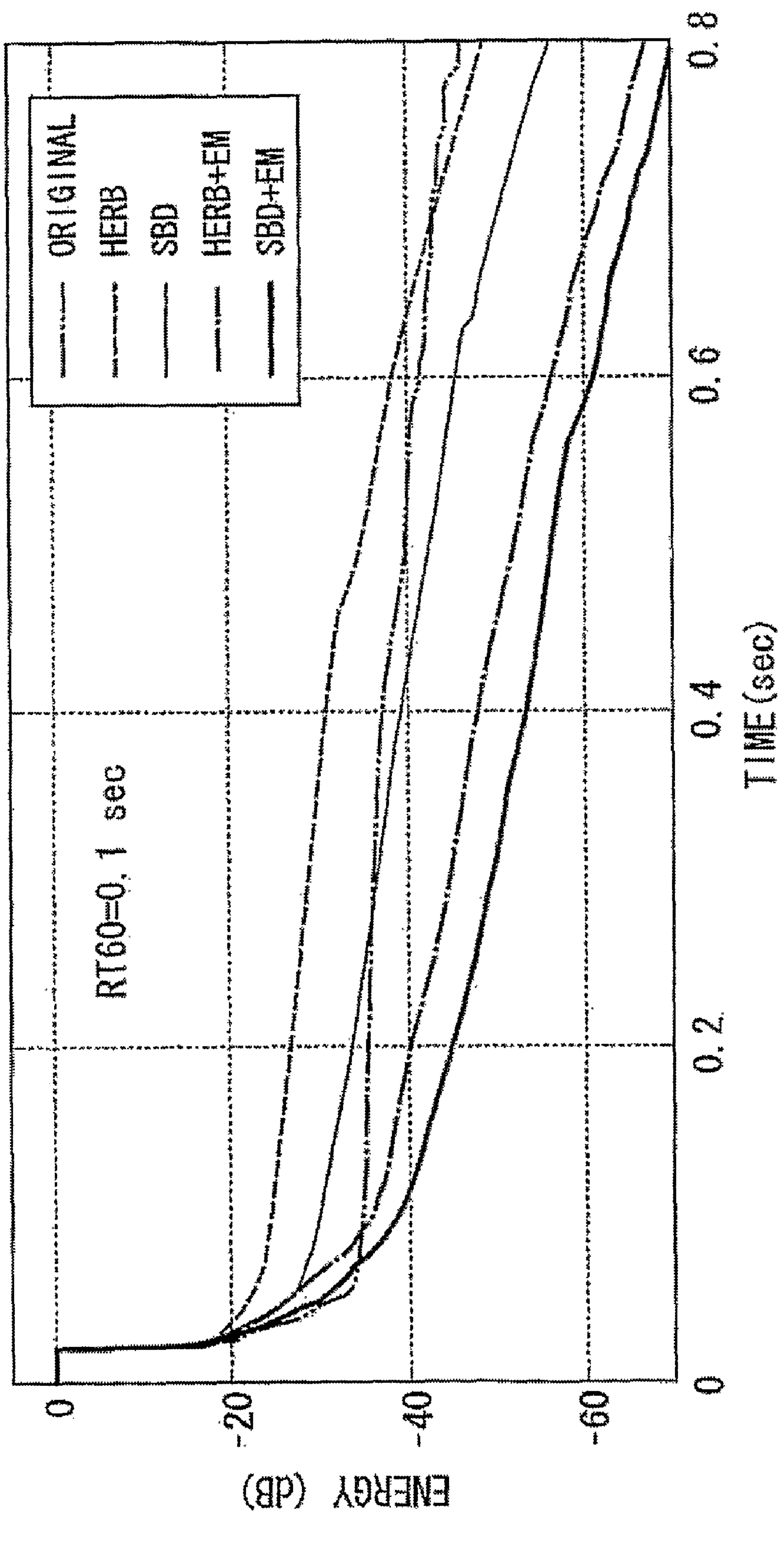
FIG. 16D illustrates the energy decay curve at RT60=0.1 sec., when uttered by a woman.
Figure 16E:
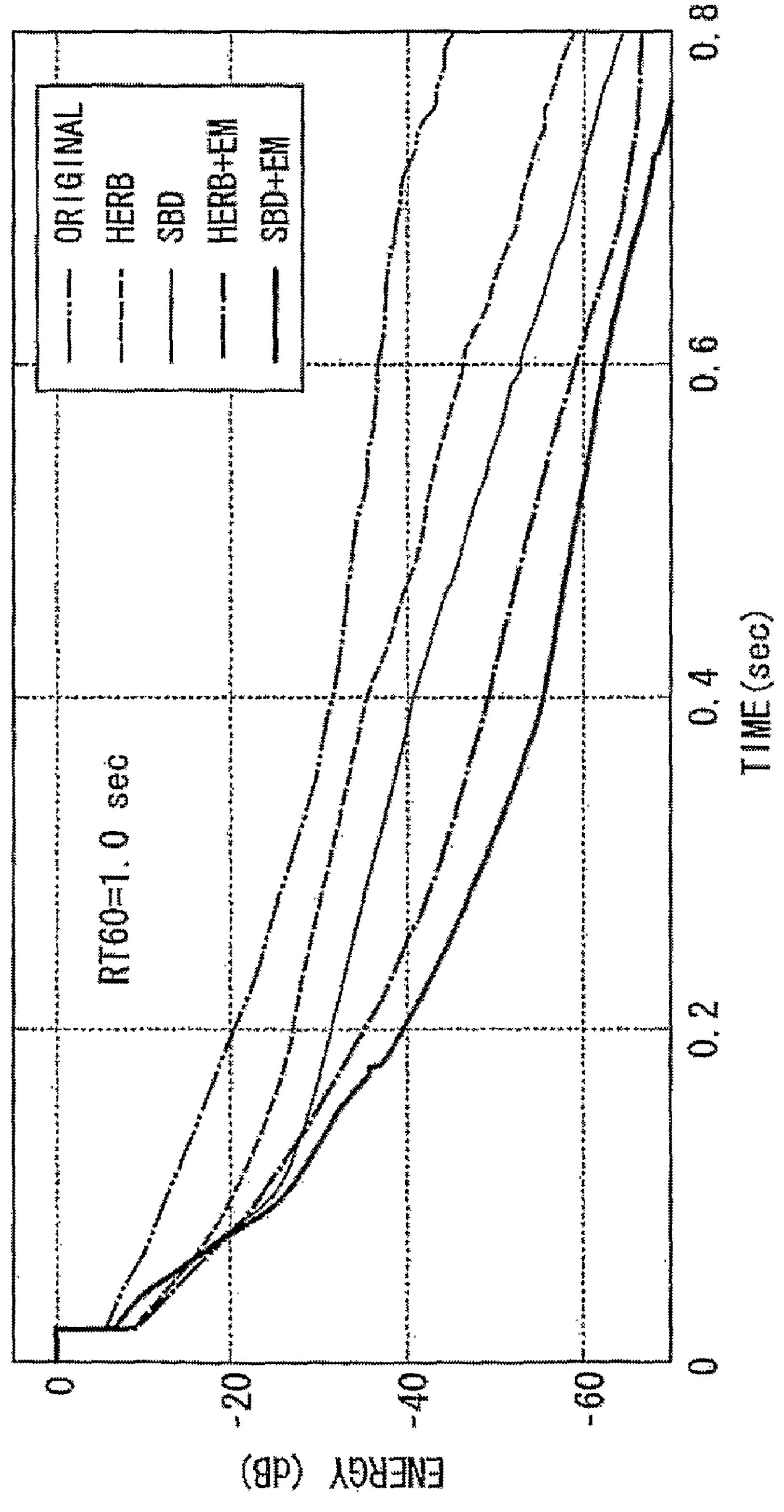
FIG. 16E illustrates the energy decay curve at RT60=1.0 sec., when uttered by a man.
Figure 16F:
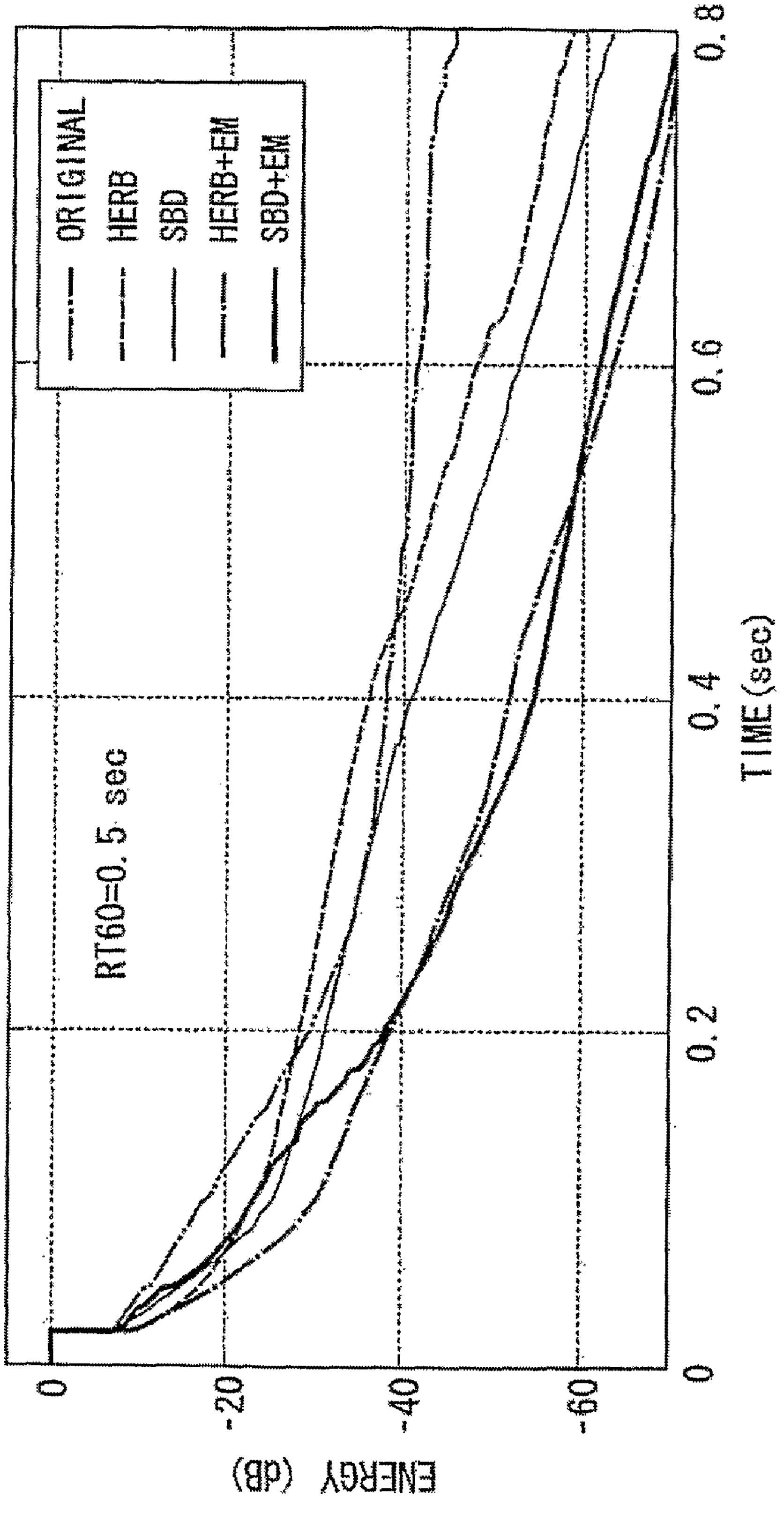
FIG. 16F illustrates the energy decay curve at RT60=0.5 sec., when uttered by a man.
Figure 16G:
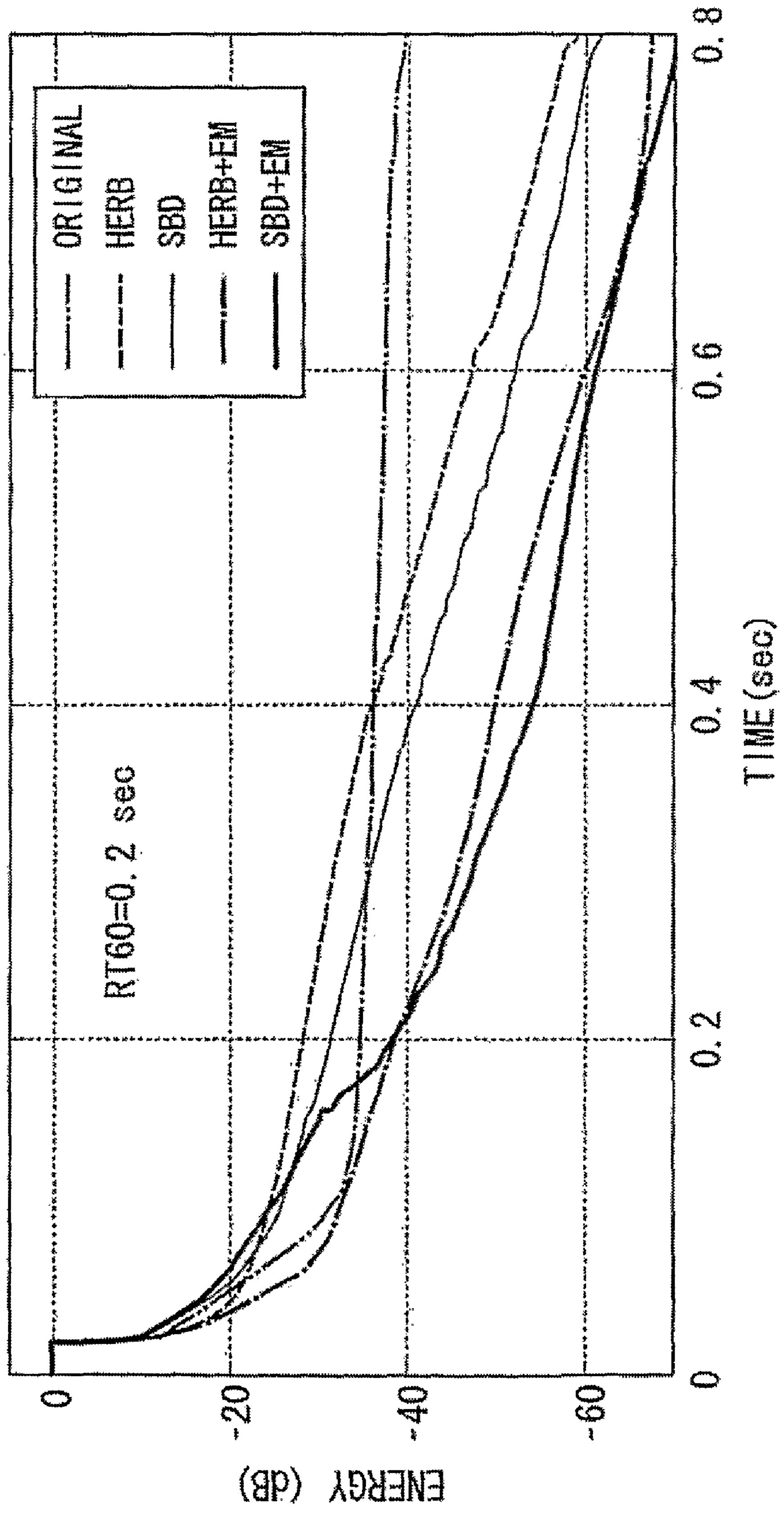
FIG. 16G illustrates the energy decay curve at RT60=0.2 sec., when uttered by a man.
Figure 16H:
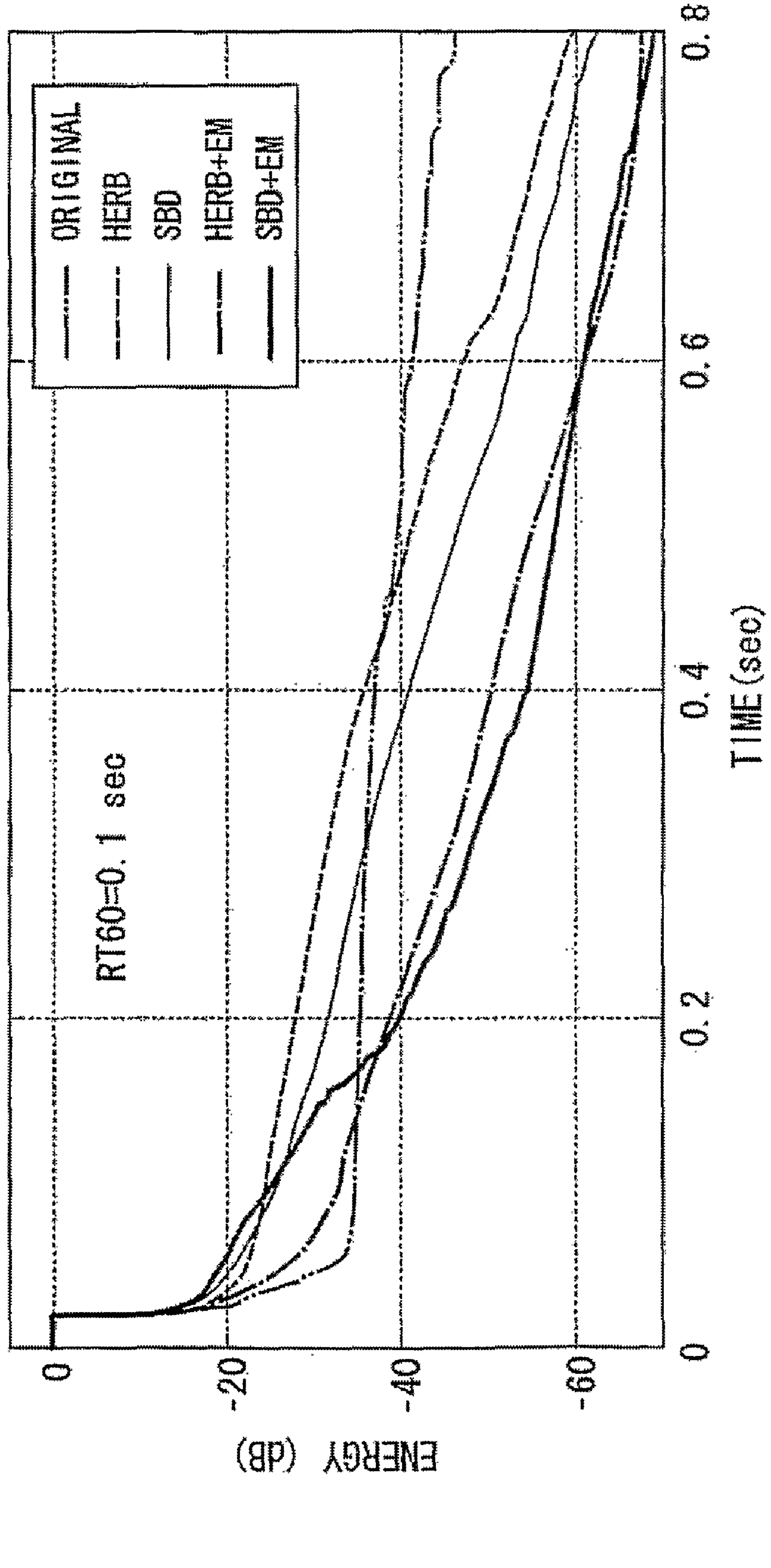
FIG. 16H illustrates the energy decay curve at RT60=0.1 sec., when uttered by a man.

FIG. 15 is a block diagram illustrating a configuration of the inverse filter application unit 5000 shown in FIG. 12. A typical, example of the inverse filter application unit 5000 may include, but is not limited to, a long time Fourier transform unit 5300, a filtering unit 5400, and an inverse long time Fourier transform unit 5500. The long time Fourier transform unit 5300 is adapted to receive the digitized waveform observed signal x[n]. The long time Fourier transform unit 5300 is adapted to perform a long time Fourier transformation of the digitized waveform observed signal x[n] into a transformed observed signal $x_{l,k'}$.

The filtering unit 5400 is cooperated with the long time Fourier transform unit 5300 and the likelihood maximization unit 2000-1. The filtering unit 5400 is adapted to receive the transformed observed signal $x_{l,k'}$ from the longtime Fourier transform unit 5300. The filtering unit 5400 is also adapted to receive the inverse filter estimate $\tilde{w}_{k'}$ from the likelihood maximization unit 2000-1. The filtering unit 5400 is further adapted to apply the inverse filter estimate $\tilde{w}_{k'}$ to the transformed observed signal $x_{l,k'}$ to generate a filtered source signal estimate $\bar{s}_{l,k'}=\tilde{w}_{k'}x_{l,k'}$. The application of the inverse filter estimate $\tilde{w}_{k'}$ to the transformed observed signal $x_{l,k'}$ may be made by multiplying the transformed observed signal $x_{l,k'}$ in each frame by the inverse filter estimate $\tilde{w}_{k'}$.

The inverse long time Fourier transform unit 5500 is cooperated with the filtering unit 5400. The inverse long time Fourier transform unit 5500 is adapted to receive the filtered source signal estimate $\bar{s}_{l,k'}$ from the filtering unit 5400. The inverse long time Fourier transform unit 5500 is adapted to perform an inverse longtime Fourier transformation of the filtered source signal estimate $\bar{s}_{l,k'}$ into a filtered digitized waveform source signal estimate $\tilde{s}[n]$ as the dereverberated signal.

Experiments

Simple experiments were performed with the aim of confirming the performance with the present method. The same source signals of word utterances and the same impulse responses were adopted with RT60 times of 0.1 second, 0.2 seconds, 0.5 seconds, and 1.0 second as those disclosed in details by Tomohiro Nakatani and Masato Miyoshi, "Blind dereverberation of single channel speech signal based on harmonic structure," Proc. ICASSP-2003, vol. 1, pp. 92-95, April, 2003. The observed signals were synthesized by convolving the source signals with the impulse responses. Two types of initial source signal estimates were prepared that are the same as those used for HERB and SBD, that is, $\hat{s}_{l,m,k}^{(r)}=H\{x_{l,m,k}^{(r)}\}$ and $\hat{s}_{l,m,k}^{(r)}=N\{x_{l,m,k}^{(r)}\}$, where H{*} and N{*} are, respectively, a harmonic filter used for HERB and a noise reduction filter used for SBD. The source signal uncertainty $\sigma_{l,m,k}^{(sr)}$ was determined in relation to a voicing measure, $v_{l,m}$, which is used with HERB to decide the voicing status for each short-time frame of the observed signals. In accordance with this measure, a frame is determined as voiced when $v_{l,m}>\delta$ for a fixed threshold δ. Specifically, $\sigma_{l,m,k}^{(sr)}$ was determined in the experiments as:

$$\sigma_{l,m,k}^{(sr)} = \begin{cases} G\left\{\dfrac{v_{l,m}-\delta}{\max_l\{v_{l,m}\}-\delta}\right\} & \text{if } v_{l,m}>\delta \text{ and } k \text{ is a harmonic frequency,} \\ \infty & \text{if } v_{l,m}>\delta \text{ and } k \text{ is not a harmonic frequency,} \\ G\left\{\dfrac{v_{l,m}-\delta}{\min_{l,m}\{v_{l,m}\}-\delta}\right\} & \text{if } v_{l,m}\le\delta. \end{cases} \tag{17}$$

where G{u} is a non-linear normalization function that is defined to be $G\{u\}=e^{-160(u-0.95)}$. On the other hand, $\sigma_{l,k'}^{(a)}$ is set at a constant value of 1. As a consequence, the weight for $\hat{s}_{l,m,k}^{(r)}$ in the above described equation (15) becomes a sigmoid function that varies from 0 to 1 as u in G{u} moves from 0 to 1. For each experiment, the EM steps were iterated four times. In addition, the repetitive estimation scheme with a feedback loop was also introduced. As analysis conditions, $K^{(r)}=504$ which corresponds to 42 ms, K=130,800 which corresponds to 10.9 s, τ=12 which corresponds to 1 ms, and a 12 kHz sampling frequency were adopted.

Energy Decay Curves

FIGS. 12A through 12H show energy decay curves of the room impulse responses and impulse responses dereverberated by HERB and SBD with and without the EM algorithm using 100 word observed signals uttered by a woman and a man. FIG. 12A illustrates the energy decay curve at RT60=1.0 sec., when uttered by a woman. FIG. 12B illustrates the energy decay curve at RT60=0.5 sec., when uttered by a woman. FIG. 12C illustrates the energy decay curve at RT60=0.2 sec., when uttered by a woman. FIG. 12D illustrates the energy decay curve at RT60=0.1 sec., when uttered by a woman. FIG. 12E illustrates the energy decay curve at RT60=1.0 sec., when uttered by a man. FIG. 12F illustrates the energy decay curve at RT60=0.5 sec., when uttered by a man. FIG. 12G illustrates the energy decay curve at RT60=0.2 sec., when uttered by a man. FIG. 12H illustrates the energy decay curve at RT60=0.1 sec., when uttered by a man. FIGS. 12A through 12H clearly demonstrate that the EM algorithm can effectively reduce the reverberation energy with both HERB and SBD.

Accordingly, as described above, one aspect of the present invention is directed to a new dereverberation method, in which features of source signals and room acoustics are represented by means of Gaussian probability density functions (pdfs), and the source signals are estimated as signals that maximize the likelihood function defined based on these probability density functions (pdfs). The iterative optimization algorithm was employed to solve this optimization problem efficiently. The experimental results showed that the present method can greatly improve the performance of the two dereverberation methods based on speech signal features, HERB and SBD, in terms of the energy decay curves of the dereverberated impulse responses. Since HERB and SBD are effective in improving the ASR performance for speech signals captured in a reverberant environment, the present method can improve the performance with fewer observed signals.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A speech dereverberation apparatus comprising:

a likelihood maximization unit that determines a source signal estimate that maximizes a likelihood function, the determination being made with reference to an observed signal, an initial source signal estimate, a first variance representing a source signal uncertainty, and a second variance representing an acoustic ambient uncertainty.

2. The speech dereverberation apparatus according to claim 1, wherein the likelihood function is defined based on a probability density function that is evaluated in accordance with an unknown parameter, a first random variable of missing data, and a second random variable of observed data, the unknown parameter being defined with reference to the source signal estimate, the first random variable of missing data representing an inverse filter of a room transfer function, and the second random variable of observed data being defined with reference to the observed signal and the initial source signal estimate.

3. The speech dereverberation apparatus according to claim 2, wherein the likelihood maximization unit determines the source signal estimate using an iterative optimization algorithm.

4. The speech dereverberation apparatus according to claim 3, wherein the iterative optimization algorithm is an expectation-maximization algorithm.

5. The speech dereverberation apparatus according to claim 1, wherein the likelihood maximization unit further comprises:

an inverse filter estimation unit that calculates an inverse filter estimate with reference to the observed signal, the second variance, and one of the initial source signal estimate and an updated source signal estimate;

a filtering unit that applies the inverse filter estimate to the observed signal, and generates a filtered signal;

a source signal estimation and convergence check unit that calculates the source signal estimate with reference to the initial source signal estimate, the first variance, the second variance, and the filtered signal, the source signal estimation and convergence check unit further determining whether or not a convergence of the source signal estimate is obtained, the source signal estimation and convergence check unit further outputting the source signal estimate as a dereverberated signal if the convergence of the source signal estimate is obtained; and an update unit that updates the source signal estimate into the updated source signal estimate, the update unit further providing the updated source signal estimate to the inverse filter estimation unit if the convergence of the source signal estimate is not obtained, and the update unit further providing the initial source signal estimate to the inverse filter estimation unit in an initial update step.

6. The speech dereverberation apparatus according to claim 5, wherein the likelihood maximization unit further comprises:

a first long time Fourier transform unit that performs a first long time Fourier transformation of a waveform observed signal into a transformed observed signal, the first long time Fourier transform unit further providing the transformed observed signal as the observed signal to the inverse filter estimation unit and the filtering unit;

an LTFS-to-STFS transform unit that performs an LTFS-to-STFS transformation of the filtered signal into a transformed filtered signal, the LTFS-to-STFS transform unit further providing the transformed filtered signal as the filtered signal to the source signal estimation and convergence check unit;

an STFS-to-LTFS transform unit that performs an STFS-to-LTFS transformation of the source signal estimate into a transformed source signal estimate, the STFS-to-LTFS transform unit further providing the transformed source signal estimate as the source signal estimate to the update unit if the convergence of the source signal estimate is not obtained;

a second long time Fourier transform unit that performs a second long time Fourier transformation of a waveform initial source signal estimate into a first transformed initial source signal estimate, the second long time Fourier transform unit further providing the first transformed initial source signal estimate as the initial source signal estimate to the update unit; and a short time Fourier transform unit that performs a short time Fourier transformation of the waveform initial source signal estimate into a second transformed initial source signal estimate, the short time Fourier transform unit further providing the second transformed initial source signal estimate as the initial source signal estimate to the source signal estimation and convergence check unit.

7. The speech dereverberation apparatus according to claim 1, further comprising:

an inverse short time Fourier transform unit that performs an inverse short time Fourier transformation of the source signal estimate into a waveform source signal estimate.

8. The speech dereverberation apparatus according to claim 1, further comprising:

an initialization unit that produces the initial source signal estimate, the first variance, and the second variance, based on the observed signal.

9. The speech dereverberation apparatus according to claim 8, wherein the initialization unit further comprises:

a fundamental frequency estimation unit that estimates a fundamental frequency and a voicing measure for each short time frame from a transformed signal that is given by a short time Fourier transformation of the observed signal; and a source signal uncertainty determination unit that determines the first variance, based on the fundamental frequency and the voicing measure.

10. The speech dereverberation apparatus according to claim 1, further comprising:

an initialization unit that produces the initial source signal estimate, the first variance, and the second variance, based on the observed signal; and a convergence check unit that receives the source signal estimate from the likelihood maximization unit, the convergence check unit determining whether or not a convergence of the source signal estimate is obtained, the convergence check unit further outputting the source signal estimate as a dereverberated signal if the convergence of the source signal estimate is obtained, and the convergence check unit furthermore providing the source signal estimate to the initialization unit to enable the initialization unit to produce the initial source signal estimate, the first variance, and the second variance based on the source signal estimate if the convergence of the source signal estimate is not obtained.

11. The speech dereverberation apparatus according to claim 10, wherein the initialization unit further comprises:

a second short time Fourier transform unit that performs a second short time Fourier transformation of the observed signal into a first transformed observed signal;

a first selecting unit that performs a first selecting operation to generate a first selected output and a second selecting operation to generate a second selected output, the first and second selecting operations being independent from each other, the first selecting operation being to select the first transformed observed signal as the first selected output when the first selecting unit receives an input of the first transformed observed signal but does not receive any input of the source signal estimate and to select one of the first transformed observed signal and the source signal estimate as the first selected output when the first selecting unit receives inputs of the first transformed observed signal and the source signal estimate, the second selecting operation being to select the first transformed observed signal as the second selected output when the first selecting unit receives the input of the first transformed observed signal but does not receive any input of the source signal estimate and to select one of the first transformed observed signal and the source signal estimate as the second selected output when the first selecting unit receives inputs of the first transformed observed signal and the source signal estimate, a fundamental frequency estimation unit that receives the second selected output and estimates a fundamental frequency and a voicing measure for each short time frame from the second selected output; and an adaptive harmonic filtering unit that receives the first selected output, the fundamental frequency and the voicing measure, the adaptive harmonic filtering unit enhancing a harmonic structure of the first selected output based on the fundamental frequency and the voicing measure to generate the initial source signal estimate.

12. The speech dereverberation apparatus according to claim 10, wherein the initialization unit further comprises:

a third short time Fourier transform unit that performs a third short time Fourier transformation of the observed signal into a second transformed observed signal;

a second selecting unit that performs a third selecting operation to generate a third selected output, the third selecting operation being to select the second transformed observed signal as the third selected output when the second selecting unit receives an input of the second transformed observed signal but does not receive any input of the source signal estimate and to select one of the second transformed observed signal and the source signal estimate as the third selected output when the second selecting unit receives inputs of the second transformed observed signal and the source signal estimate;

a fundamental frequency estimation unit that receives the third selected output and estimates a fundamental frequency and a voicing measure for each short time frame from the third selected output; and a source signal uncertainty determination unit that determines the first variance based on the fundamental frequency and the voicing measure.

13. The speech dereverberation apparatus according to claim 10, further comprising:

an inverse short time Fourier transform unit that performs an inverse short time Fourier transformation of the source signal estimate into a waveform source signal estimate if the convergence of the source signal estimate is obtained.

14. A speech dereverberation method comprising:

determining a source signal estimate that maximizes a likelihood function, the determination being made with reference to an observed signal, an initial source signal estimate, a first variance representing a source signal uncertainty, and a second variance representing an acoustic ambient uncertainty.

15. The speech dereverberation method according to claim 14, wherein the likelihood function is defined based on a probability density function that is evaluated in accordance with an unknown parameter, a first random variable of missing data, and a second random variable of observed data, the unknown parameter being defined with reference to the source signal estimate, the first random variable of missing data representing an inverse filter of a room transfer function, the second random variable of observed data being defined with reference to the observed signal and the initial source signal estimate.

16. The speech dereverberation method according to claim 15, wherein the source signal estimate is determined using an iterative optimization algorithm.

17. The speech dereverberation method according to claim 16, wherein the iterative optimization algorithm is an expectation-maximization algorithm.

18. The speech dereverberation method according to claim 14, wherein determining the source signal estimate further comprises:

calculating an inverse filter estimate with reference to the observed signal, the second variance, and one of the initial source signal estimate and an updated source signal estimate;

applying the inverse filter estimate to the observed signal to generate a filtered signal;

calculating the source signal estimate with reference to the initial source signal estimate, the first variance, the second variance, and the filtered signal;

determining whether or not a convergence of the source signal estimate is obtained;

outputting the source signal estimate as a dereverberated signal if the convergence of the source signal estimate is obtained; and updating the source signal estimate info the updated source signal estimate if the convergence of the source signal estimate is not obtained.

19. The speech dereverberation method according to claim 18, wherein determining the source signal estimate further comprises:

performing a first long time Fourier transformation of a waveform observed signal into a transformed observed signal;

performing an LTFS-to-STFS transformation of the filtered signal into a transformed filtered signal;

performing an STFS-to-LTFS transformation of the source signal estimate into a transformed source signal estimate if the convergence of the source signal estimate is not obtained;

performing a second long time Fourier transformation of a waveform initial source signal estimate into a first transformed initial source signal estimate; and performing a short time Fourier transformation of the waveform initial source signal estimate into a second transformed initial source signal estimate.

20. The speech dereverberation method according to claim 14, further comprising:

performing an inverse short time Fourier transformation of the source signal estimate into a waveform source signal estimate.

21. The speech dereverberation method according to claim 14, further comprising:

producing the initial source signal estimate, the first variance, and the second variance, based on the observed signal.

22. The speech dereverberation method according to claim 21, wherein producing the initial source signal estimate, the first variance, and the second variance further comprises:

estimating a fundamental frequency and a voicing measure for each short time frame from a transformed signal that is given by a short time Fourier transformation of the observed signal; and determining the first variance, based on the fundamental frequency and the voicing measure.

23. The speech dereverberation method according to claim 14, further comprising:

producing the initial source signal estimate, the first variance, and the second variance, based on the observed signal;

determining whether or not a convergence of the source signal estimate is obtained;

outputting the source signal estimate as a dereverberated signal if the convergence of the source signal estimate is obtained; and returning to producing the initial source signal estimate, the first variance, and the second variance if the convergence of the source signal estimate is not obtained.

24. The speech dereverberation method according to claim 23, wherein producing the initial source signal estimate, the first variance, and the second variance further comprises:

performing a second short time Fourier transformation of the observed signal into a first transformed observed signal;

performing a first selecting operation to generate a first selected output, the first selecting operation being to select the first transformed observed signal as the first selected output when receiving an input of the first transformed observed signal without receiving any input of the source signal estimate, the first selecting operation being to select one of the first transformed observed signal and the source signal estimate as the first selected output when receiving inputs of the first transformed observed signal and the source signal estimate;

performing a second selecting operation to generate a second selected output, the second selecting operation being to select the first transformed observed signal as the second selected output when receiving the input of the first transformed observed signal without receiving any input of the source signal estimate, the second selecting operation being to select one of the first transformed observed signal and the source signal estimate as the second selected output when receiving inputs of the first transformed observed signal and the source signal estimate;

estimating a fundamental frequency and a voicing measure for each short time frame from the second selected output; and enhancing a harmonic structure of the first selected output based on the fundamental frequency and the voicing measure to generate the initial source signal estimate.

25. The speech dereverberation method according to claim 23, wherein producing the initial source signal estimate, the first variance, and the second variance further comprises:

performing a third short time Fourier transformation of the observed signal into a second transformed observed signal;

performing a third selecting operation to generate a third selected output, the third selecting operation being to select the second transformed observed signal as the third selected output when receiving an input of the second transformed observed signal without receiving any input of the source signal estimate, the third selecting operation being to select one of the second transformed observed signal and the source signal estimate as the third selected output when receiving inputs of the second transformed observed signal and the source signal estimate;

estimating a fundamental frequency and a voicing measure for each short time frame from the third selected output; and determining the first variance based on the fundamental frequency and the voicing measure.

26. The speech dereverberation method according to claim 23, further comprising:

perforating an inverse short time Fourier transformation of the source signal estimate into a waveform source signal estimate if the convergence of the source signal estimate is obtained.

* * * * *